United States Patent
Chen et al.

(10) Patent No.: US 12,058,676 B2
(45) Date of Patent: Aug. 6, 2024

(54) ENHANCED APERIODIC OR SEMI-PERSISTENT CHANNEL STATE INFORMATION REPORT ON MULTI-BEAM PUSCH REPETITION

(71) Applicant: QUALCOMM Incorporated, San Diego, CA (US)

(72) Inventors: Yitao Chen, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 17/655,537

(22) Filed: Mar. 18, 2022

(65) Prior Publication Data

US 2022/0330289 A1   Oct. 13, 2022

Related U.S. Application Data

(60) Provisional application No. 63/173,230, filed on Apr. 9, 2021.

(51) Int. Cl.
  *H04L 1/08*   (2006.01)
  *H04W 72/1268*  (2023.01)
  *H04W 72/23*  (2023.01)

(52) U.S. Cl.
  CPC ........... *H04W 72/1268* (2013.01); *H04L 1/08* (2013.01); *H04W 72/23* (2023.01)

(58) Field of Classification Search
  CPC ...... H04L 1/08; H04W 72/1268; H04W 72/23
  See application file for complete search history.

(56) References Cited

U.S. PATENT DOCUMENTS

| 2021/0044385 | A1 | 2/2021 | Hosseini et al. |
| 2023/0123957 | A1* | 4/2023 | Jung .......................... H04L 1/08 370/329 |

FOREIGN PATENT DOCUMENTS

WO   2019183827 A1   10/2019

OTHER PUBLICATIONS

Ericsson: "On PDCCH, PUCCH and PUSCH Enhancements with Multiple TRPs", 3GPP Draft, R1-2009223, 3GPP, Mobile Competence Centre, 650, Route Des Lucioles, F-06921 Sophia-Antipolis Cedex, France, vol. RAN WG1, No. eMeeting, Oct. 26, 2020-Nov. 13, 2020, Oct. 24, 2020 (Oct. 24, 2020), 25 Pages, XP051946903, Retrieved from Internet: URL: https://www.3gpp.org/ftp/tsg_ran/WG1_RL1/TSGR1_103-e/Docs/R1-2009223.zip, R1-2009223 On PDCCH, PUSCH and PUCCH enhancemments using mTRP docx [retrieved on Oct. 24, 2020] Sections 1, 2.3, 2.3.8.

(Continued)

*Primary Examiner* — Kent Krueger
(74) *Attorney, Agent, or Firm* — Procopio, Cory, Hargreaves & Savitch

(57) ABSTRACT

A UE receives DCI scheduling a first set of PUSCH repetitions associated with a first SRS set and a second set of PUSCH repetitions associated with a second SRS set. The UE determines whether to multiplex at least one CSI report on one PUSCH repetition of the first set of PUSCH repetitions, one PUSCH repetition of the second set of PUSCH repetitions, or both based on whether a number of symbols in the one PUSCH repetition of the first set of PUSCH repetitions and in the one PUSCH repetition of the second set of PUSCH repetitions is different, and/or UCI excluding the at least one CSI report will be transmitted in the one PUSCH repetition of the first set of PUSCH repetitions or the one PUSCH repetition of the second set of PUSCH repetitions.

30 Claims, 27 Drawing Sheets

(56) References Cited

OTHER PUBLICATIONS

International Search Report and Written Opinion—PCT/US2022/021217—ISA/EPO—Jun. 22, 2022.
Nokia., et al., "Enhancements for Multi-TRP URLLC Schemes", 3GPP Draft, R1-2103366, 3rd Generation Partnership Project (3GPP), Mobile Competence Centre, 650, Route Des Lucioles, F-06921 Sophia-Antipolis Cedex, France, vol. RAN WG1, No. e Meeting, Apr. 12, 2021-Apr. 20, 20210, Apr. 6, 2021 (Apr. 6, 2021), 32 Pages, XP051993391, Retrieved from Internet: URL: https://www.3gpp.org/ftp/tsg_ran/WG1_RL1/TSGR1_104b-e/Docs/R1-2103366.zip, R1-2103366_M-TRP_URLLC.docx[retrieved on Apr. 6, 2021], Sections 2.3, 2.3.1, 2.3.5.

* cited by examiner

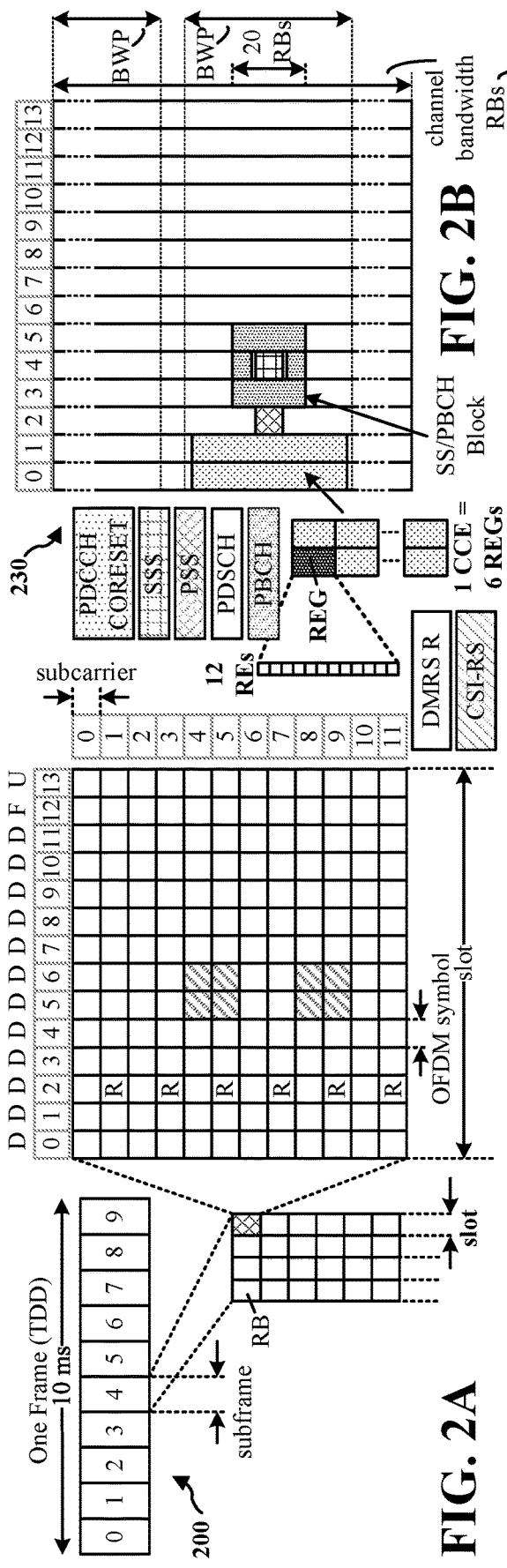
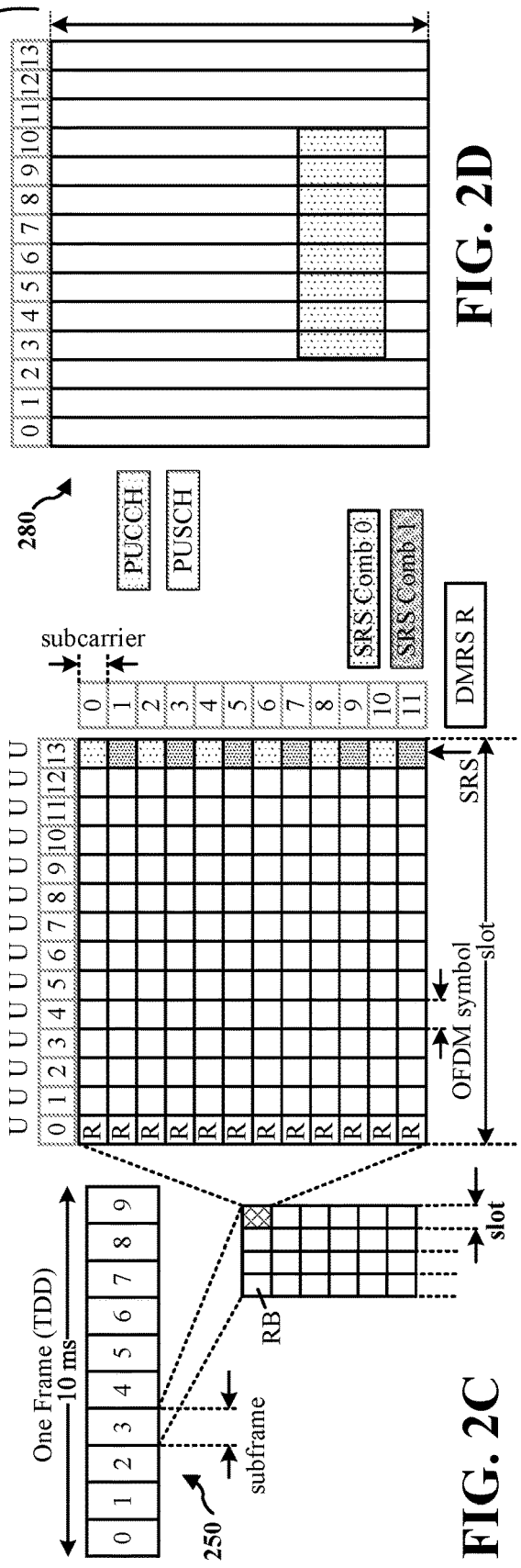
FIG. 2A
FIG. 2B
FIG. 2C
FIG. 2D

1900

1902

Receive DCI scheduling a plurality of PUSCH repetitions including a first set of PUSCH repetitions associated with a first SRS set and a second set of PUSCH repetitions associated with a second SRS set

1904

Determine whether to multiplex at least one CSI report on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or UCI excluding the at least one CSI report will be transmitted in the one PUSCH repetition of the first set of PUSCH repetitions or the one PUSCH repetition of the second set of PUSCH repetitions

1906

Transmit, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions

2402
Determine that the number of symbols in the one PUSCH repetition of the first set of PUSCH repetitions and in the one PUSCH repetition of the second set of PUSCH repetitions is different (e.g., the first condition 1422 is not met)

2404
Determine that UCI excluding the at least one CSI report will be multiplexed on at least one of the one PUSCH repetition of the first set of PUSCH repetitions or the one PUSCH repetition of the second set of PUSCH repetitions (e.g., the second condition 1424 is not met)

2406
Determine that the UE has no TB to transmit in the PUSCH repetitions

2408
Transmit the at least one CSI in the one PUSCH repetition of the first set of PUSCH repetitions 2410
Refrain from multiplexing the at least CSI report on the one PUSCH repetition of the second set of PUSCH repetitions

FIG. 24

ENHANCED APERIODIC OR SEMI-PERSISTENT CHANNEL STATE INFORMATION REPORT ON MULTI-BEAM PUSCH REPETITION

CROSS REFERENCE TO RELATED APPLICATION(S)

This application claims the benefit of and priority to U.S. Provisional Application Ser. No. 63/173,230, entitled "ENHANCED APERIODIC OR SEMI-PERSISTENT CHANNEL STATE INFORMATION REPORT ON MULTI-BEAM PUSCH REPETITION" and filed on Apr. 9, 2021, which is expressly incorporated by reference herein in its entirety.

TECHNICAL FIELD

The present disclosure relates generally to communication systems, and more particularly, to wireless communication involving channel state information (CSI) report.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives downlink control information (DCI) scheduling a plurality of physical uplink shared channel (PUSCH) repetitions including a first set of PUSCH repetitions associated with a first sounding reference signal (SRS) set and a second set of PUSCH repetitions associated with a second SRS set. The apparatus determines whether to multiplex at least one CSI report on the one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or uplink control information (UCI) excluding the at least one CSI report will be transmitted in the one PUSCH repetition of the first set of PUSCH repetitions or the one PUSCH repetition of the second set of PUSCH repetitions. The apparatus transmits, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

FIG. 19 is a flowchart of a method of wireless communication in accordance with aspects presented herein.

FIG. 24 is a flowchart of a method of wireless communication in accordance with aspects presented herein.

DETAILED DESCRIPTION

Figure 1:
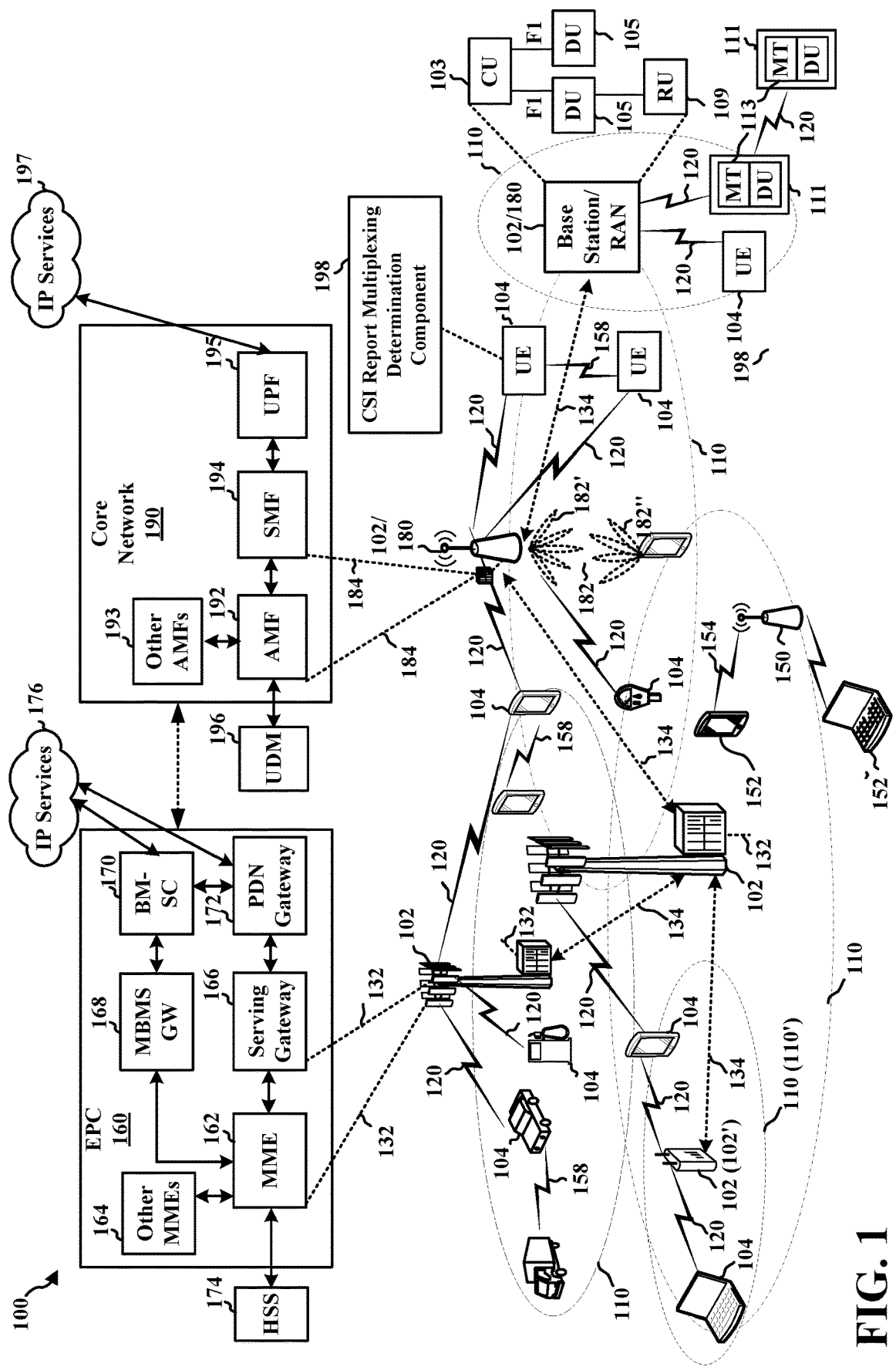
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a CSI report multiplexing determination component 198 configured to determine whether to multiplex one or more CSI reports on PUSCH repetition(s) and/or which PUSCH repetition(s) to multiplex the one or more CSI reports for multi-TRP PUSCH repetitions. In one configuration, the CSI report multiplexing determination component 198 may be configured to receive DCI scheduling a plurality of PUSCH repetitions including a first set of PUSCH repetitions associated with a first SRS set and a second set of PUSCH repetitions associated with a second SRS set, and requesting transmission of at least one CSI report to be multiplexed on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions. In such configuration, the CSI report multiplexing determination component 198 may determine whether to multiplex the at least one CSI report in the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or UCI excluding the at least one CSI report will be transmitted in the one PUSCH repetition of the first set of PUSCH repetitions or the one PUSCH repetition of the second set of PUSCH repetitions. In such configuration, the CSI report multiplexing determination component 198 may transmit, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a network entity may include a base station, one or more components of a disaggregated or virtualized base station (such as a distributed unit or a central unit), a radio unit, a transmission reception point (TRP), a relay, an intelligent reflective surface (IRS), and/or a combination thereof. For example, a base station 102 or 180 may be referred as a RAN and may include aggregated or disaggregated components. As an example of a disaggregated RAN, a base station may include a central/centralized unit (CU) 103, one or more distributed units (DU) 105, and/or one or more radio units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logic al node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SC S) and, effectively, the symbol length/duration, which is equal to 1/SCS.

| μ | SCS<br>$\Delta f = 2^\mu \cdot 15$<br>[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
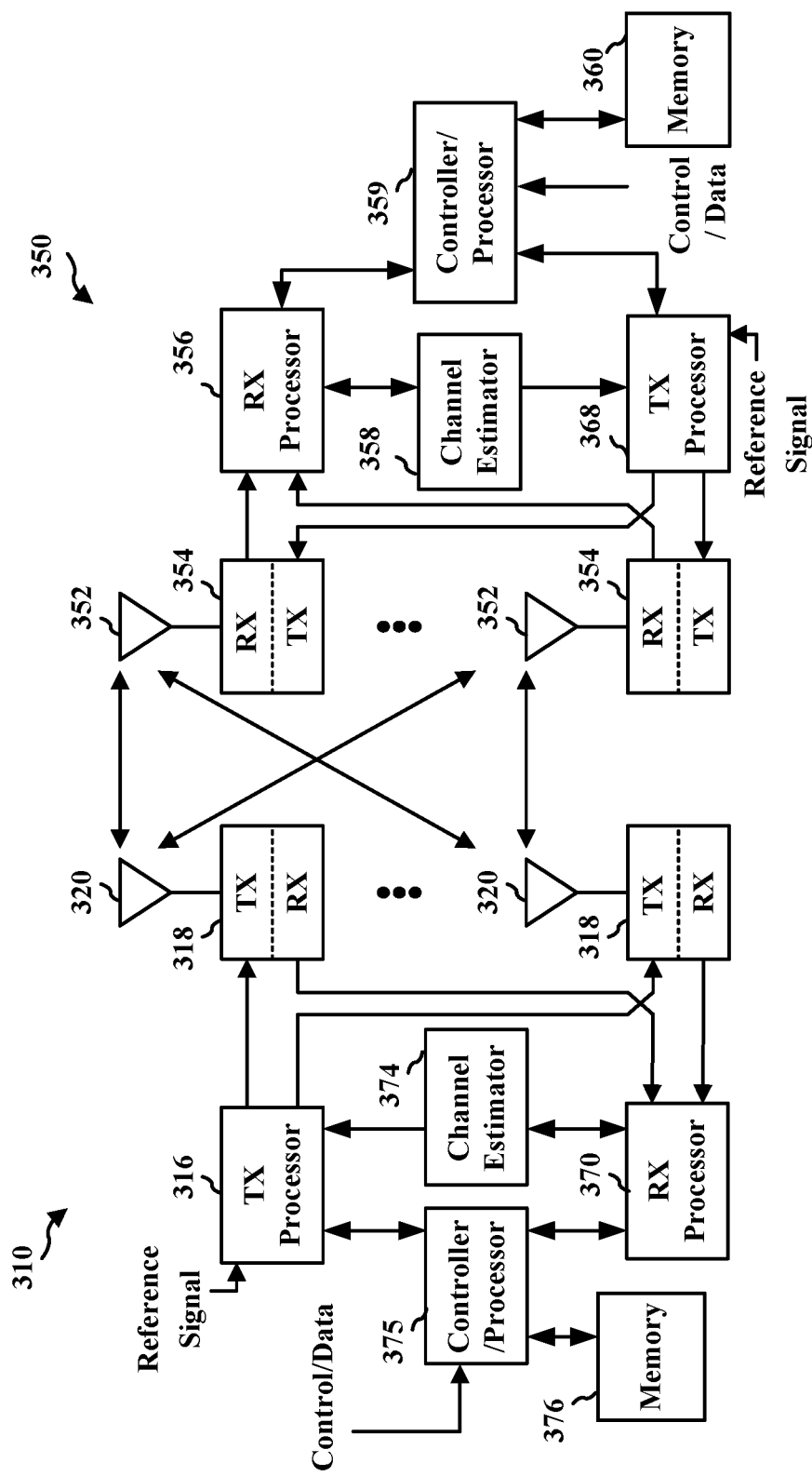
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the CSI report multiplexing determination component 198 of FIG. 1.

To improve data transmissions and a successful transmission rate, a transmitting device, such as a base station or a UE, may transmit data (e.g., via a PDSCH, PDSCH, etc.) with repetitions/retransmissions (e.g., PDSCH repetitions, PUSCH repetitions, etc.). For example, a UE may be configured to transmit a PUSCH followed by N (e.g., 2, 4, 5, etc.) repetitions. Thus, after a UE transmits a PUSCH, the UE may transmit N PUSCH repetitions. Transmitting data with repetitions of the data may increase the success rate of the transmission, as the data may have a higher chance of being received by a receiving device. For purposes of the present disclosure, the term "repetition" and the term "retransmission" may be used interchangeably, which may refer to a copy or a duplication of data that may be transmitted more than once. For example, a PUSCH repetition and a PUSCH retransmission may both refer to a copy/duplication of a PUSCH that is transmitted by a UE after the UE transmits the PUSCH.

Figure 4:
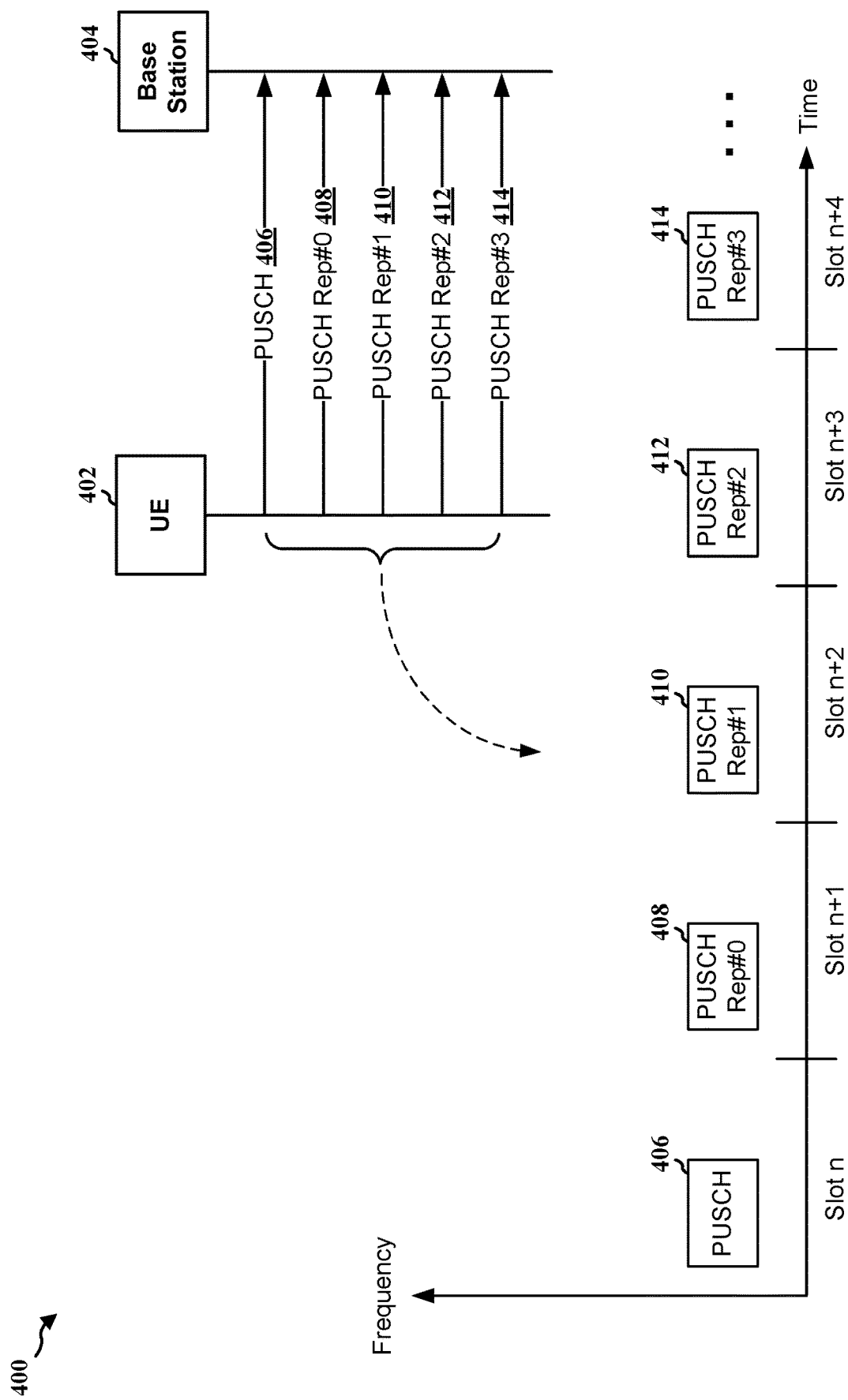
FIG. 4 is a diagram illustrating an example of a data transmission involving repetitions.

FIG. 4 is a diagram 400 illustrating an example of a data transmission involving repetitions. A UE 402 may be configured to transmit a PUSCH 406 with four (4) repetitions/retransmissions to a base station 404 (or to a component of the base station 404 or a network entity). In one example, the UE 402 may transmit the PUSCH 406 at slot n, then the UE 402 may transmit a first PUSCH repetition 408 (e.g., repetition #0) at slot n+1, a second PUSCH repetition 410 (e.g., repetition #1) at slot n+2, a third PUSCH repetition 412 (e.g., repetition #2) at slot n+3, and a fourth PUSCH repetition 414 (e.g., repetition #3) at slot n+4. The repeated transmission of the PUSCH 406 may be referred to as inter-slot repetitions. While the diagram 400 shows the repetitions (e.g., PUSCH repetitions 408, 410, 412, and 414) of the PUSCH 406 being transmitted on consecutive slots, the repetitions may also be transmitted at non-consecutive slots (e.g., at n+1, n+3, n+5, etc.) or within a same slot (e.g., intra-slot repetitions).

Figure 5:
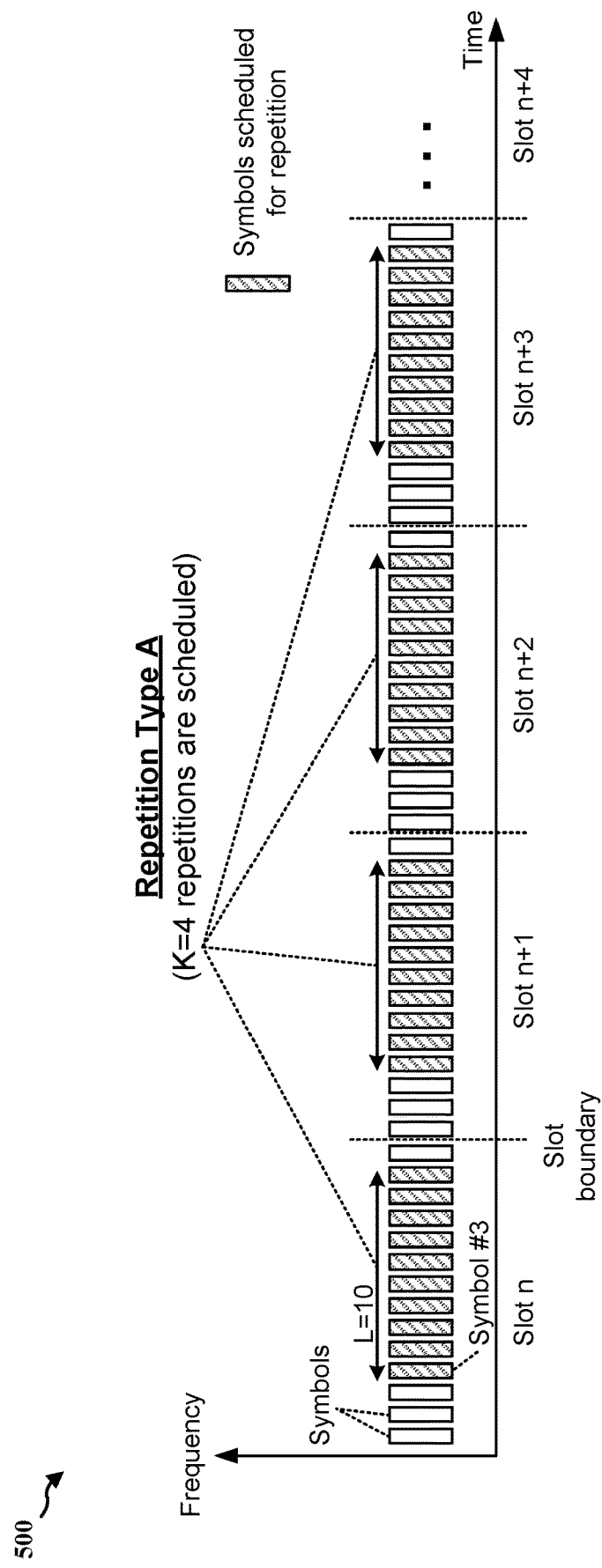
FIG. 5 is a diagram illustrating an example of a first type of physical uplink shared channel (PUSCH) repetition.

In some examples, a network may include different data repetition types or modes. For example, a network may include at least two types of PUSCH repetition for its dynamic grant (DG) and/or configured grant (CG). FIG. 5 is a diagram 500 illustrating an example of a first type of PUSCH repetition, which may be referred to as "PUSCH repetition Type A." Under the PUSCH repetition Type A, a UE may be configured to transmit a number of K PUSCH repetitions using the same time and frequency resources in multiple slots when more than one PUSCH repetition (e.g., K>1) is configured for the UE, and the UE may not transmit a PUSCH or a PUSCH repetition across a slot boundary for DG PUSCH and/or CG PUSCH. When a UE is scheduled by a base station (or a component of a base station) to transmit PUSCH or PUSCH repetition, the base station may indicate to the UE resources in which the UE may use for transmitting the PUSCH or the PUSCH repetition. For example, the base station may transmit a start and length indicator value (SLIV) to the UE, where the SLIV may indicate/include a starting symbol (S) and a length (L) of PUSCH (e.g., in symbols) in which the UE may use for transmitting the PUSCH or the PUSCH repetition in a slot. For example, as shown by the diagram 500, a base station may configure a UE to transmit four (4) PUSCH repetitions (e.g., K=4), and the base station may provide the UE with an SLIV that indicates S=3 and L=10. Based on the SLIV, the UE may determine that it may use ten (10) symbols starting from symbol #3 of a slot (e.g., the fourth symbol of slot n as the first symbol may be symbol #0) for transmitting a PUSCH repetition. When the UE is configured to transmit more than one PUSCH repetition (e.g., K>1), the UE may apply the same SLIV for all PUSCH repetitions, such that each PUSCH repetition may be transmitted using the same time and frequency resources of a slot. In other words, under the PUSCH repetition Type A, a UE may transmit different PUSCH repetitions in different slots, where the same symbols (e.g., same starting symbol and same length) may be used for the PUSCH repetitions in each slot). The number of repetitions K may be either semi-statically configured (e.g., via RRC) or dynamically indicated by the DCI (e.g., by a time domain resource assignment (TDRA) field). For example, for RRC configuration, if the UE is configured with a pusch-AggregationFactor, the number of repetitions K may be equal to the pusch-AggregationFactor. For dynamic indication, if numberofrepetitions is presented in a TDRA table, the number of repetitions K may be equal to the numberofrepetitions indicated by the DCI (e.g., pointing to a TDRA row).

Figure 6:
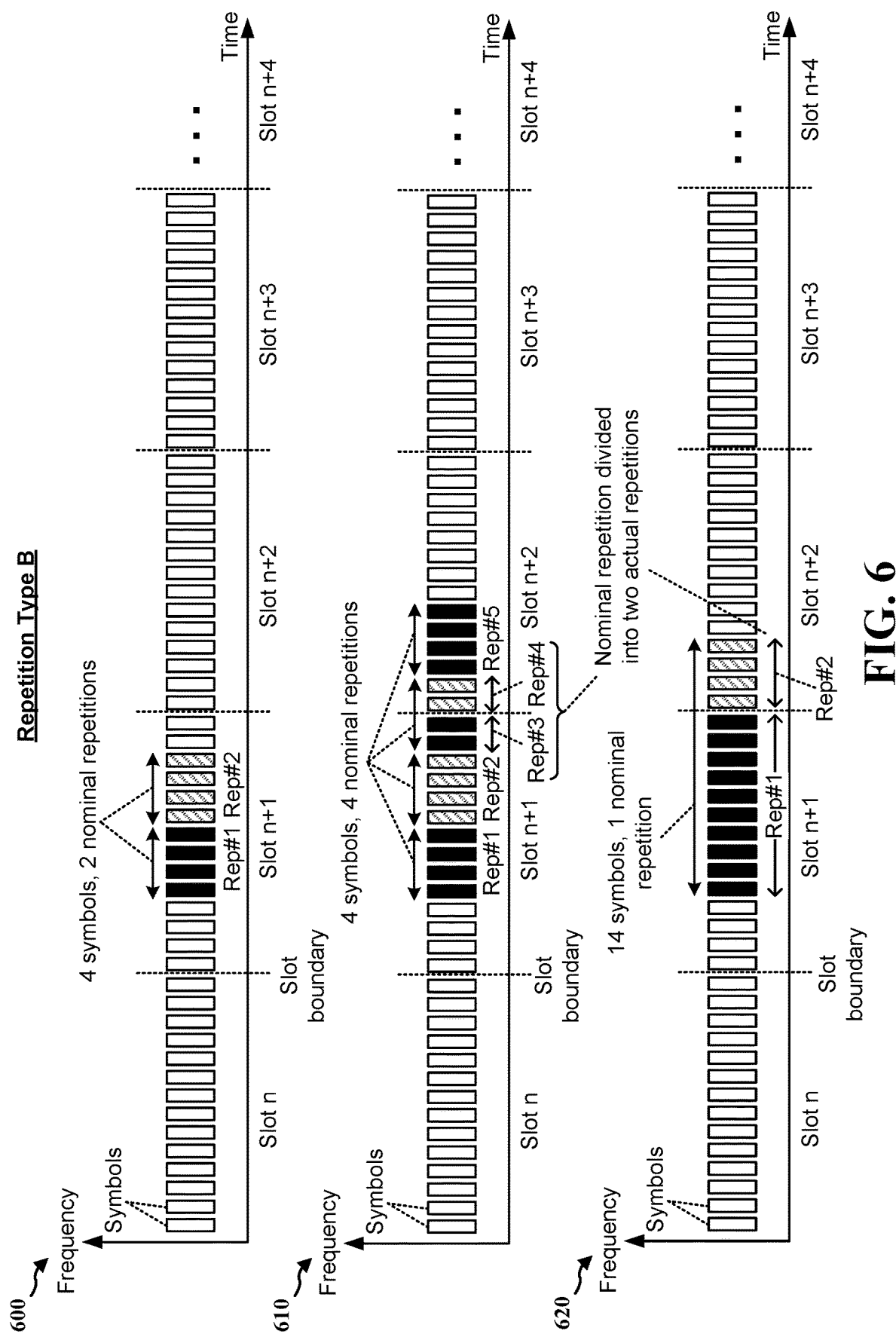
FIG. 6 is a diagram illustrating examples of a second type of PUSCH repetition.

FIG. 6 is a diagram 600 illustrating examples of a second type of PUSCH repetition, which may be referred to as "PUSCH repetition Type B." Under the PUSCH repetition Type B, a UE may transmit PUSCH across a slot boundary for DG PUSCH and/or CG PUSCH, and the UE may transmit PUSCH or PUSCH repetition using different time and/or frequency resources for different slots. A base station (or a component of the base station) may also dynamically indicate a number of PUSCH repetitions, an inter-nominal PUSCH frequency hopping, new uplink/downlink (U/D) symbol interaction, and/or new SLIV to the UE under the second type of PUSCH repetition. For example, a base station may indicate a number of "nominal" repetitions to a UE in DCI, which may be consecutive. The number of nominal repetitions (e.g., numberofrepetitions) may be configured per row of the TDRA table, and may be dynamically indicated by the DCI (by pointing to a TDRA row). In some examples, as shown by diagram 600 of FIG. 6, the nominal repetitions may have the same length (e.g., two nominal repetitions with each nominal repetition being four symbols in length). As shown by diagrams 610 and 620, a nominal repetition may cross a slot boundary. However, when a nominal repetition crosses a slot boundary, the nominal repetition may be divided into two "actual repetitions." For example, as one of a four symbols long repetition in diagram 610 crosses the slot boundary, that repetition may be divided into two actual repetitions. Thus, the four nominal repetitions may turn into five actual repetitions. Similarly, as the fourteen-symbols repetition in diagram 620 crosses the slot boundary, that repetition may be divided into two actual repetitions.

Figure 7:
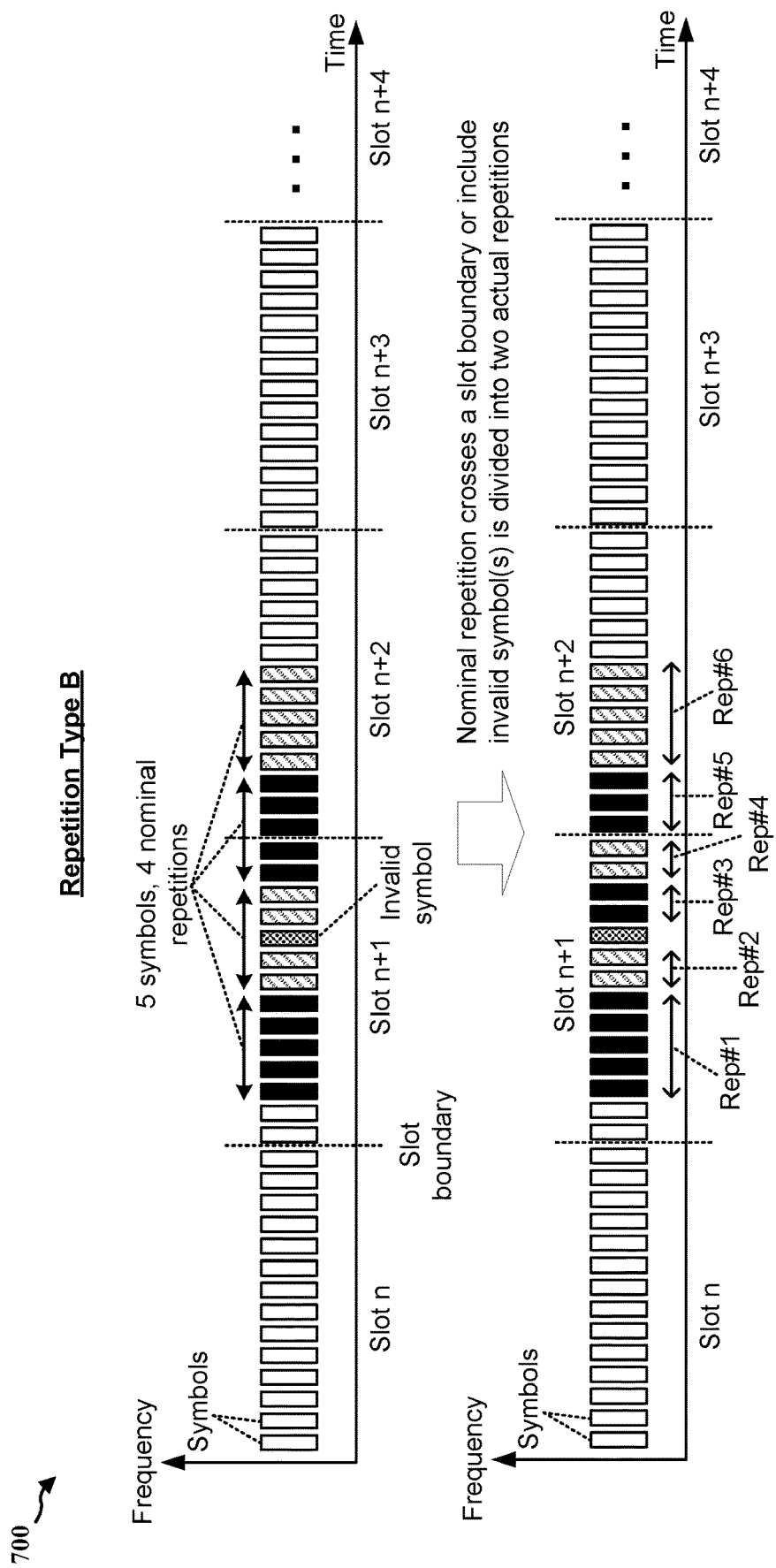
FIG. 7 is a diagram illustrating an example of dividing nominal repetitions into multiple actual repetitions based on invalid symbol and across slot boundary.

In addition, if one or more of the symbols of a nominal repetition are identified as invalid symbols, a nominal repetition may also be divided into multiple actual repetitions after removing the invalid symbols. FIG. 7 is a diagram 700 illustrating an example of dividing nominal repetitions into multiple actual repetitions based on invalid symbol and across slot boundary. A UE may be scheduled by a base station (or a component of the base station) with four (4) nominal repetitions with each nominal repetition having five (5) symbols in length, where one of the nominal repetitions may include an invalid symbol and one of the nominal repetitions may cross a slot boundary. The nominal repetition that include the invalid symbol may be divided into two actual repetitions after removing the invalid symbol, and the nominal repetition that crosses the slot boundary may be divided into two actual repetitions. As such, four nominal repetitions may be divided into six actual repetitions. In some examples, the invalid symbol(s) may include semi-static downlink (DL) symbols, indicated symbol in a pattern of invalid symbols, synchronization signal block (SSB) symbol(s), and/or symbol(s) where CORESET0 for Type0-PDCCH is monitored, etc.

To improve reliability and robustness of PUSCH transmission, a UE may be configured to transmit a PUSCH to multiple transmission and reception points (TRPs) and/or multiple antennas/panels. Thus, if a PUSCH transmitted to one TRP/panel is blocked, another repetition of the PUSCH may be received and decoded by the other TRP/panel (hence increasing the diversity). In some examples, different PUSCH transmission occasions (i.e., PUSCH repetitions) corresponding to a same transport block (TB) may be transmitted in different slots (e.g., for the PUSCH repetition Type A) or mini-slots (e.g., for the PUSCH repetition Type B). As described in connection with FIGS. 4 to 7, the number of PUSCH repetitions (e.g., K) may be RRC configured and/or may be indicated dynamically through TDRA field of DCI. In such examples, the UE may transmit the PUSCH repetitions using a same beam as the sounding reference signal (SRS) resource indicator (SRI) field of the DCI may be applied to all the repetitions. The SRI (e.g., the SRS resource indicator) may be a field in DCI (e.g., an UL DCI) that determines/indicates the beam and/or power control for PUSCH by pointing to one or more SRS resources within a SRS resource set. However, when different PUSCH repetitions are configured to be received at different TRPs, panels, and/or antennas of a base station, transmitting all PUSCH repetitions using a same transmitting beam may not be optimal. As such, in some examples, a UE may be configured to transmit different PUSCH repetitions with different transmitting beams.

Figure 8:
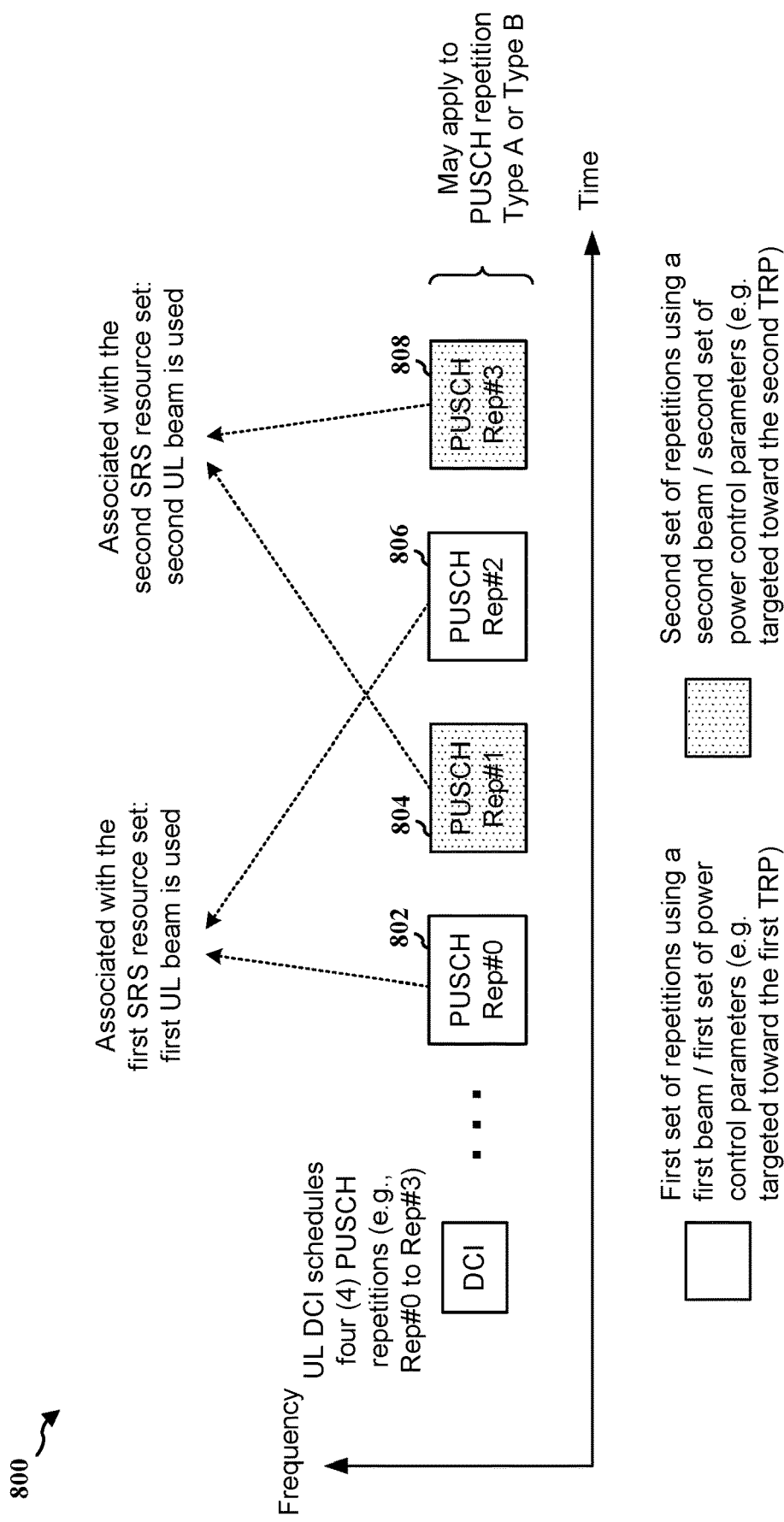
FIG. 8 is a diagram illustrating an example of associating different sets of PUSCH repetitions with different uplink (UL) beams and power control parameters.

FIG. 8 is a diagram 800 illustrating an example of associating different sets of PUSCH repetitions with different UL beams and power control parameters. In one example, a base station (or a component of the base station) may schedule/configure a set of four (4) PUSCH repetitions for a UE, which may include a first PUSCH repetition 802, a second PUSCH repetition 804, a third PUSCH repetition 806, and a fourth PUSCH repetition 808. The set of PUSCH repetitions may be separated into two sets of PUSCH repetitions, where each set of PUSCH repetitions may be associated with a beam and/or power control parameter that is different from the other set of PUSCH repetitions. For example, a first set of PUSCH repetitions may include the first PUSCH repetition 802 and the third PUSCH repetition 806, and the first set of PUSCH repetitions may be associated with a first UL beam and/or a first set of power control parameter(s). As such, the UE may transmit the first set of PUSCH repetitions to a first TRP of the base station based on the first UL beam and/or the first set of power control parameter(s). Similarly, a second set of PUSCH repetitions may include the second PUSCH repetition 804 and the fourth PUSCH repetition 808, and the second set of PUSCH repetitions may be associated with a second UL beam and/or a second set of power control parameter(s). As such, the UE may transmit the second set of PUSCH repetitions to a second TRP of the base station based on the second UL beam and/or the second set of power control parameter(s), etc. In other words, the two sets of PUSCH repetitions may correspond to two SRS resource sets, where the DCI may indicate two beams/two sets of power control parameters by indicating one or more SRS resources within each of the two SRS resource sets.

For a base station to determine a channel condition between the base station and a UE, the base station may request or configure the UE to measure the channel and report the channel measurement back to the base station. For example, the base station may transmit a set of channel state information (CSI) reference signals (RSs) to the UE and request/configure the UE to measure the set of CSI-RSs. After the UE measures the set of CSI-RSs, the UE may transmit one or more reports (e.g., CSI report(s)) to the base station via PUSCH that indicates the CSI. Based on the reported CSI, the base station may determine the channel condition between the base station and the UE, and the base station may adjust one or more communication parameters between the base station and the UE based on the reported CSI to improve the communication between the base station and the UE.

Figure 9:
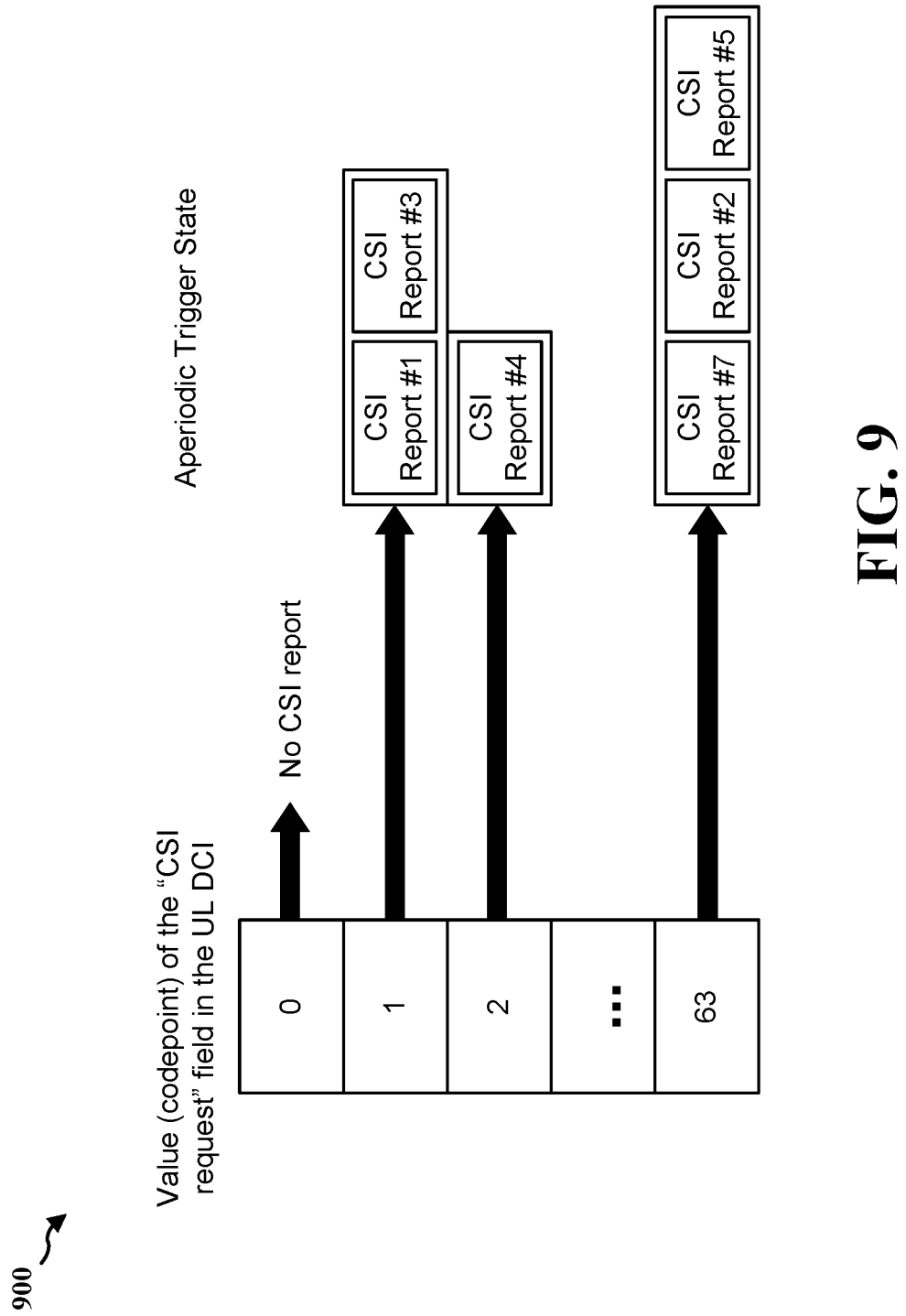
FIG. 9 is a diagram illustrating an example of triggering aperiodic (AP)-CSI reporting on PUSCH.

In some examples, a base station may configure/trigger CSI reporting from a UE to be aperiodic (AP) (e.g., using a PUSCH), periodic (e.g., using a PUCCH), and/or semi-persistent (SP) (e.g., using a PUCCH or DCI-activated PUSCH). FIG. 9 is a diagram 900 illustrating an example of triggering AP-CSI reporting on PUSCH. A base station (or a component of the base station) may trigger a UE to transmit AP-CSI report on PUSCH via DCI (e.g., UL DCI), where the base station may configure up to 128 trigger states for the UE via RRC (e.g., via a higher layer parameter Aperiodic TriggerStateList) and each trigger state may be associated with one or more (e.g., up to sixteen (16)) CSI report settings. In one example, if a "CSI request" field in the DCI has N bits, a maximum of $2^N-1$ trigger states may be activated through MAC-CE. For example, if the CSI request field in the DCI has six (6) bits (e.g., N=6), a maximum of 63 (e.g., $2^6-1=63$) trigger states may be activated through MAC-CE, which may be mapped to a maximum of 63 codepoints. For example, as shown by diagram 900, if the value (e.g., codepoint) of the CSI request field in the UL DCI corresponds to zero (0), it may indicate that no CSI report is triggered; if the value of the CSI request field corresponds to one (1), it may indicate that a first (#1) and a third (#3) CSI report settings/configurations are triggered; if the value of the CSI request field corresponds to two (2), it may indicate that a fourth (#4) CSI report setting/configuration is triggered, etc. In other words, the CSI request field of the UL DCI may indicate one trigger state, which may trigger one or more CSI report settings/configurations.

In some examples, when a base station requests a UE to provide AP-CSI report via DCI that also schedules multiple PUSCH repetitions, the UE may be configured to multiplex one or more AP-CSI reports on the first PUSCH repetition, which may apply to both PUSCH repetition Type A and PUSCH repetition Type B. For example, referring back to FIG. 5, if a base station requests a UE to provide AP-CSI reporting via a DCI that also schedules four PUSCH repetitions (e.g., K=4) based on PUSCH repetition Type A, the UE may be configured to multiplex one or more AP-CSI reports on the first PUSCH repetition (e.g., at slot n) but not on other PUSCH repetitions. On the other hand, if the PUSCH repetitions are based on PUSCH repetition Type B where the UE is being configured with one or more nominal PUSCH repetitions, the UE may be configured to multiplex one or more AP-CSI reports on the first actual PUSCH repetition but not on other PUSCH repetitions.

Figure 10:
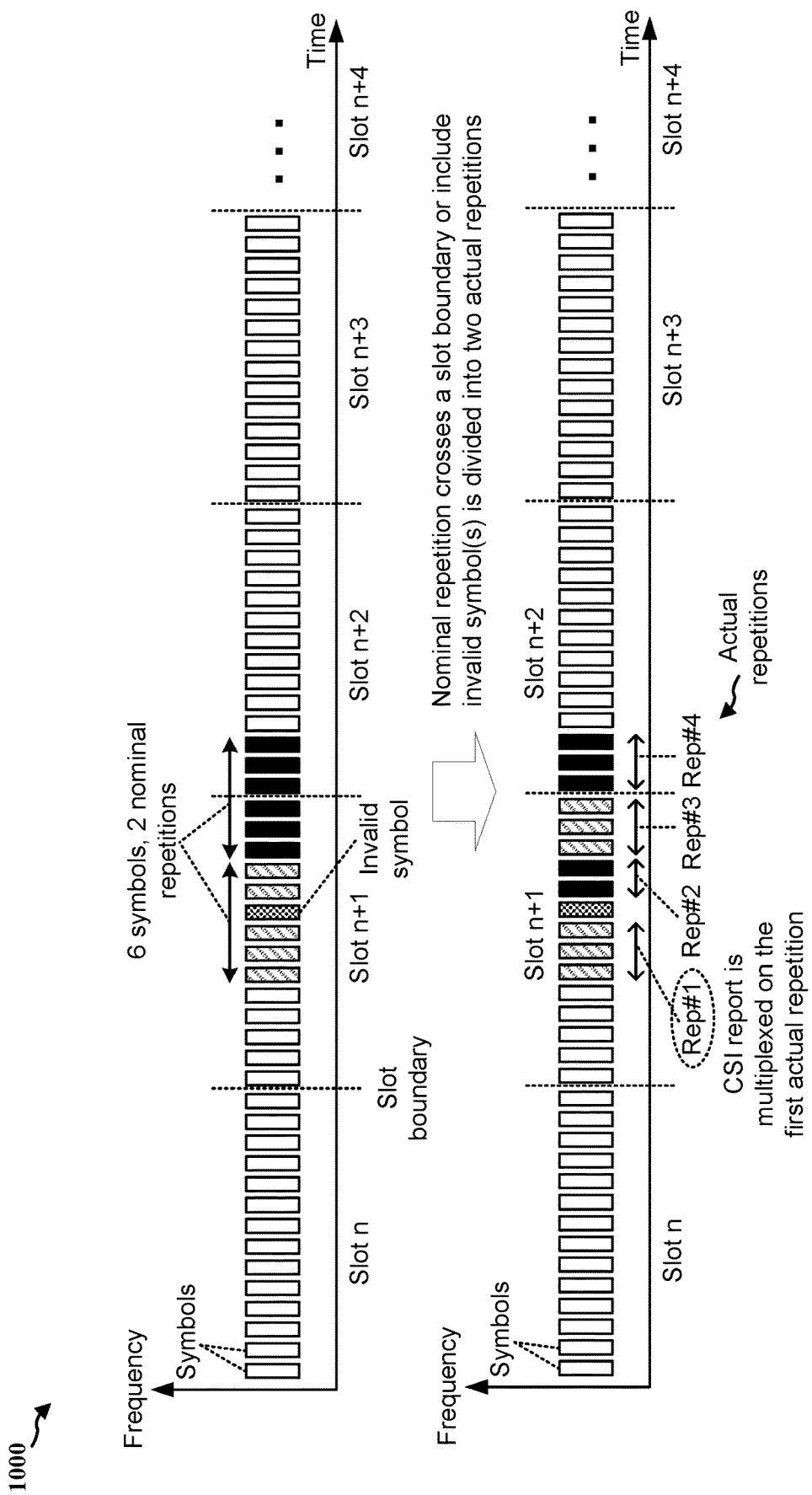
FIG. 10 is a diagram illustrating an example of AP-CSI reporting for PUSCH repetition Type B.

FIG. 10 is a diagram 1000 illustrating an example of AP-CSI reporting for PUSCH repetition Type B. A UE may be configured with two nominal repetitions with each nominal repetition having six (6) symbols in length (e.g., L=6) under PUSCH repetition Type B. In one example, the first nominal repetition may include an invalid symbol, and the second nominal repetition may cross a slot boundary. As described in connection with FIGS. 6 and 7, the two nominal repetitions may be divided into four (4) actual repetitions due to the invalid symbol and crossing the slot boundary. As such, the UE may be configured to multiplex one or more AP-CSI reports on the first actual PUSCH repetition but not on other actual PUSCH repetitions. In some examples, the UE may not expect that the first actual repetition has a single symbol duration.

In other examples, if a PUSCH does not include a TB (e.g., UL-SCH indicator=0 in the DCI, which may indicate that the UE has no data to transmit), the UE may assume the number of repetitions is one (1) (e.g., K=1) irrespective of the value of the number of repetitions (e.g., numberofrepentions) configured for the UE. For examples, if the UE is configured with four (4) nominal repetitions (e.g., K=4) for a PUSCH but the PUSCH does not include any TB, the UE may assume the nominal repetition to be one instead of four. In addition, the UE may be configured to expect/assume the length of the first nominal repetition to be the same as the first actual repetition (e.g., no segmentation due to invalid symbol(s) or crossing the slot boundary, etc.).

Figure 11:
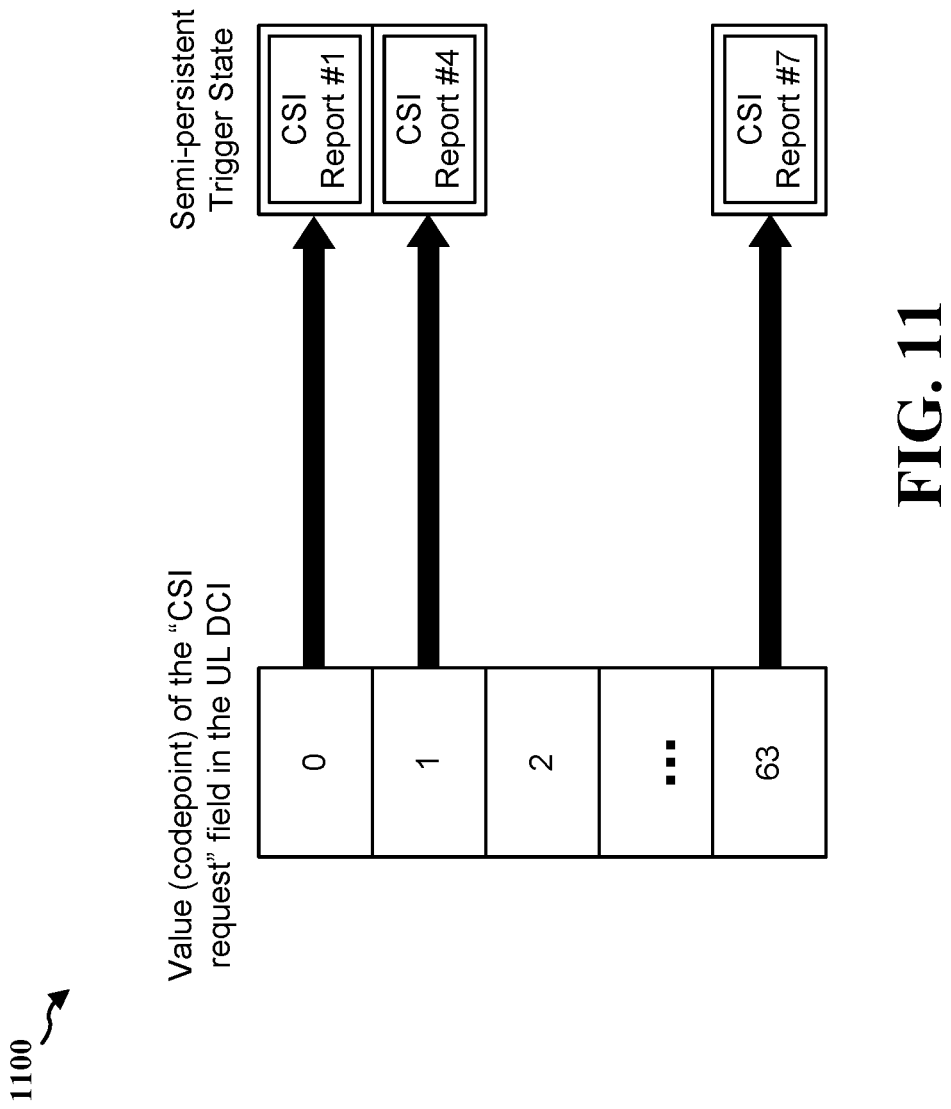
FIG. 11 is a diagram illustrating an example of triggering SP-CSI reporting on PUSCH.

FIG. 11 is a diagram 1100 illustrating an example of triggering SP-CSI reporting on PUSCH. A base station (or a component of the base station) may trigger a UE to transmit a SP-CSI report on a PUSCH via DCI (e.g., UL DCI), where the base station may configure up to 64 trigger states for the UE via RRC signaling (e.g., via a higher layer parameter SemiPersistentOnPUSCH-TriggerStateList) and each trigger state may be associated with one CSI report setting/configuration. In other words, the CSI request field in DCI may point to one trigger state which triggers a corresponding CSI report setting/configuration. For example, as shown by diagram 1100, if the value of the CSI request field in DCI corresponds to zero (0), it may trigger a first (#1) CSI report setting/configuration; if the value of the CSI request field corresponds to one (1), it may trigger a fourth (#4) CSI report setting/configuration; and if the value of the CSI request field corresponds to sixty-three (63), it may trigger a seventh (#7) CSI report setting/configuration, etc.

Figure 12:
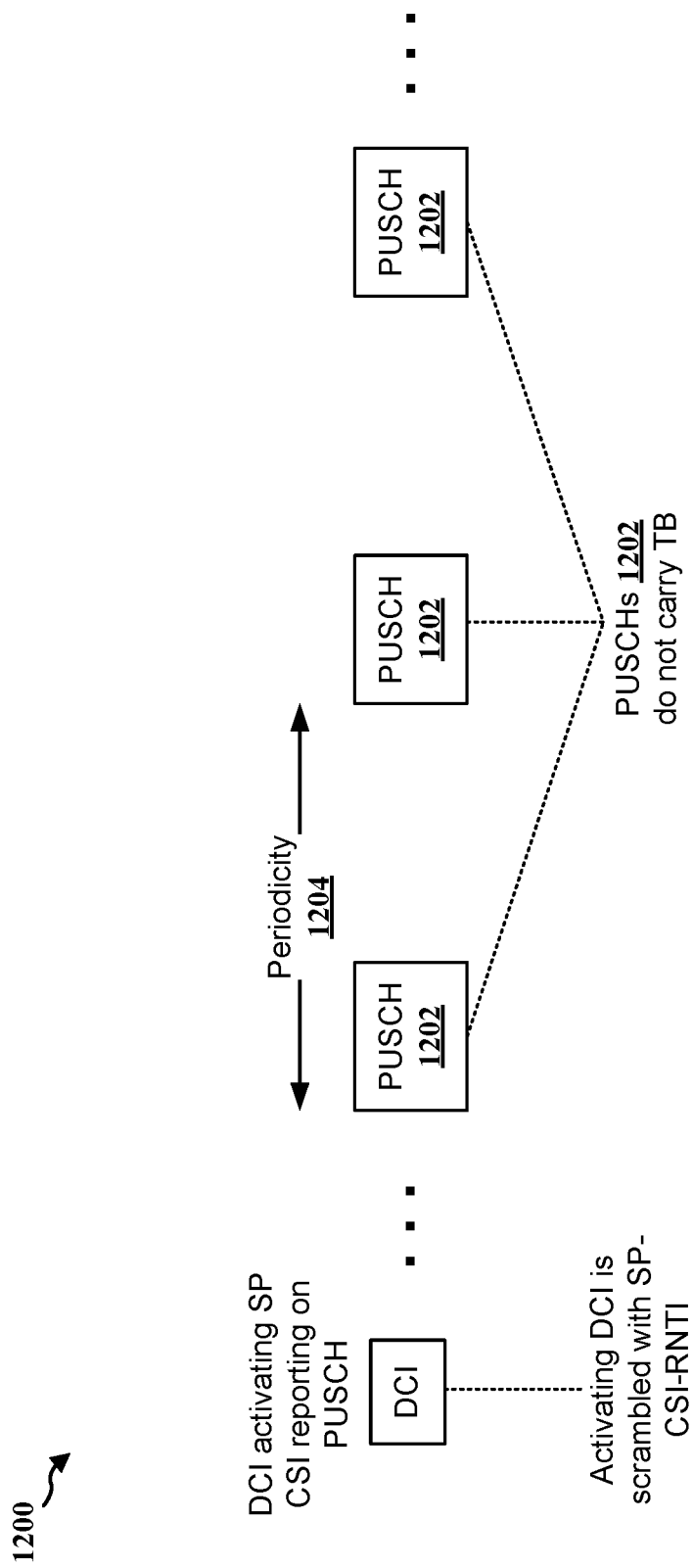
FIG. 12 is a diagram illustrating an example of semi-persistent (SP)-CSI reporting.

FIG. 12 is a diagram 1200 illustrating an example of SP-CSI reporting. After a UE is activated by a base station (or a component of the base station) to transmit SP-CSI report via DCI, the UE may be configured to transmit PUSCHs 1202 periodically carrying CSI reports until another DCI deactivates the SP-CSI reporting. The PUSCHs 1202 carrying CSI reports may not carry TB, and the DCI activating the SP-CSI reporting may be scrambled with SP-CSI radio network temporary identifier (RNTI) (SP-CSI-RNTI). In addition, a periodicity 1204 between two consecutive PUSCHs 1202 may be configured in each CSI report configuration (e.g., with report configuration type set to semiPersistentOnPUSCH) in terms of number of slots (e.g., reportSlotConfig). In some examples, a parameter P0alpha may also be configured per CSI report configuration, which may determine a P0 (offset) and an alpha (factor for partial path loss (PL) compensation) for power control of the PUSCHs that carry the SP-CSI report corresponding to that CSI report configuration.

In one aspect of the present disclosure, when SP-CSI reporting on a PUSCH is activated by an activation DCI, each PUSCH may include one PUSCH repetition, where multiple repetitions (e.g., more than one PUSCH repetition) may not be supported for the SP-CSI reporting on a PUSCH. For example, a UE may assume the number of repetitions is one (1) (e.g., K=1) irrespective of the configured/indicated number of repetitions. In other words, the UE may assume number of repetitions is one irrespective of the value/parameter of numberofrepentions configured for the UE.

Figure 13:
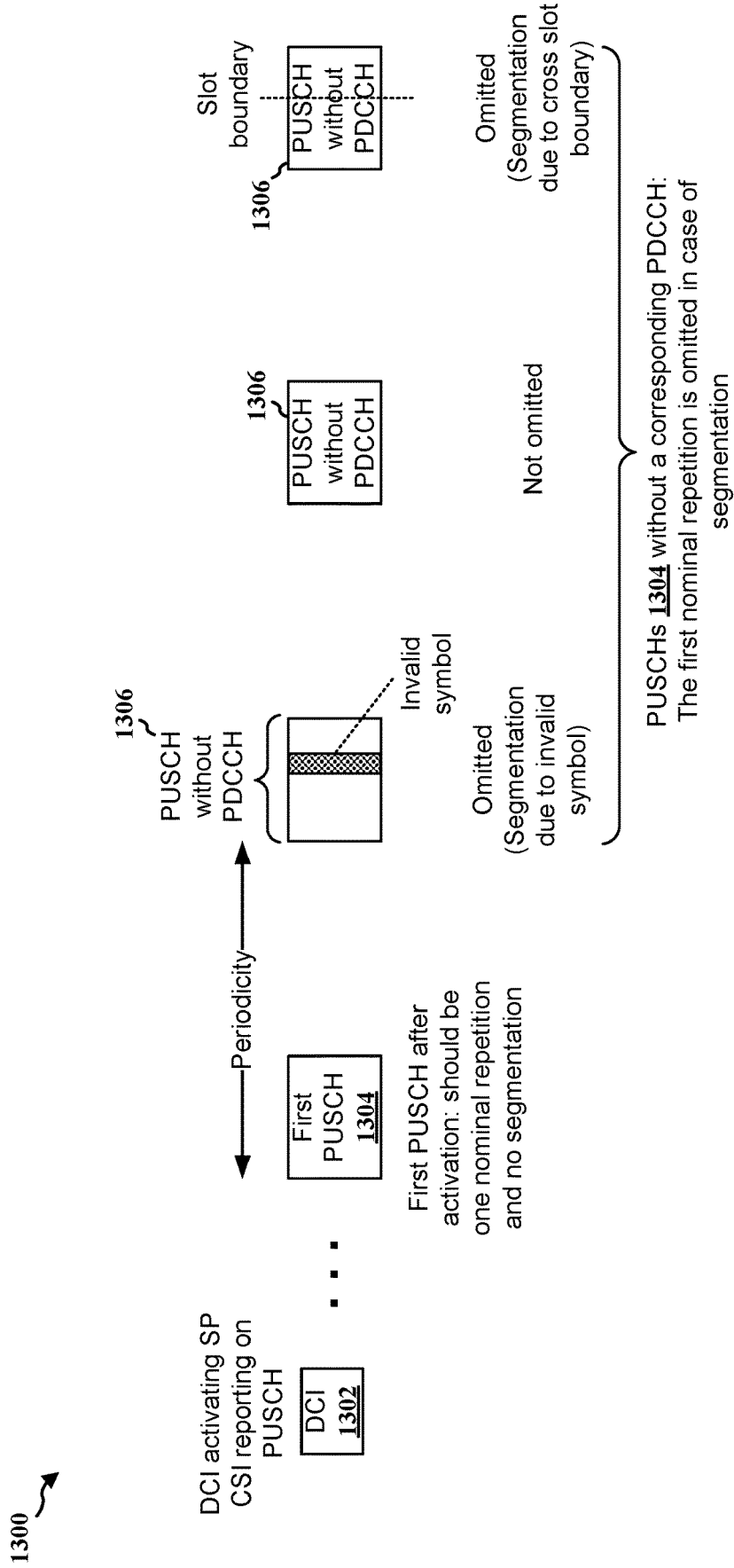
FIG. 13 is a diagram illustrating an example of SP-CSI reporting for PUSCH repetition Type B.

FIG. 13 is a diagram 1300 illustrating an example of SP-CSI reporting for PUSCH repetition Type B. If a UE is configured with PUSCH repetition Type B, after the UE is activated to transmit SP-CSI report on PUSCH (e.g., by a base station via the CSI request field in an activating DCI 1302), the UE may be configured to expect/assume the nominal repetition is to be the same as the actual repetition (e.g., no segmentation) for the first PUSCH 1304 after the activation. Then, for PUSCHs 1306 carrying SP-CSI report(s) without a corresponding PDCCH after the activation (e.g., any PUSCH after the first PUSCH 1304), if the nominal repetition (e.g., the first nominal repetition) is not the same as the first actual repetition, the nominal repetition may be omitted by the UE. For example, if a nominal repetition for a PUSCH 1306 includes an invalid symbol or crosses a slot boundary, the nominal repetition may be divided into two actual repetitions, resulting in the nominal repetition not having the same length as the first actual repetition. Thus, the UE may be configured to omit the nominal repetition.

In some examples, for a single DCI (s-DCI) based multi-TRP PUSCH repetition Type A and B, if a DCI schedules AP-CSI reporting for a UE and the DCI also indicates PUSCH repetitions associated with multiple TRPs, the UE may be configured to multiplex the AP-CSI report on a first PUSCH repetition corresponding to a first beam (e.g., UL/transmitting beam) of the UE and multiplex the AP-CSI report on the X-th PUSCH repetition corresponding to a second beam of the UE. In one example, for PUSCH repetition Type A, if X equals to one (e.g., X=1), then the first PUSCH repetition may correspond to the second beam.

In another example, for PUSCH repetition Type B, the first actual PUSCH repetition may be configured to correspond to a first beam and the X-th actual repetition may be configured to correspond to a second beam. In such an example, the UE may not expect the first actual repetition corresponding to the first beam and the X-th actual repetition corresponding to the second beam to have a single symbol duration. In addition, the UE may also expect the first actual repetition corresponding to the first beam and the X-th actual repetition corresponding to the second beam to have the same number of symbols. In some examples, X may be equal to one (e.g., X=1) or X may be equal to the first actual repetition corresponding to the second beam that contains the same number of symbols as the first actual repetition with the first beam.

To improve the reliability and efficiency of multi-beam (or multi-TRP) PUSCH repetitions (i.e., transmission of PUSCH repetitions to different TRPs, panels, and/or antennas), a UE may be configured to transmit AP-CSI and/or SP-CSI in more than one PUSCH repetition so that the CSI report(s) may benefit from multi-beam diversity. For example, by configuring a UE to transmit one or more CSI reports in different PUSCH repetitions associated with different transmitting beams and/or transmission power parameters to different TRPS/panels/antennas of a base station, if a link to one of the TRPS/panels/antennas is blocked, the one or more CSI reports may still be received by the base station via other TRPs/panels/antennas.

Figure 14:
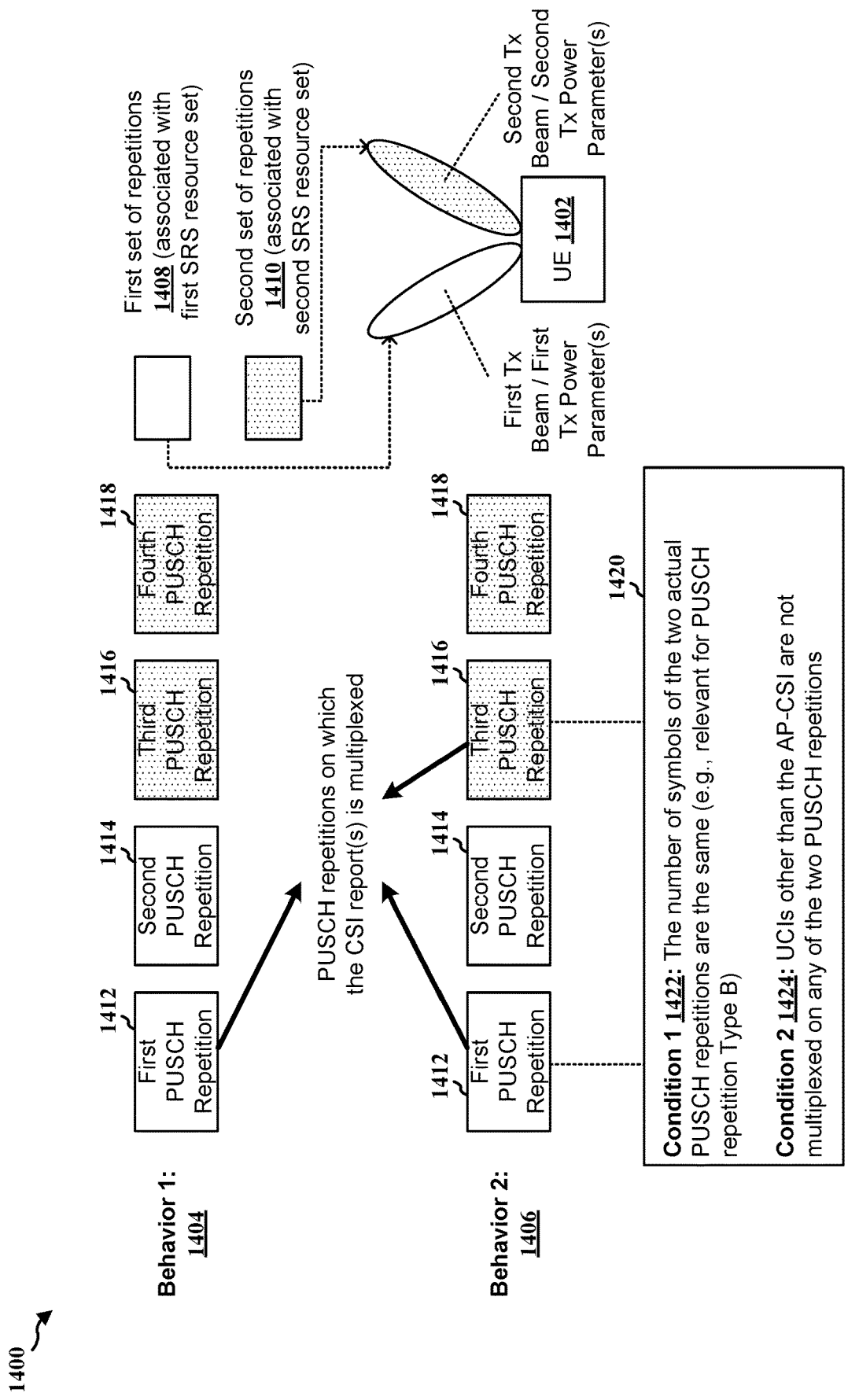
FIG. 14 is a diagram illustrating an example of different UE configurations/behaviors for multiplexing one or more CSI reports on multi-beam or multi-transmission reception point (multi-TRP) PUSCH repetitions.

FIG. 14 is a diagram 1400 illustrating an example of different UE configurations/behaviors for multiplexing one or more CSI reports on multi-beam (or multi-TRP) PUSCH repetitions. In one example, a UE 1402 may be configured with a set of four (4) PUSCH repetitions, which may include a first PUSCH repetition 1412, a second PUSCH repetition 1414, a third PUSCH repetition 1416, and a fourth PUSCH repetition 1418. The first PUSCH repetition 1412 and the second PUSCH repetition 1414 may belong to a first set of PUSCH repetitions 1408, which may be associated with a first SRS resource set (e.g., associated with a first transmitting beam and/or first transmission power parameter(s) for transmitting to a first TRP). The third PUSCH repetition 1416 and the fourth PUSCH repetition 1418 may belong to a second set of PUSCH repetitions 1410, which may be associated with a second SRS resource set (e.g., associated with a second transmitting beam and/or second transmission power parameter(s) for transmitting to a second TRP).

In one example, the UE 1402 may be indicated or configured (e.g., by a base station or based on a pre-configuration or setting) to apply a first behavior 1404 (e.g., configuration or setting) or a second behavior 1406 regarding how CSI report(s) is to be multiplexed with PUSCH repetition(s).

Under the first behavior 1404 (e.g., behavior 1), the UE 1402 may multiplex one or more CSI reports (e.g., AP-CSI report(s) or SP-CSI report) on a first (e.g., an earliest) PUSCH repetition (e.g., the first PUSCH among multiple PUSCH repetitions). For example, under the first behavior 1404, the UE 1402 may multiplex one or more CSI reports on the first PUSCH repetition 1412, such that the UE 1402 may transmit one or more CSI reports to the first TRP based on the first transmitting beam and/or the first transmission power parameter(s). Under the second behavior 1406 (e.g., behavior 2), the UE 1402 may multiplex the one or more CSI reports on the first (e.g., an earliest) PUSCH repetition associated with the first SRS resource set (e.g., with the first transmitting beam and/or the first transmission power parameter(s)) and on the first (earliest) PUSCH repetition associated with the second SRS resource set (e.g., with the second transmitting beam and/or the second transmission power parameter(s)). For example, under the second behavior 1406, the UE 1402 may multiplex one or more CSI reports on the first PUSCH repetition 1412 as the first PUSCH repetition 1412 is the first PUSCH repetition associated with the first SRS resource set, such that the UE 1402 may transmit one or more CSI reports to the first TRP based on the first transmitting beam and/or the first transmission power parameter(s). The UE 1402 may also multiplex the one or more CSI reports on the third PUSCH repetition 1416 as the third PUSCH repetition 1416 is the first PUSCH repetition associated with the second SRS resource set, such that the UE 1402 may transmit the one or more CSI reports to the second TRP based on the second transmitting beam and/or the second transmission power parameter(s).

In one example, as shown at 1420, the UE 1402 may be configured to apply the second behavior 1406 if the UE 1402 satisfies a first condition 1422 and a second condition 1424, where the first condition 1422 may indicate that the number of symbols of the two actual PUSCH repetitions are the same (e.g., relevant for PUSCH repetition Type B) and the second condition 1424 may indicate that UCIs other than the AP-CSI are not multiplexed on any of the two PUSCH repetitions. For example, to satisfy the first condition 1422 for applying the second behavior 1406, the number of symbols for the first PUSCH repetition 1412 and the third PUSCH repetition 1416 may be the same. To satisfy the second condition 1424 for applying the second behavior 1406, the first PUSCH repetition 1412 and the third PUSCH repetition 1416 may not be multiplexed with UCIs other than the AP-CSI. If at least one of the first condition 1422 or the second condition 1424 is not met, the UE 1402 may not be able to determine whether to multiplex the one or more CSI reports and/or which PUSCH repetition(s) to multiplex with the one or more CSI reports, etc.

As the first condition 1422 and/or the second condition 1424 may not be satisfied due to PUSCH repetition segmentation (e.g., for PUSCH repetition Type B where the length of an actual repetition may vary after segmentation) and other UCIs other than CSI being multiplexed on PUSCH repetitions, aspects presented herein may enable a UE to determine whether to multiplex the one or more CSI reports and/or which PUSCH repetition(s) to multiplex with the one or more CSI reports when at least one of the first condition 1422 or the second condition 1424 is not satisfied.

In one aspect of the present disclosure, a UE may receive a DCI that schedules multiple PUSCH repetitions, where the multiple PUSCH repetitions may include two sets of PUSCH repetitions, such as described in connection with FIG. 14. The first set of PUSCH repetitions may be associated with a first SRS resource set (e.g., associated with a first UL beam and/or a first set of power control parameters) and the second set of PUSCH repetitions may be associated with a second SRS resource set (e.g., associated with a second UL beam and/or a second set of power control parameters). The two sets of PUSCH repetitions may correspond to different UL transmission parameters, such as different UL beam/different sets of power control parameters).

When the DCI also requests the UE to provide AP-CSI report(s) (e.g., by the "CSI request" field in the DCI as described in connection with FIG. 9) and the UE is indicated/configured to multiplex CSI report(s) on one PUSCH repetition (e.g., a first PUSCH repetition) associated with the first SRS resource set and on one PUSCH repetition (e.g., a first PUSCH repetition) associated with the second SRS resource set (e.g., similar to the second behavior 1406), the UE may determine which of the two PUSCH repetitions to multiplex with the CSI report(s) based at least in part on a number of symbols for the PUSCH repetitions (e.g., the actual repetition), a number of bits for the PUSCH repetitions, number of resource elements (REs) for the PUSCH repetitions, and/or whether UCI other than CSI are multiplexed on the PUSCH repetitions, etc.

In one aspect of the present disclosure, if the number of symbols of the two PUSCH repetitions (e.g., actual PUSCH repetitions) are different (e.g., the first condition 1422 discussed in connection with FIG. 14 is not satisfied), the UE may be configured to not multiplex AP-CSI on an actual PUSCH repetition that has a smaller number of symbols.

In another aspect of the present disclosure, if UCIs other than the AP-CSI are multiplexed on any of the two PUSCH repetitions (e.g., the second condition 1424 discussed in connection with FIG. 14 is not satisfied), the UE may be configured to not multiplex AP-CSI on an actual PUSCH repetition that has a larger number of bits of the other UCIs. In another aspect of the present disclosure, as an alternative, the UE may be configured to drop the other UCIs on both PUSCH repetitions, and the UE may multiplex the AP-CSI on both PUSCH repetitions.

In another aspect of the present disclosure, if the number of symbols of the two PUSCH repetitions (e.g., actual PUSCH repetitions) are different and UCIs other than the AP-CSI are multiplexed on any of the two PUSCH repetitions (e.g., both the first condition 1422 and the second condition 1424 discussed in connection with FIG. 14 are not satisfied), the UE may be configured to not multiplex AP-CSI on an actual PUSCH repetition that has less available REs (may exclude DMRS and other UCIs).

Figure 15:
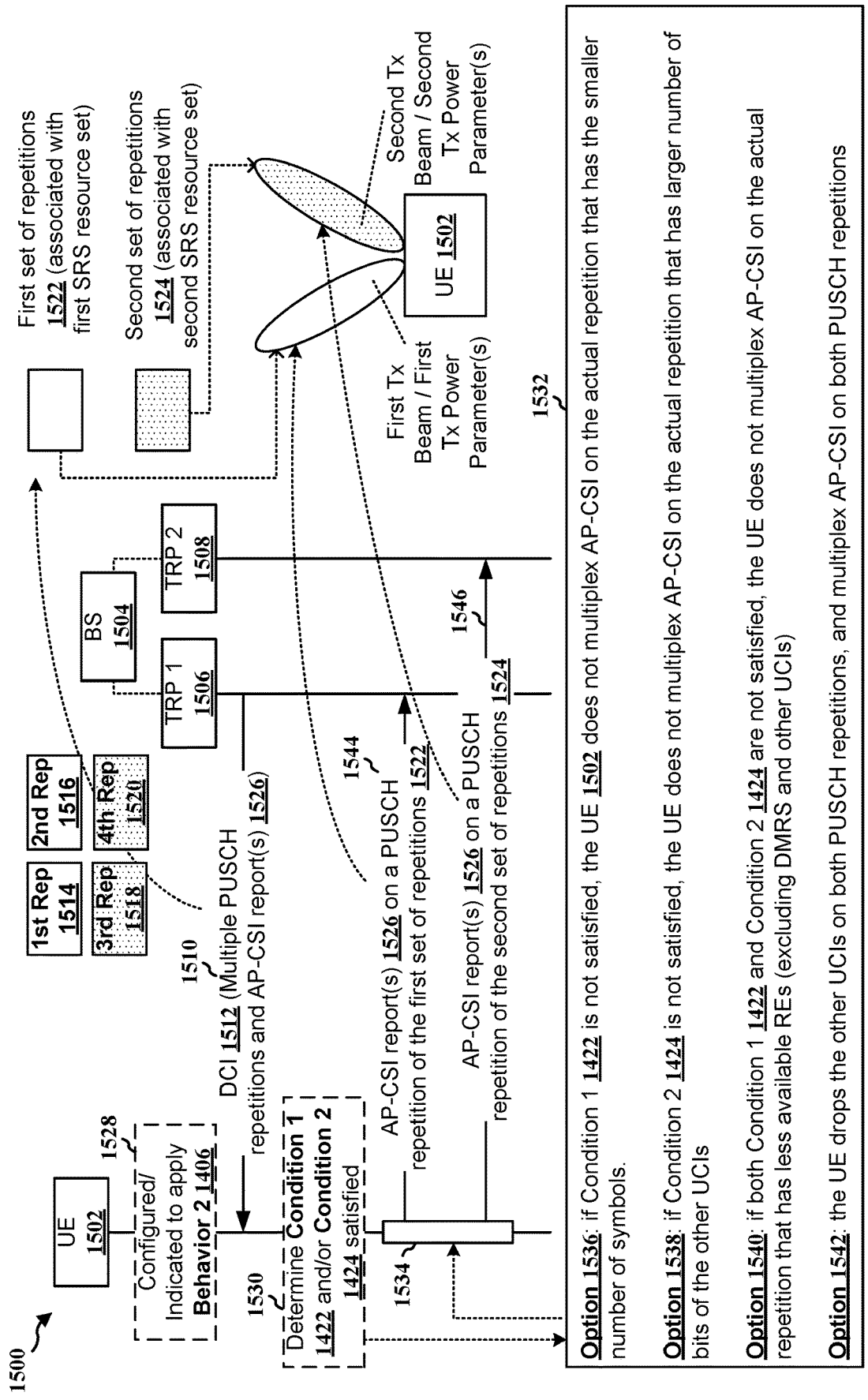
FIG. 15 is a communication flow between a UE and multiple TRPs of a base station according to aspects of the present disclosure.

FIG. 15 is a communication flow 1500 between a UE and multiple TRPs of a base station according to aspects of the present disclosure. In one example, a UE 1502 may be communicating with a base station 1504 via a first TRP 1506 and a second TRP 1508 of the base station 1504. As such, the UE 1502 may transmit or receive data with the base station 1504 via at least one of the two TRPs. For example, the UE 1502 may receive data from or transmit data to the base station 1504 via the first TRP 1506, the second TRP 1508, or both the first TRP 1506 and the second TRP 1508, etc. In some examples, the first TRP 1506 and the second TRP 1508 may be different antennas of the base station 1504. In other examples, the first TRP 1506 and the second TRP 1508 may be different panels (e.g., antenna panels) of the base station 1504. As described in connection with FIG. 1, in some aspects, a base station may include disaggregated components, such as a CU, one or more DUs, one or more RUs, one or more TRPs, one or more relays, one or more intelligent reflective surfaces, and/or a combination thereof. As such, for purposes of the present disclosure, the term "base station" may include component(s) of a base station. In some examples, the term "base station" may also be used interchangeably with the term "network entity" or "network node," which may refer to or include one or more disaggregated components of a base station.

At 1510, the UE 1502 may receive DCI 1512 from the base station 1504, such as via one of the first TRP 1506 or the second TRP 1508. The DCI 1512 may schedule multiple (or a set of) PUSCH repetitions that include at least two sets of PUSCH repetitions, such as described in connection with FIG. 14. For example, the UE 1502 may be configured with a set of four (4) PUSCH repetitions, which may include a first PUSCH repetition 1514, a second PUSCH repetition 1516, a third PUSCH repetition 1518, and a fourth PUSCH repetition 1520. The first PUSCH repetition 1514 and the second PUSCH repetition 1516 may belong to a first set of PUSCH repetitions 1522, which may be associated with a first SRS resource set, e.g., associated with a first transmitting beam and/or a first set of power control parameters for transmitting to the first TRP 1506. The third PUSCH repetition 1518 and the fourth PUSCH repetition 1520 may belong to a second set of PUSCH repetitions 1524, which may be associated with a second SRS resource set, e.g., associated with a second transmitting beam and/or a second set of power control parameters for transmitting to the second TRP 1508. As such, the two sets of PUSCH repetitions 1522 and 1524 may correspond to different uplink transmission parameters, such as different transmitting beams and/or different sets of power control parameters. In addition, the DCI 1512 may also request/indicate the UE 1502 to provide one or more AP-CSI reports 1526 (e.g., by the "CSI request" field in the DCI as described in connection with FIG. 9).

As shown at 1528, the UE 1502 may also be indicated/configured (e.g., by the base station 1504 or pre-configuration, etc.) to multiplex one or more CSI reports, such as the AP-CSI reports 1526, on one PUSCH repetition associated with the first SRS resource set (e.g., a PUSCH repetition from the first set of PUSCH repetitions 1522) and on one PUSCH repetition associated with the second SRS resource set (e.g., a PUSCH repetition from the second set of PUSCH repetitions 1524). In other words, the UE 1502 may be configured to apply the second behavior 1406, as described in connection with FIG. 14.

At 1530, the UE 1502 may determine whether a number of symbols for one PUSCH repetition of the first set of PUSCH repetitions 1522 and one PUSCH repetition of the second set of PUSCH repetitions 1524 are the same or different. For example, the UE 1502 may determine whether a first PUSCH repetition of the first set of PUSCH repetitions 1522 (e.g., first PUSCH repetition 1514) and a first PUSCH repetition of the second set of PUSCH repetitions 1524 (e.g., the third PUSCH repetition 1518) have same (or different) number of symbols. In other words, the UE may determine whether the first PUSCH repetition 1514 and the third PUSCH repetition 1518 meet the first condition 1422, as described in connection with FIG. 14. The UE 1502 may also determine whether UCIs other than the AP-CSI are multiplexed on any of the one PUSCH repetition of the first set of PUSCH repetitions 1522 and the one PUSCH repetition of the second set of PUSCH repetitions 1524. For example, the UE 1502 may determine whether UCIs other than AP-CSI are multiplexed on any of the first PUSCH repetition 1514 and the third PUSCH repetition 1518. In other words, the UE may determine whether the first PUSCH repetition 1514 and the third PUSCH repetition 1518 meet the second condition 1424, as described in connection with FIG. 14.

At 1532, the UE 1502 may determine whether to multiplex the one or more AP-CSI reports 1526 on one PUSCH repetition of the first set of PUSCH repetitions 1522 and one PUSCH repetition of the second set of PUSCH repetitions 1524 (collectively as "the two PUSCH repetitions") based on whether the first condition 1422 and/or the second condition 1424 are met (e.g., determined at 1530), and further based on a number of symbols for the two PUSCH repetitions (e.g., the actual repetition), a number of bits for the two PUSCH repetitions, and/or a number of REs for the two PUSCH repetitions.

In one example, as shown by an option 1536 (e.g., Option 1A), if the number of symbols of the two PUSCH repetitions (e.g., actual PUSCH repetitions) are different (e.g., the first condition 1422 is not satisfied), the UE 1502 may be configured to not multiplex AP-CSI on an actual PUSCH repetition that has a smaller number of symbols. For example, if the two PUSCH repetitions include the first PUSCH repetition 1514 of the first set of PUSCH repetitions 1522 and the third PUSCH repetition 1518 of the second set of PUSCH repetitions 1524, and the first PUSCH repetition 1514 has a smaller/lesser number of symbols compared to the third PUSCH repetition 1518, the UE 1502 may be configured to refrain from multiplexing the one or more AP-CSI reports 1526 on the first PUSCH repetition 1514, and may multiplex the one or more AP-CSI reports 1526 on the third PUSCH repetition 1518. Then, at 1534, the UE 1502 may transmit the third PUSCH repetition 1518 that is multiplexed with the one or more AP-CSI reports 1526 to the second TRP 1508 based on the second transmitting beam and/or the second set of power control parameters, as shown at 1546.

In another example, as shown by an option 1538 (e.g., Option 1B), if UCIs other than the AP-CSI are multiplexed on any of the two PUSCH repetitions (e.g., the second condition 1424 is not satisfied), the UE 1502 may be configured to not multiplex AP-CSI on an actual PUSCH repetition that has a larger number of bits of the other UCIs. For example, if the two PUSCH repetitions include the first PUSCH repetition 1514 and the third PUSCH repetition 1518, and the first PUSCH repetition 1514 include UCIs that are not AP-CSI and have more bits than UCIs (e.g., UCIs other than AP-CSI) in the third PUSCH repetition 1518, the UE 1502 may be configured to refrain from multiplexing the one or more AP-CSI reports 1526 on the first PUSCH repetition 1514, and may multiplex the one or more AP-CSI reports 1526 on the third PUSCH repetition 1518. Then, at 1534, the UE 1502 may transmit the third PUSCH repetition 1518 that is multiplexed with the one or more AP-CSI reports 1526 to the second TRP 1508 based on the second transmitting beam and/or the second set of power control parameters, as shown at 1546. In another example, if the third PUSCH repetition 1518 includes UCIs that are not AP-CSI and the first PUSCH repetition 1514 does not include UCIs that are not AP-CSI, then the third PUSCH repetition 1518 may have a larger number of bits of the other UCIs. As such, the UE 1502 may be configured to refrain from multiplexing the one or more AP-CSI reports 1526 on the third PUSCH repetition 1518, and may multiplex the one or more AP-CSI reports 1526 on the first PUSCH repetition 1514. Then, at 1534, the UE 1502 may transmit the first PUSCH repetition 1514 that is multiplexed with the one or more AP-CSI reports 1526 to the first TRP 1506 based on the first transmitting beam and/or the first set of power control parameters, as shown at 1544.

In one example, as shown by an option 1540 (e.g., Option 1C), if the number of symbols of the two PUSCH repetitions (e.g., actual PUSCH repetitions) are different (e.g., the first condition 1422 is not satisfied) and if UCIs other than the AP-CSI are multiplexed on any of the two PUSCH repetitions (e.g., the second condition 1424 is not satisfied), the UE 1502 may be configured to not multiplex AP-CSI on an actual PUSCH repetition that has less available REs (excluding DMRS and other UCIs). For example, the two PUSCH repetitions may include the first PUSCH repetition 1514 and the third PUSCH repetition 1518, where the first PUSCH repetition 1514 and the third PUSCH repetition 1518 may not have same number of symbols (e.g., the first condition 1422 is not met) and at least one of the first PUSCH repetition 1514 and the third PUSCH repetition 1518 may include (e.g., multiplexed with) UCIs other than AP-CSI (e.g., the second condition 1424 is not met). If the first PUSCH repetition 1514 has less available REs compared to the third PUSCH repetition 1518, the UE 1502 may be configured to refrain from multiplexing the one or more AP-CSI reports 1526 on the first PUSCH repetition 1514, and may multiplex the one or more AP-CSI reports 1526 on the third PUSCH repetition 1518. Then, at 1534, the UE 1502 may transmit the third PUSCH repetition 1518 that is multiplexed with the one or more AP-CSI reports 1526 to the second TRP 1508 based on the second transmitting beam and/or the second set of power control parameters, as shown at 1546.

In another example, as shown by an option 1542 (e.g., Option 2), if UCIs other than the AP-CSI are multiplexed on any of the two PUSCH repetitions (e.g., the second condition 1424 is not satisfied), the UE 1502 may be configured to drop UCIs other than the AP-CSI, and the UE 1502 may multiplex AP-CSI on both PUSCH repetitions. For example, if the two PUSCH repetitions include the first PUSCH repetition 1514 and the third PUSCH repetition 1518, and if one of or both of the first PUSCH repetition 1514 and the third PUSCH repetition 1518 include UCIs that are not AP-CSI, the UE 1502 may drop UCIs that are not AP-CSI from the first PUSCH repetition 1514 and/or the third PUSCH repetition 1518. Then, the UE 1502 may multiplex the one or more AP-CSI reports on both the first PUSCH repetition 1514 and the third PUSCH repetition 1518. Then, at 1534, the UE 1502 may transmit the first PUSCH repetition 1514 that is multiplexed with the one or more AP-CSI reports 1526 to the first TRP 1506 based on the first transmitting beam and/or the first set of power control parameters, as shown at 1544, and the UE 1502 may also transmit the third PUSCH repetition 1518 that is multiplexed with the one or more AP-CSI reports 1526 to the second TRP 1508 based on the second transmitting beam and/or the second set of power control parameters, as shown at 1546. Note that a network entity (e.g., the base station 1504) or a UE (e.g., the UE 1502) may be configured to apply one or more of the options 1536, 1538, 1540, or 1546 depending on implementations.

In another aspect of the present disclosure, a UE may receive a DCI (e.g., the DCI 1512) that schedules AP-CSI reports on PUSCH with no transport block (e.g., via a CSI request field of the DCI). In addition, two SRS resource sets corresponding to two sets of transmission parameters (e.g., two UL beams and/or two power control parameters, etc.) may be indicated to the UE and the UE may be configured to apply the second behavior 1406. In one example, if both the first condition 1422 (e.g., the number of symbols of the two actual PUSCH repetitions are the same) and the second condition 1424 (e.g., UCIs other than the AP-CSI are not multiplexed on any of the two PUSCH repetitions) are not satisfied, the UE may assume that the number of repetitions is one (1) irrespective of the indicated number of repetitions (e.g., indicated number of repetitions not equal to one may be ignored). Then, the UE may be configured to transmit the AP-CSI reports on the one PUSCH repetition.

In another example, if both the first condition 1422 and the second condition 1424 are not satisfied, the UE may assume that the number of repetitions is two (2) irrespective of the indicated number of repetitions (e.g., indicated number of repetitions not equal to two may be ignored), and the UE may be configured to apply one of the options 1536, 1538, 1540, and 1542 described in connection with FIG. 15. For example, as described in connection with the option 1536 (e.g., Option 1A), the UE 1502 may be configured to not multiplex AP-CSI on an actual PUSCH repetition that has the smaller number of symbols. In another example, as described in connection with the option 1538 (e.g., Option 1B), the UE 1502 may be configured to not multiplex AP-CSI on an actual PUSCH repetition that has a larger number of bits of the other UCIs. In another example, as described in connection with the option 1540 (e.g., Option 1C), the UE 1502 may be configured to not multiplex AP-CSI on an actual repetition that has a lesser amount of available REs (e.g., excluding DMRS and other UCIs). In another example, as described in connection with the option 1542 (e.g., Option 2), the UE 1502 may be configured the to drop the other UCIs (e.g., UCIs other than AP-CSI) on both PUSCH repetitions, and multiplex AP-CSI on both PUSCH repetitions.

In one example, for options 1536, 1538, and 1540 (e.g., Option 1A, 1B, 1C), the UE may additionally be configured to drop the whole PUSCH repetition (e.g., not transmitting the PUSCH repetition) if the PUSCH repetition is not being multiplexed with the AP-CSI, and which PUSCH repetition to drop may depend on the options 1536, 1538, 1540, and 1542. For example, the UE may apply the option 1536 (e.g., not to multiplex AP-CSI on an actual PUSCH repetition that has the smaller number of symbols) to a first PUSCH repetition and a second PUSCH repetition. If the first PUSCH repetition has a lesser number of symbols compared to the second PUSCH repetition, the UE may multiplex the AP-CSI report(s) on the second PUSCH repetition, and the UE may drop the first PUSCH repetition. Then, the UE may transmit the second PUSCH repetition that is multiplexed with the AP-CSI report(s), such as based on a second transmitting beam and/or a second set of power control parameters to a second TRP, as described in connection with FIG. 15. The whole PUSCH repetition may be dropped as the PUSCH is without TB. In another example, if the UE applies the option 1542, the UE may drop the other UCIs on both PUSCH repetitions, and the UE may multiplex AP-CSI on both PUSCH repetitions. In some examples, a PUSCH with no TB may be indicated by an UL-SCH indicator of the DCI being set to zero (0).

In another aspect of the present disclosure, if a DCI activates an SP-CSI report (e.g., the cyclic redundancy check (CRC) of the DCI is scrambled with SP-CSI-RNTI), a UE may be configured to transmit two PUSCH repetitions in each instance of the SP-CSI report on a PUSCH (in each periodicity), where the UE may assume that the number of repetitions is two (2) irrespective of the indicated number of repetitions (e.g., indicated number of repetitions not equal to two may be ignored). For example, the UE may transmit the SP-CSI report on both of the two PUSCH repetitions. This configuration is different from another configuration described above where each PUSCH may include just one PUSCH repetition and multiple repetitions (e.g., more than one PUSCH repetition) are not be supported for the SP-CSI reporting on a PUSCH (e.g., the UE assume number of repetitions is one irrespective of the value/parameter of numberofrepetitions configured for the UE).

For the PUSCH repetition Type B, in one aspect of the present disclosure (e.g., choice 1), the UE may be configured to expect/assume that the first condition 1422 and the second condition 1424 are satisfied for the first PUSCH after DCI activation (e.g., the first PUSCH 1304 described in connection with FIG. 13), where both a first and a second nominal repetitions are the same as a first and a second actual repetitions (e.g., so they have a same number of symbols), respectively, for the first PUSCH after activation, and there are no other UCIs other than SP-CSI multiplexed on any of the two PUSCH repetitions. Then, for the PUSCHs without a corresponding PDCCH after being activated on PUSCH by a CSI request field on a DCI (e.g., for PUSCHs 1306 after the first PUSCH 1304 described in connection with FIG. 13), if the first condition 1422 and the second condition 1424 are not satisfied, the UE may apply at least one of the following choices.

In one example (e.g., choice 1-1), the UE may apply one of the options 1536, 1538, and 1540 (e.g., Option 1A, 1B and 1C) described in connection with FIG. 15, where the UE may be refrained from multiplexing SP-CSI report on an actual PUSCH repetition that has a smaller number of symbols, a larger number of bits of the other UCIs, or less available REs, and the UE may omit the PUSCH repetition that is not multiplexed with the SP-CSI report (e.g., which repetition to omit depends on options 1536, 1538, and 1540). In other words, of the two PUSCH repetitions, the UE may be configured to multiplex the SP-CSI report on a PUSCH repetition that has a larger number of symbols, a lesser number of bits of the other UCIs (or no other UCIs), or more available REs, and the UE may omit the other PUSCH repetition that is not multiplexed with the SP-CSI report. In another example (e.g., choice 1-2), the UE may be configured to drop UCIs other than SP-CSI on both PUSCH repetitions, and the UE may multiplex the SP-CSI report on both PUSCH repetitions.

In one aspect of the present disclosure (e.g., choice 2-1), for the PUSCH repetition Type B, the UE may be configured to not distinguish the first PUSCH after DCI activation (e.g., the first PUSCH 1304) and other PUSCHs (e.g., the PUSCHs 1306 without corresponding PDCCH). Then, for all the PUSCH occasions, if the first condition 1422 and the second condition 1424 are not satisfied, in one example (e.g., choice 2-1), the UE may apply one of the options 1536, 1538, and 1540 (e.g., Option 1A, 1B and 1C) described in connection with FIG. 15, where the UE may be refrained from multiplexing SP-CSI report on an actual PUSCH repetition that has a smaller number of symbols, a larger number of bits of the other UCIs, or less available REs, and the UE may omit the PUSCH repetition that is not multiplexed with the SP-CSI report (e.g., which repetition to omit depends on options 1536, 1538, and 1540). In other words, of the two PUSCH repetitions, the UE may be configured to multiplex the SP-CSI report on a PUSCH repetition that has a larger number of symbols, a lesser number of bits of the other UCIs (or no other UCIs), or more available REs, and the UE may omit the other PUSCH repetition that is not multiplexed with the SP-CSI report. In another example (e.g., choice 2-2), the UE may be configured to drop UCIs other than SP-CSI on both PUSCH repetitions, and the UE may multiplex the SP-CSI report on both PUSCH repetitions.

Figure 16:
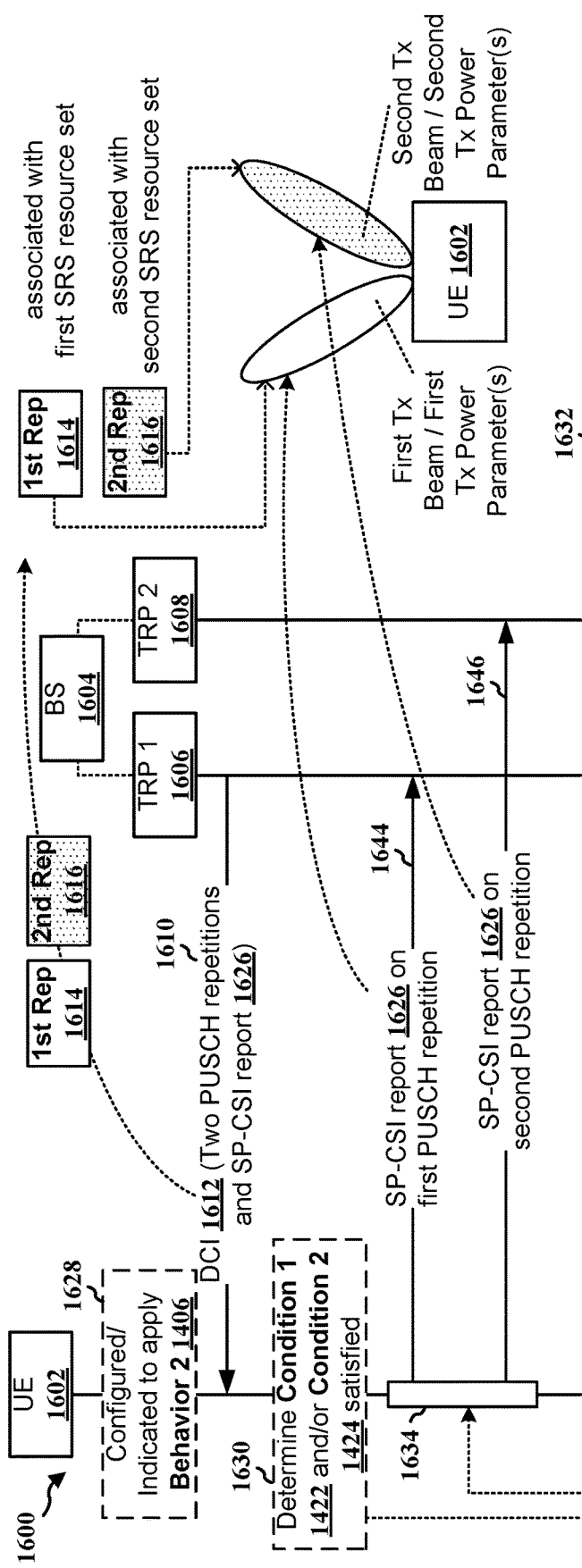
FIG. 16 is a communication flow between a UE and multiple TRPs of a base station according to aspects of the present disclosure.

FIG. 16 is a communication flow 1600 between a UE and multiple TRPs of a base station according to aspects of the present disclosure. In one example, a UE 1602 may be communicating with a base station 1604 via a first TRP 1606 and a second TRP 1608 of the base station 1604. As such, the UE 1602 may transmit or receive data with the base station 1604 via at least one of the two TRPs. For example, the UE 1602 may receive data from or transmit data to the base station 1604 via the first TRP 1606, the second TRP 1608, or both the first TRP 1606 and the second TRP 1608, etc. In some examples, the first TRP 1606 and the second TRP 1608 may be different antennas of the base station 1604. In other examples, the first TRP 1606 and the second TRP 1608 may be different panels (e.g., antenna panels) of the base station 1604. As described in connection with FIG. 1, in some aspects, a base station may include disaggregated components, such as a CU, one or more DUs, one or more RUs, one or more TRPs, one or more relays, one or more intelligent reflective surfaces, and/or a combination thereof. As such, for purposes of the present disclosure, the term "base station" may include component(s) of a base station. In some examples, the term "base station" may also be used interchangeably with the term "network entity" or "network node," which may refer to or include one or more disaggregated components of a base station.

At 1610, the UE 1602 may receive a DCI 1612 from the base station 1604, such as via one of the first TRP 1606 or the second TRP 1608. The DCI 1612 may request/indicate the UE 1602 to provide an SP-CSI report 1626. For example, the CRC of the DCI 1610 may be scrambled with an SP-CSI-RNTI. In other words, the UE 1602 may be configured with SP-CSI reporting by the DCI 1612 as described in connection with FIG. 11, which may be different from the AP-CSI reporting described in connection with FIGS. 9 and 15 where the DCI (e.g., the DCI 1512) triggers AP-CSI reporting (or triggers CSI reporting on-demand). Aspects described in connection with FIG. 16 may enable the UE 1602 to determine how to treat the first PUSCH after DCI activation. Then, the UE 1602 may determine how to multiple CSI reports on PUSCH repetitions similar to aspects described in connection with FIG. 15 (e.g., for AP-CSI reporting). In addition, the DCI 1612 may also configure the UE 1602 to transmit two PUSCH repetitions in each instance of an SP-CSI report on a PUSCH (e.g., for each periodicity), which may include a first PUSCH repetition 1614 and a second PUSCH repetition 1616. In one example, the first PUSCH repetition 1614 may be associated with a first SRS resource set, e.g., associated with a first transmitting beam and/or a first set of power control parameters for transmitting to the first TRP 1606, and the second PUSCH repetition 1616 may be associated with a second SRS resource set, e.g., associated with a second transmitting beam and/or a second set of power control parameters for transmitting to the second TRP 1608. As such, the two PUSCH repetitions 1614 and 1616 may correspond to different uplink transmission parameters, such as different transmitting beams and/or different sets of power control parameters. In another example, the UE 1602 may be configured to assume that the number of PUSCH repetitions is two (2) irrespective of the indicated number of repetitions (e.g., indicated number of repetitions not equal to two may be ignored). Thus, the UE 1602 may transmit the SP-CSI report 1626 on both PUSCH repetitions.

As shown at 1628, the UE 1602 may also be indicated/configured (e.g., by the base station 1604 or pre-configuration, etc.) to multiplex one or more CSI reports, such as the SP-CSI report 1626, on a PUSCH repetition associated with the first SRS resource set (e.g., the first PUSCH repetition 1614) and on a PUSCH repetition associated with the second SRS resource set (e.g., the second PUSCH repetitions 1616). In other words, the UE 1602 may be configured to apply the second behavior 1406, as described in connection with FIG. 14.

At 1630, the UE 1602 may determine whether a number of symbols for the first PUSCH repetition 1614 and the second PUSCH repetition 1616 are the same. In other words, the UE may determine whether the first PUSCH repetition 1614 and the second PUSCH repetition 1616 meet the first condition 1422, as described in connection with FIG. 14. The UE 1602 may also determine whether UCIs other than the SP-CSI are multiplexed on any of the first PUSCH repetition 1614 and the second PUSCH repetition 1616. In other words, the UE may determine whether the first PUSCH repetition 1614 and the second PUSCH repetition 1616 meet the second condition 1424, as described in connection with FIG. 14.

At 1632, the UE 1602 may determine whether to multiplex the SP-CSI report 1626 on the first PUSCH repetition 1614 and/or the second PUSCH repetition 1616 (collectively as "the two PUSCH repetitions") based on whether the first condition 1422 and/or the second condition 1424 are met (e.g., determined at 1630), and further based on a number of symbols for the two PUSCH repetitions (e.g., the actual repetition), a number of bits for the two PUSCH repetitions, and/or a number of REs for the two PUSCH repetitions, etc. (e.g., options 1536, 1538, 1540, and 1542).

At 1634, the UE 1602 may transmit the first PUSCH repetition 1614 and/or the second PUSCH repetition 1616 that are multiplexed with the SP-CSI report 1626 to the first TRP 1606 and/or the second TRP 1608 based on the determination, such as shown at 1644 and 1646, respectively.

In one example, for the PUSCH repetition Type B, the UE 1602 may be configured to apply a first choice 1648, where the UE 1602 may be configured to expect/assume that the first condition 1422 and the second condition 1424 are satisfied for the first PUSCH after DCI activation (e.g., the first PUSCH 1304 described in connection with FIG. 13), where both a first and a second nominal repetitions are the same as a first and a second actual repetitions (e.g., the first PUSCH repetition 1614 and the second PUSCH repetition 1616 have a same number of symbols), respectively, for the first PUSCH after activation, and there are no other UCIs other than SP-CSI is multiplexed on any of the two PUSCH repetitions. Then, for the PUSCHs without a corresponding PDCCH after being activated on a PUSCH by a CSI request field on a DCI (e.g., for PUSCHs 1306 after the first PUSCH 1304 described in connection with FIG. 13), if the first condition 1422 and/or the second condition 1424 are not satisfied, in one example (e.g., a choice 1650), the UE 1602 may apply one of the options 1536, 1538, and 1540 (e.g., Option 1A, 1B, and 1C) described in connection with FIG. 15, where the UE 1602 may be refrained from multiplexing the SP-CSI report on an actual PUSCH repetition that has a smaller number of symbols, a larger number of bits of the other UCIs, or less available REs, and the UE 1602 may omit the PUSCH repetition that is not multiplexed with the SP-CSI report 1626 (e.g., which repetition to omit depends on options 1536, 1538, and 1540). In other words, of the two PUSCH repetitions, the UE 1602 may be configured to multiplex the SP-CSI report 1626 on a PUSCH repetition that has a larger number of symbols, a lesser number of bits of the other UCIs (or no other UCIs), or more available REs, and the UE may omit the other PUSCH repetition that is not multiplexed with the SP-CSI report. In another example (e.g., a choice 1652), the UE 1602 may be configured to drop UCIs other than the SP-CSI on both PUSCH repetitions, and the UE 1602 may multiplex the SP-CSI report 1626 on both PUSCH repetitions.

Figure 17:
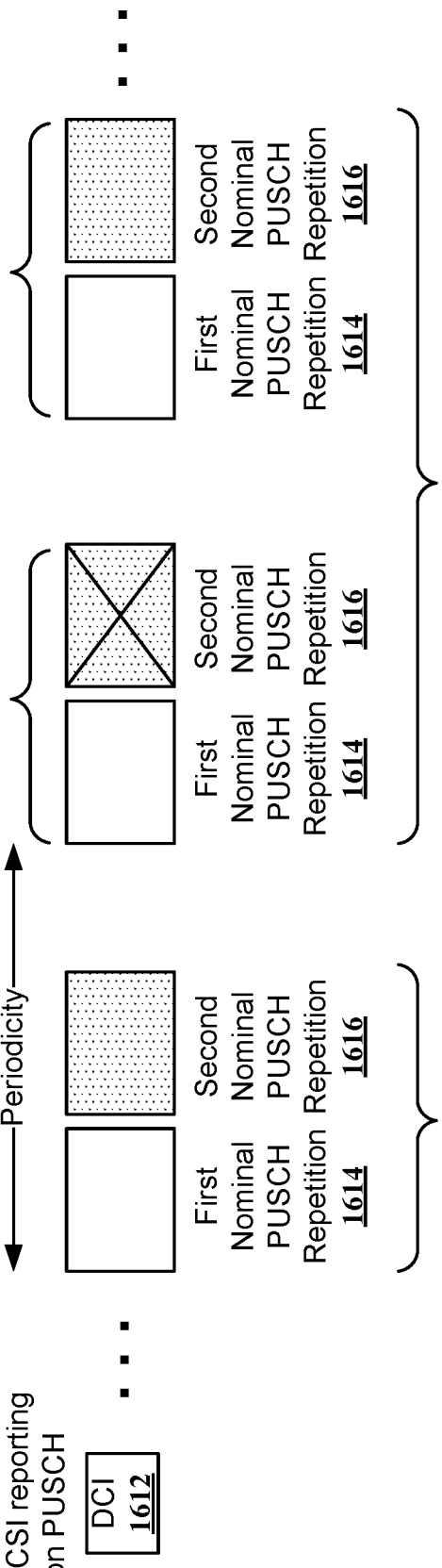
FIG. 17 is a diagram illustrating an example of multiplexing SP-CSI report according to aspects of the present disclosure.

FIG. 17 is a diagram 1700 illustrating an example of multiplexing SP-CSI report according to aspects of the present disclosure (e.g., based on the first choice 1648), where the UE 1602 may expect/assume that the first condition 1422 and the second condition 1424 are satisfied for the first PUSCH's repetitions (e.g., the first PUSCH repetitions 1614 and the second PUSCH repetitions 1616) after DCI activation (e.g., activated by the DCI 1612), otherwise it may be an error case. Then, for repetitions of the PUSCHs without a corresponding PDCCH, the UE 1602 may determine which PUSCH repetition(s) (e.g., the first PUSCH repetition 1614 and/or the second PUSCH repetitions 1616) to multiplex the SP-CSI report 1626 based on options 1536, 1538, 1540, and 1542. For example, in one SP-CSI report occasion (e.g., in one periodicity), if conditions 1422 and/or 1424 are not satisfied, the UE 1602 may multiplex the SP-CSI report 1626 on one of the PUSCH repetitions and omit on another of the PUSCH repetitions. However, if both conditions 1422 and/or 1424 are satisfied, the UE 1602 may multiplex the SP-CSI report 1626 on both PUSCH repetitions.

Referring back to FIG. 16, in another example, for the PUSCH repetition Type B, the UE 1602 may be configured to apply a second choice 1654, where the UE 1602 may be configured to not distinguish the first PUSCH after DCI activation (e.g., the first PUSCH 1304 as described in connection with FIG. 13) and the PUSCHs without a corresponding PDCCH (e.g., the PUSCHs 1306 after the first PUSCH 1304 as described in connection with FIG. 13). Then, for all the PUSCH occasions, if the first condition 1422 and/or the second condition 1424 are not satisfied, in one example (e.g., a choice 1656), the UE 1602 may apply one of the options 1536, 1538, and 1540 (e.g., Option 1A, 1B, and 1C) described in connection with FIG. 15, where the UE 1602 may be refrained from multiplexing the SP-CSI report on an actual PUSCH repetition that has a smaller number of symbols, a larger number of bits of the other UCIs, or less available REs, and the UE 1602 may omit the PUSCH repetition that is not multiplexed with the SP-CSI report 1626 (e.g., which repetition to omit depends on options 1536, 1538, and 1540). In other words, of the two PUSCH repetitions, the UE 1602 may be configured to multiplex the SP-CSI report 1626 on a PUSCH repetition that has a larger number of symbols, a lesser number of bits of the other UCIs (or no other UCIs), or more available REs, and the UE may omit the other PUSCH repetition that is not multiplexed with the SP-CSI report. In another example (e.g., a choice 1658), the UE 1602 may be configured to drop UCIs other than the SP-CSI on both PUSCH repetitions, and the UE 1602 may multiplex the SP-CSI report 1626 on both PUSCH repetitions.

Figure 18:
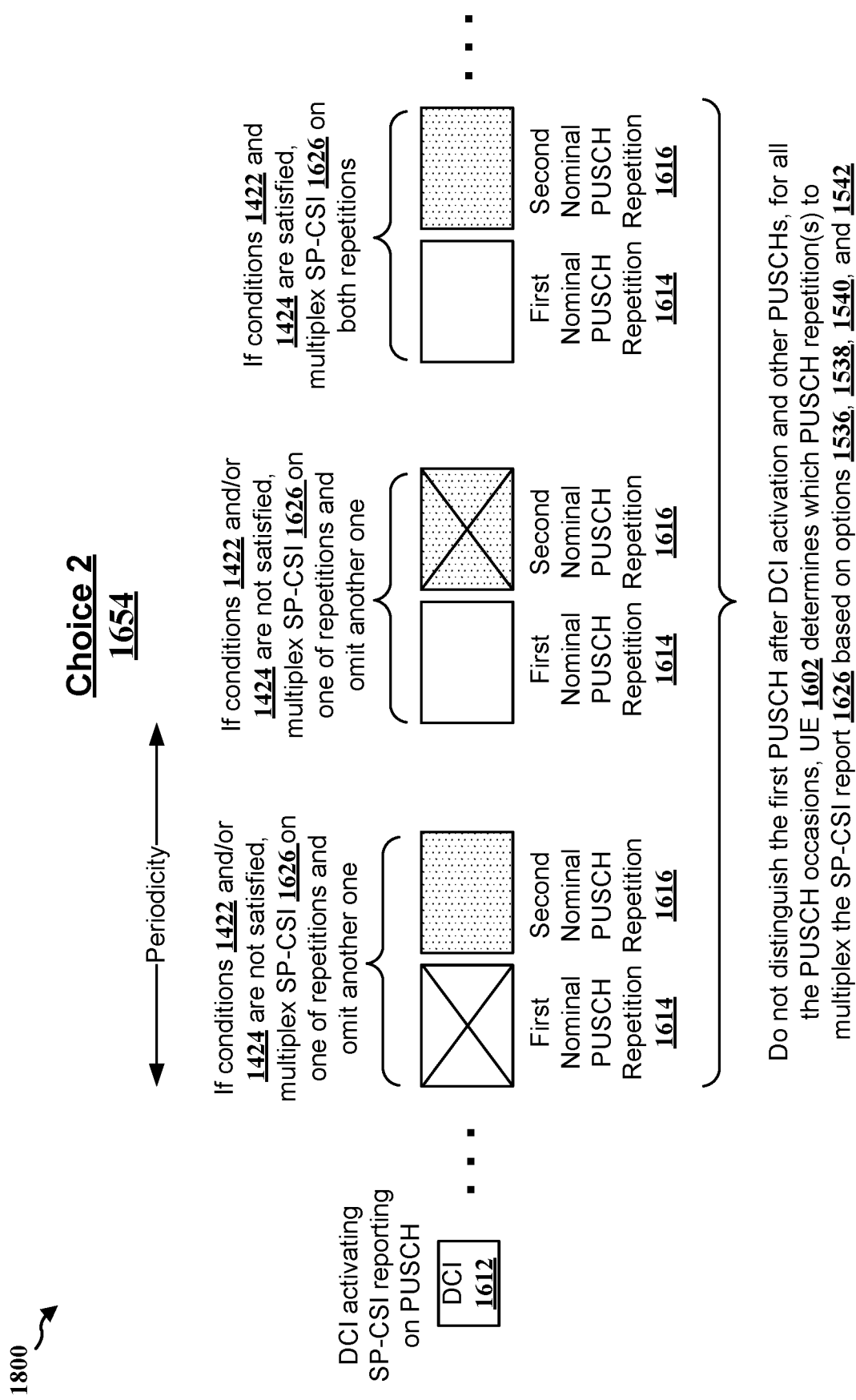
FIG. 18 is a diagram illustrating an example of multiplexing SP-CSI report according to aspects of the present disclosure.

FIG. 18 is a diagram 1800 illustrating an example of multiplexing SP-CSI report according to aspects of the present disclosure (e.g., based on the second choice 1654), where the UE 1602 may be configured not to distinguish the first PUSCH after DCI activation (e.g., the first PUSCH 1304 as described in connection with FIG. 13) and the PUSCHs without a corresponding PDCCH (e.g., the PUSCHs 1306 after the first PUSCH 1304 as described in connection with FIG. 13). Then, in all PUSCH occasions, the UE 1602 may determine which PUSCH repetition(s) (e.g., the first PUSCH repetition 1614 and/or the second PUSCH repetitions 1616) to multiplex the SP-CSI report 1626 based on options 1536, 1538, 1540, and 1542. For example, in one SP-CSI report occasion (e.g., in one periodicity), if conditions 1422 and/or 1424 are not satisfied, the UE 1602 may multiplex the SP-CSI report 1626 on one of PUSCH repetitions and omit another PUSCH repetition. However, if both conditions 1422 and/or 1424 are satisfied, the UE 1602 may multiplex the SP-CSI report 1626 on both PUSCH repetitions. Aspects described in connection with FIGS. 17 and 18 may enable a UE to multiplex SP-CSI reports in a more predictive manner, such that the base station may determine whether a transmission from the UE includes a CSI report. As such, a UE may be configured to apply either choice 1648 or choice 1654 depending on implementations.

FIGS. 19 to 26 are flowcharts 1900, 2000, 2100, 2200, 2300, 2400, 2500, and 2600, respectively, illustrating various aspects of a method of wireless communication. The method may be performed by a UE or a component of a UE (e.g., the UE 104, 1402, 1502, 1602; the apparatus 2702; a processing system, which may include the memory 360 and which may be the entire UE 350 or a component of the UE 350, such as the TX processor 368, the RX processor 356, and/or the controller/processor 359). The method may enable the UE to determine whether to multiplex one or more CSI reports on PUSCH repetition(s) and/or which PUSCH repetition(s) to multiplex the one or more CSI reports for multi-TRP PUSCH repetitions.

At 1902, the UE may receive DCI scheduling a plurality of PUSCH repetitions including a first set of PUSCH repetitions associated with a first SRS set and a second set of PUSCH repetitions associated with a second SRS set, such as described in connection with FIGS. 15 and 16. For example, at 1510, the UE 1502 may receive the DCI 1512 that schedules a plurality of PUSCH repetitions including a first set of PUSCH repetitions 1522 associated with a first SRS set and a second set of PUSCH repetitions 1524 associated with a second SRS set, and requesting transmission of at least one CSI report 1526 to be multiplexed on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions. The reception of the DCI may be performed, e.g., by the DCI processing component 2740 and/or reception component 2730 of the apparatus 2702 in FIG. 27. In one example, the DCI may request transmission of at least one AP-CSI report, such as described in connection with FIG. 15. In another example, the DCI may request transmission of an SP-CSI report, such as described in connection with FIG. 16. In another example, the DCI may request transmission of at least one CSI report to be multiplexed on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions.

At 1904, the UE may determine whether to multiplex at least one CSI report on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or UCI excluding the at least one CSI report will be transmitted in the one PUSCH repetition of the first set of PUSCH repetitions or the one PUSCH repetition of the second set of PUSCH repetitions, such as described in connection with FIGS. 15 and 16. For example, at 1530, the UE 1502 may determine whether to multiplex the at least one CSI report 1526 in the one PUSCH repetition of the first set of PUSCH repetitions 1522, the one PUSCH repetition of the second set of PUSCH repetitions 1524, or both the one PUSCH repetition of the first set of PUSCH repetitions 1522 and the one PUSCH repetition of the second set of PUSCH repetitions 1524 based on at least one of whether a number of symbols in the one PUSCH repetition of the first set of PUSCH repetitions and in the one PUSCH repetition of the second set of PUSCH repetitions is different (e.g., whether the first condition 1422 is met), or UCI excluding the at least one CSI report will be transmitted in the one PUSCH repetition of the first set of PUSCH repetitions or the one PUSCH repetition of the second set of PUSCH repetitions (e.g., whether the second condition 1424 is met). The determination of whether to multiplex the at least one CSI report may be performed, e.g., by the CSI report determination component 2742 of the apparatus 2702 in FIG. 27.

At 1906, the UE may transmit, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions, such as described in connection with FIGS. 15 and 16. For example, at 1534, the UE 1502 may transmit, based on the determination, the at least one CSI report 1526 multiplexed on the one PUSCH repetition of the first set of PUSCH repetitions 1522, the one PUSCH repetition of the second set of PUSCH repetitions 1524, or both the one PUSCH repetition of the first set of PUSCH repetitions 1522 and the one PUSCH repetition of the second set of PUSCH repetitions 1524. The transmission of the at least one CSI report may be performed, e.g., by the CSI report process component 2744 and/or the transmission component 2734 of the apparatus 2702 in FIG. 27.

Figure 20:
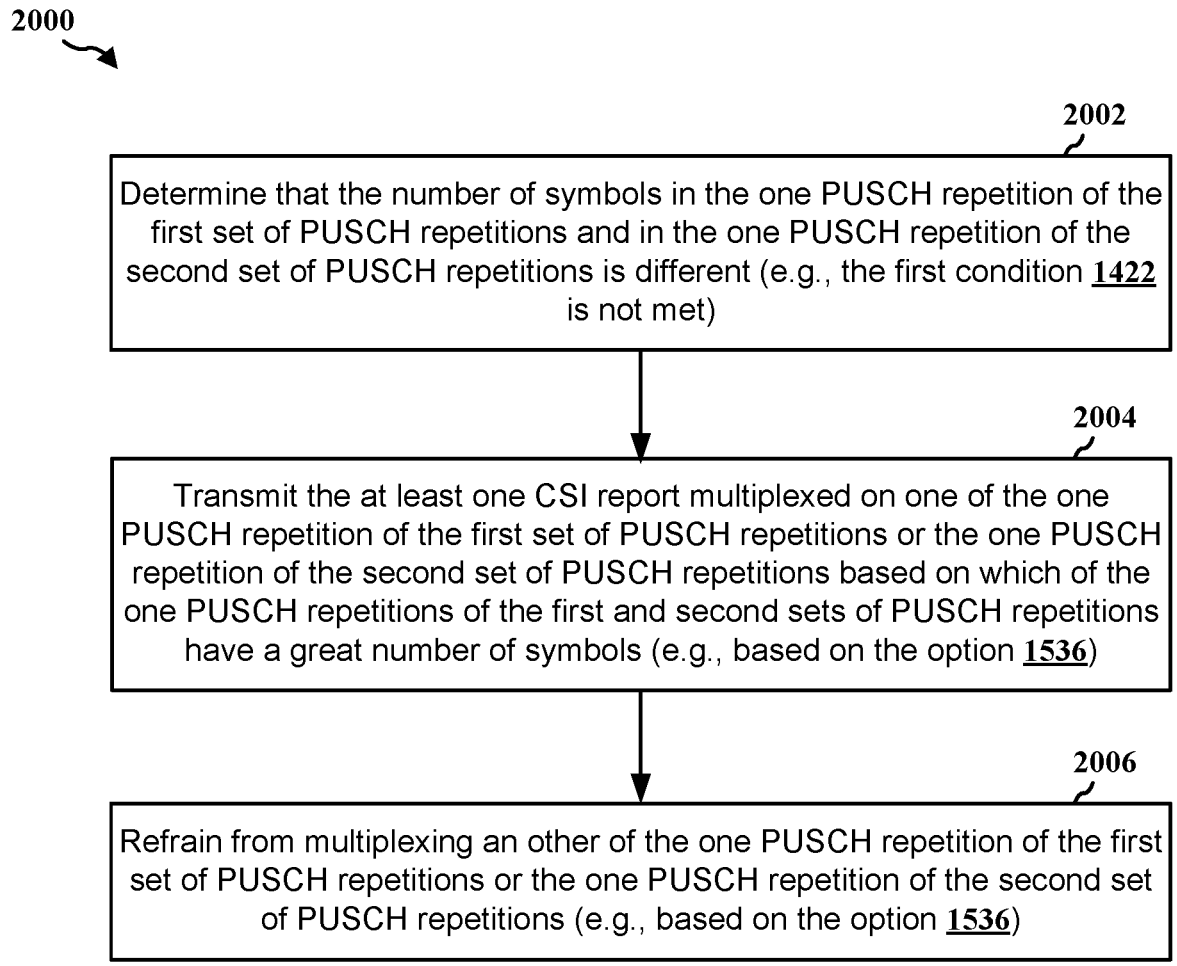
FIG. 20 is a flowchart of a method of wireless communication in accordance with aspects presented herein.

In one example, as shown by flowchart 2000 in FIG. 20, at 2002, the UE may determine that the number of symbols in the one PUSCH repetition of the first set of PUSCH repetitions and in the one PUSCH repetition of the second set of PUSCH repetitions is different (e.g., the first condition 1422 is not met). In such an example, at 2004, the UE may transmit the at least one CSI report multiplexed on one of the one PUSCH repetition of the first set of PUSCH repetitions or the one PUSCH repetition of the second set of PUSCH repetitions based on which of the one PUSCH repetitions of the first and second sets of PUSCH repetitions has a greater number of symbols. In such an example, at 2006, the UE may refrain from multiplexing the other one of the one PUSCH repetition of the first set of PUSCH repetitions or the one PUSCH repetition of the second set of PUSCH repetitions, such as described in connection with the option 1536 of FIG. 15. In such an example, as described in connection with FIGS. 16 to 18, if the scheduled PUSCH repetitions include x separate PUSCH occasions with periodicity P, the first set of PUSCH repetitions and the second set of PUSCH repetitions may be within an $i^{th}$ PUSCH occasion of the x separate PUSCH occasions, where i≥2 (e.g., for the choice 1648) or i≥1 (e.g., for the choice 1654).

For example, for the first choice 1648 described in connection with FIG. 17, if there are x PUSCH occasions, a UE (e.g., the UE 1602) may be configured to expect/assume that the first condition 1422 and the second condition 1424 are satisfied for the first PUSCH occasions (e.g., for the PUSCH repetition with i=1) after DCI activation. Then for subsequent PUSCHs (e.g., for PUSCH repetitions i≥2, such as i=2, 3, 4, . . . , x, etc., the UE may multiplex CSI report on the subsequent PUSCHs based on options 1536, 1538, 1540, and 1542. On the other hand, for the second choice 1654 described in connection with FIG. 18, if there are x PUSCH occasions, a UE does not expect/assume that the first condition 1422 and the second condition 1424 are satisfied for the first PUSCH occasions (e.g., for the PUSCH repetition with i=1) after DCI activation. In other words, the UE does not distinguish the first PUSCH after DCI activation and other PUSCHs. As such, for all PUSCHs (e.g., for PUSCH repetitions i≥1, such as i=2, 3, 4, . . . , x, etc., the UE may multiplex CSI report on all PUSCHs based on options 1536, 1538, 1540, and 1542.

For example, if the number of symbols in the one PUSCH repetition of the first set of PUSCH repetitions is determined to be greater than the number of symbols in the one PUSCH repetition of the second set of PUSCH repetitions, the UE may transmit the at least one CSI report multiplexed on the one PUSCH repetition of the first set of PUSCH repetitions, and the UE may refrain from multiplexing the at least one CSI report in the one PUSCH repetition of the second set of PUSCH repetitions. On the other hand, if the number of symbols in the one PUSCH repetition of the first set of PUSCH repetitions is determined to be less than the number of symbols in the one PUSCH repetition of the second set of PUSCH repetitions, the UE may transmit the at least one CSI report multiplexed on the one PUSCH repetition of the second set of PUSCH repetitions, and the UE may refrain from multiplexing the at least one CSI report in the one PUSCH repetition of the first set of PUSCH repetitions.

Figure 21:
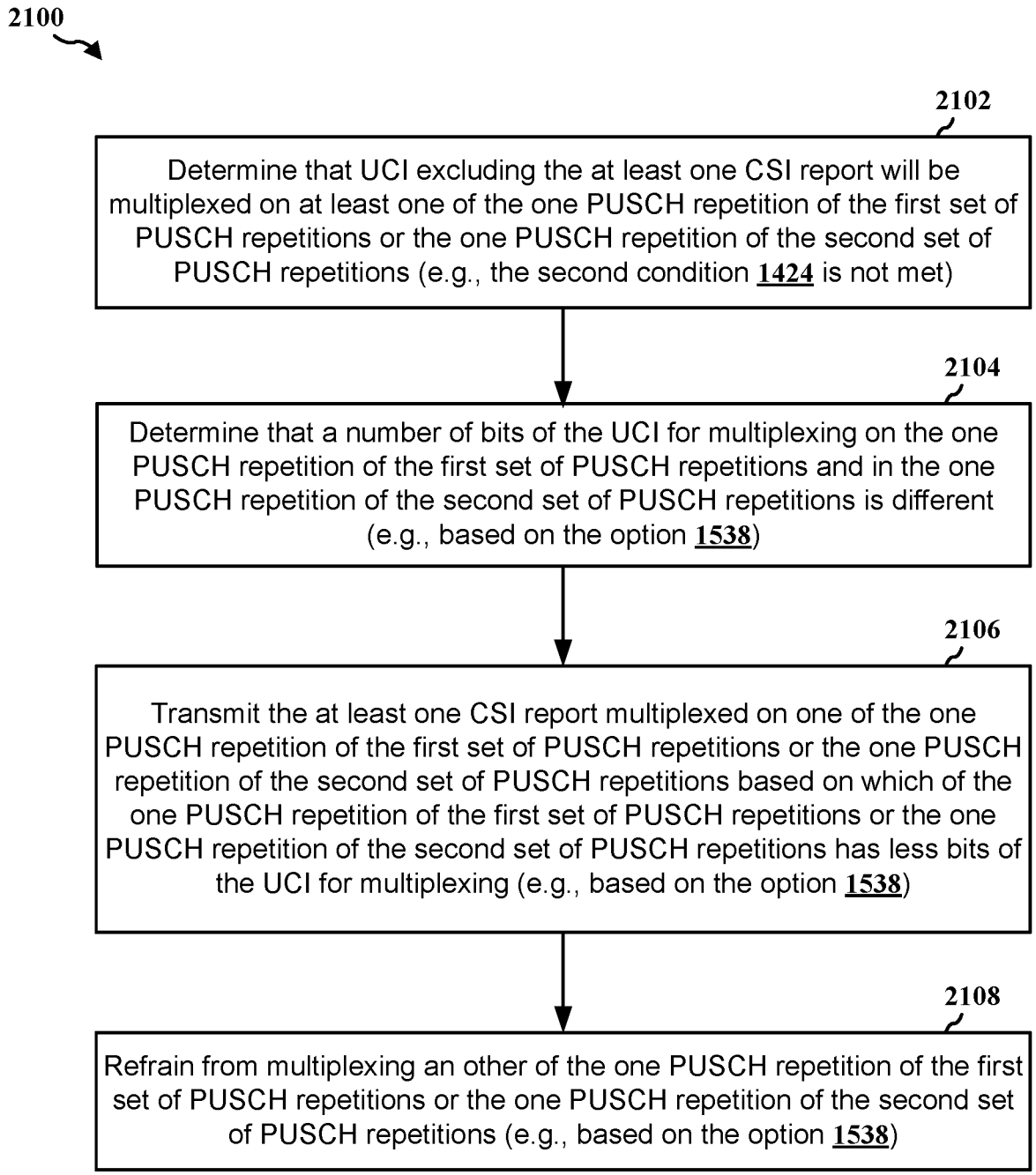
FIG. 21 is a flowchart of a method of wireless communication in accordance with aspects presented herein.

In another example, as shown by flowchart 2100 in FIG. 21, at 2102, the UE may determine that UCI excluding the at least one CSI report will be multiplexed on at least one of the one PUSCH repetition of the first set of PUSCH repetitions or the one PUSCH repetition of the second set of PUSCH repetitions (e.g., the second condition 1424 is not met). In such an example, at 2104, the UE may determine that a number of bits of the UCI for multiplexing in the one PUSCH repetition of the first set of PUSCH repetitions and in the one PUSCH repetition of the second set of PUSCH repetitions is different. In such an example, at 2106, the UE may transmit the at least one CSI report multiplexed on one of the one PUSCH repetition of the first set of PUSCH repetitions or the one PUSCH repetition of the second set of PUSCH repetitions based on which of the one PUSCH repetition of the first set of PUSCH repetitions or the one PUSCH repetition of the second set of PUSCH repetitions has less bits of the UCI for multiplexing. In such an example, at 2108, the UE may refrain from multiplexing the other one of the one PUSCH repetition of the first set of PUSCH repetitions or the one PUSCH repetition of the second set of PUSCH repetitions, such as described in connection with the option 1538 of FIG. 15.

For example, if the number of bits of the UCI for multiplexing in the one PUSCH repetition of the first set of PUSCH repetitions is determined to be less than the number of bits of the UCI for multiplexing in the one PUSCH repetition of the second set of PUSCH repetitions, the UE may transmit the at least one CSI report multiplexed on the one PUSCH repetition of the first set of PUSCH repetitions, and the UE may refrain from multiplexing the at least one CSI report in the one PUSCH repetition of the second set of PUSCH repetitions. On the other hand, if the number of bits of the UCI for multiplexing in the one PUSCH repetition of the first set of PUSCH repetitions is determined to be greater than the number of bits of the UCI for multiplexing in the one PUSCH repetition of the second set of PUSCH repetitions, the UE may transmit the at least one CSI report multiplexed on the one PUSCH repetition of the second set of PUSCH repetitions, and the UE may refrain from multiplexing the at least one CSI report in the one PUSCH repetition of the first set of PUSCH repetitions.

Figure 22:
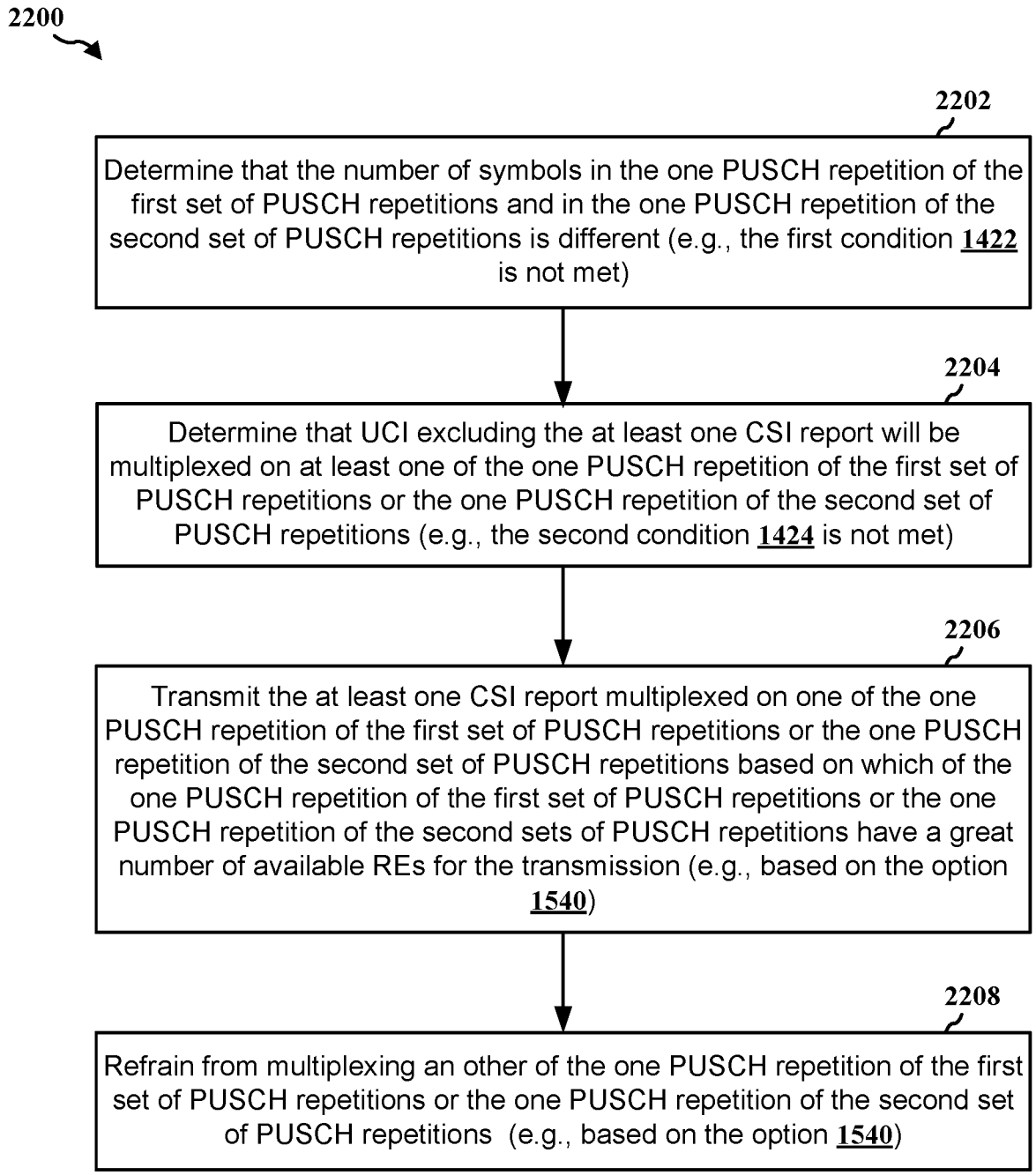
FIG. 22 is a flowchart of a method of wireless communication in accordance with aspects presented herein.

In another example, as shown by flowchart 2200 in FIG. 22, at 2202, the UE may determine that the number of symbols in the one PUSCH repetition of the first set of PUSCH repetitions and in the one PUSCH repetition of the second set of PUSCH repetitions is different (e.g., the first condition 1422 is not met). In such an example, at 2204, the UE may determine that UCI excluding the at least one CSI report will be multiplexed on at least one of the one PUSCH repetition of the first set of PUSCH repetitions or the one PUSCH repetition of the second set of PUSCH repetitions (e.g., the second condition 1424 is not met). In such an example, at 2206, the UE may transmit the at least one CSI report multiplexed on one of the one PUSCH repetition of the first set of PUSCH repetitions or the one PUSCH repetition of the second set of PUSCH repetitions based on which of the one PUSCH repetition of the first set of PUSCH repetitions or the one PUSCH repetition of the second sets of PUSCH repetitions has a greater number of available REs for the transmission. In such an example, at 2208, the UE may refrain from multiplexing the other one of the one PUSCH repetition of the first set of PUSCH repetitions or the one PUSCH repetition of the second set of PUSCH repetitions, such as described in connection with the option 1540 of FIG. 15. In such an example, as described in connection with FIGS. 16 to 18, if the scheduled PUSCH repetitions include x separate PUSCH occasions with periodicity P, the first set of PUSCH repetitions and the second set of PUSCH repetitions may be within an $i^{th}$ PUSCH occasion of the x separate PUSCH occasions, where i≥2 (e.g., for the choice 1648) or i≥1 (e.g., for the choice 1654).

For example, if the number of available REs for the transmission in the one PUSCH repetition of the first set of PUSCH repetitions is determined to be greater than the number of available REs for the transmission in the one PUSCH repetition of the second set of PUSCH repetitions, the UE may transmit the at least one CSI report multiplexed on the one PUSCH repetition of the first set of PUSCH repetitions, and the UE may refrain from multiplexing the at least one CSI report in the one PUSCH repetition of the second set of PUSCH repetitions. On the other hand, if the number of available REs for the transmission in the one PUSCH repetition of the first set of PUSCH repetitions is determined to be less than the number of available REs for the transmission in the one PUSCH repetition of the second set of PUSCH repetitions, the UE may transmit the at least one CSI report multiplexed on the one PUSCH repetition of the second set of PUSCH repetitions, and the UE may refrain from multiplexing the at least one CSI report in the one PUSCH repetition of the first set of PUSCH repetitions.

Figure 23:
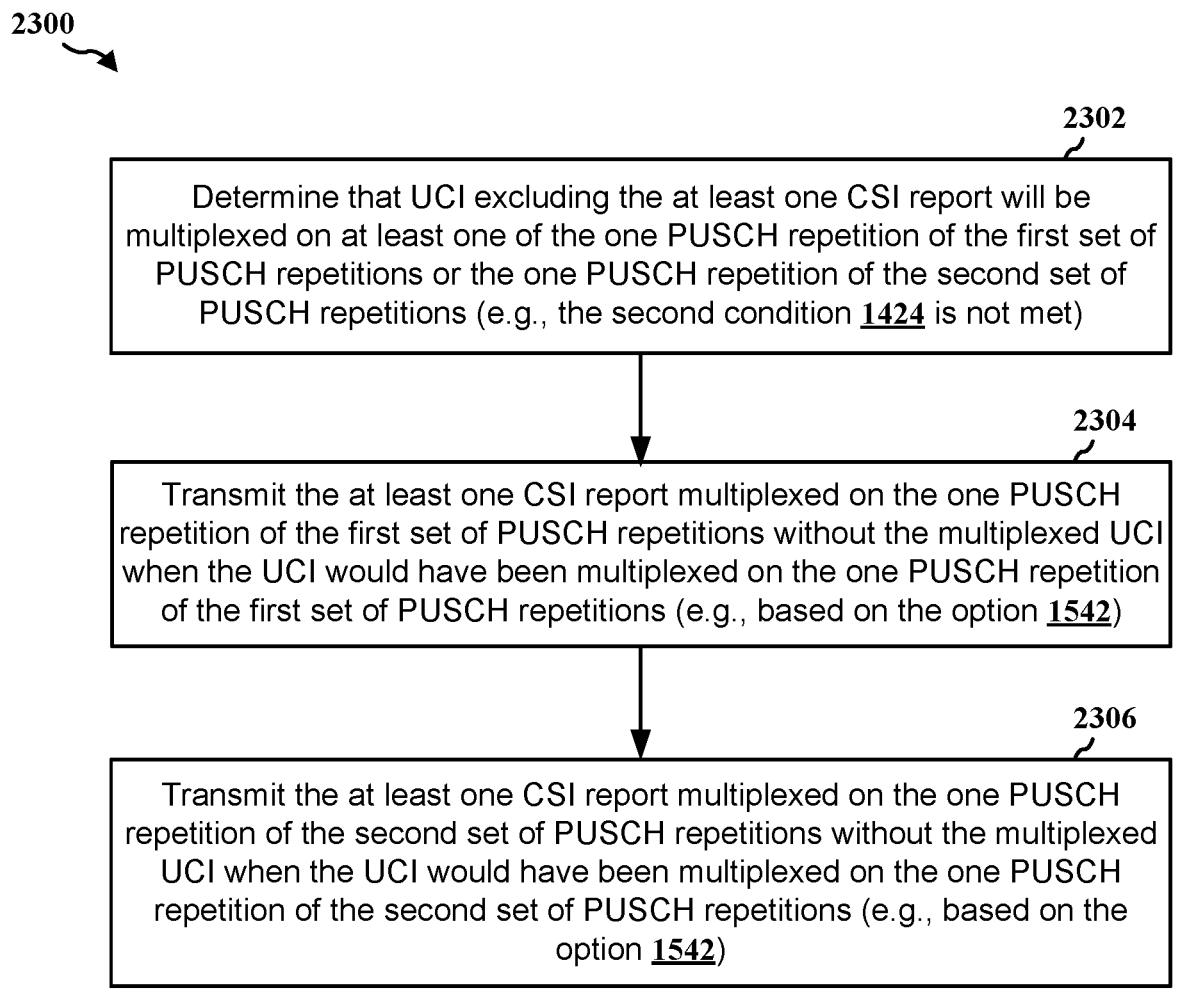
FIG. 23 is a flowchart of a method of wireless communication in accordance with aspects presented herein.

In another example, as shown by flowchart 2300 in FIG. 23, at 2302, the UE may determine that UCI excluding the at least one CSI report is to be multiplexed on at least one of the one PUSCH repetition of the first set of PUSCH repetitions or the one PUSCH repetition of the second set of PUSCH repetitions (e.g., the second condition 1424 is not met). In such an example, at 2304, the UE may transmit the at least one CSI report multiplexed on the one PUSCH repetition of the first set of PUSCH repetitions without the multiplexed UCI when the UCI would have been multiplexed on the one PUSCH repetition of the first set of PUSCH repetitions. In such an example, at 2306, the UE may transmit the at least one CSI report multiplexed on the one PUSCH repetition of the second set of PUSCH repetitions without the multiplexed UCI when the UCI would have been multiplexed on the one PUSCH repetition of the second set of PUSCH repetitions, such as described in connection with the option 1542 of FIG. 15. In such an example, as described in connection with FIGS. 16 to 18, if the scheduled PUSCH repetitions include x separate PUSCH occasions with periodicity P, the first set of PUSCH repetitions and the second set of PUSCH repetitions may be within an $i^{th}$ PUSCH occasion of the x separate PUSCH occasions, where i≥2 (e.g., for the choice 1648) or i≥1 (e.g., for the choice 1654).

In another example, as shown by flowchart 2400 in FIG. 24, at 2402, the UE may determine that the number of symbols in the one PUSCH repetition of the first set of PUSCH repetitions and in the one PUSCH repetition of the second set of PUSCH repetitions is different (e.g., the first condition 1422 is not met). In such an example, at 2404, the UE may determine that UCI excluding the at least one CSI report will be multiplexed on at least one of the one PUSCH repetition of the first set of PUSCH repetitions or the one PUSCH repetition of the second set of PUSCH repetitions (e.g., the second condition 1424 is not met). In such an example, at 2406, the UE may determine that the UE has no TB to transmit in the PUSCH repetitions. In such an example, at 2408, the UE may transmit the at least one CSI in the one PUSCH repetition of the first set of PUSCH repetitions. In such an example, at 2410, the UE may refrain from multiplexing the at least one CSI report in the one PUSCH repetition of the second set of PUSCH repetitions.

Figure 25:
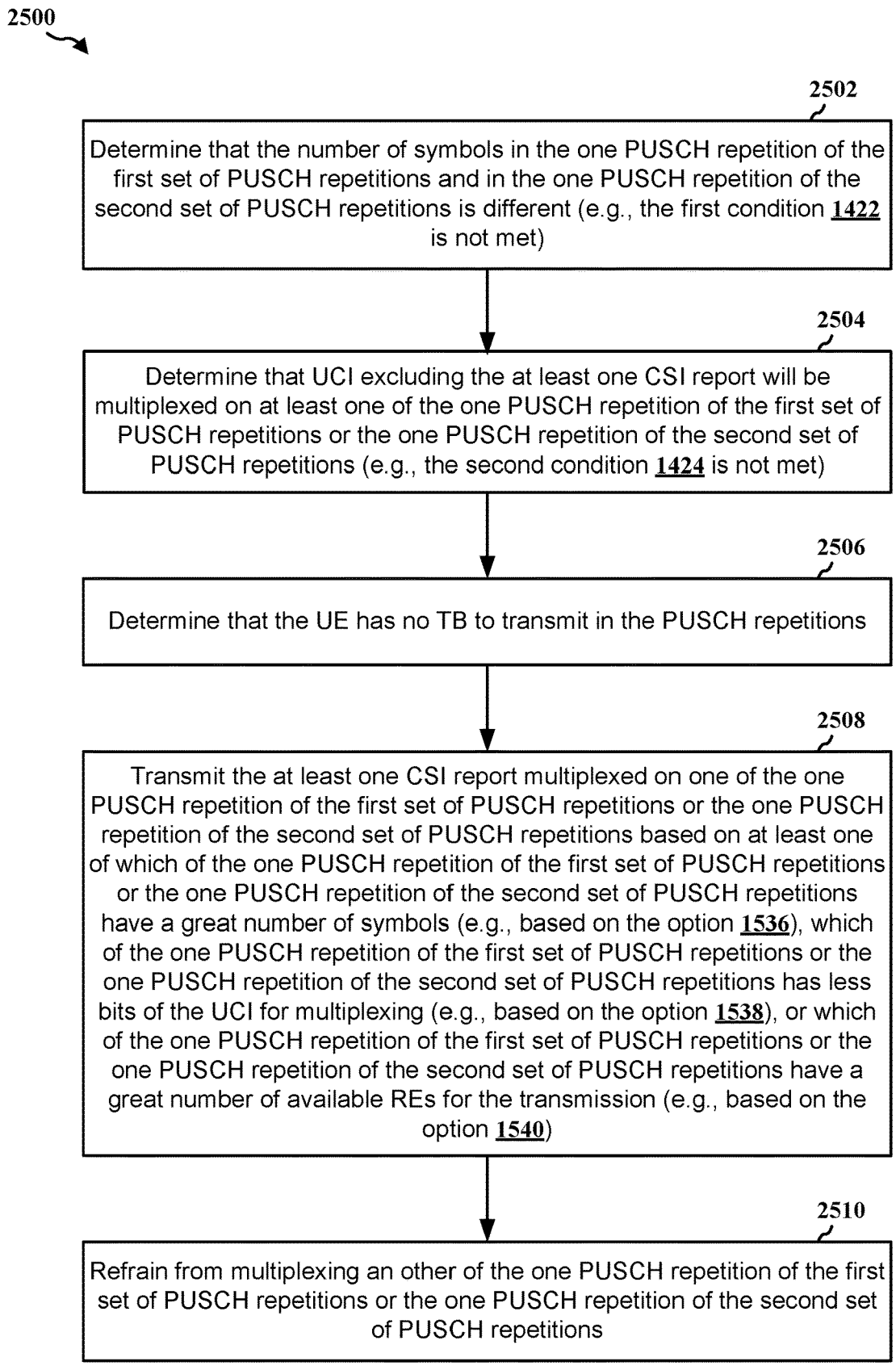
FIG. 25 is a flowchart of a method of wireless communication in accordance with aspects presented herein.

In another example, as shown by flowchart 2500 in FIG. 25, at 2502, the UE may determine that the number of symbols in the one PUSCH repetition of the first set of PUSCH repetitions and in the one PUSCH repetition of the second set of PUSCH repetitions is different (e.g., the first condition 1422 is not met). In such an example, at 2504, the UE may determine that UCI excluding the at least one CSI report will be multiplexed on at least one of the one PUSCH repetition of the first set of PUSCH repetitions or the one PUSCH repetition of the second set of PUSCH repetitions (e.g., the second condition 1424 is not met). In such an example, at 2506, the UE may determine that the UE has no TB to transmit in the PUSCH repetitions. In such an example, at 2508, the UE may transmit the at least one CSI report multiplexed on one of the one PUSCH repetition of the first set of PUSCH repetitions or the one PUSCH repetition of the second set of PUSCH repetitions based on at least one of which of the one PUSCH repetition of the first set of PUSCH repetitions or the one PUSCH repetition of the second set of PUSCH repetitions has a greater number of symbols, which of the one PUSCH repetition of the first set of PUSCH repetitions or the one PUSCH repetition of the second set of PUSCH repetitions has less bits of the UCI for multiplexing, or which of the one PUSCH repetition of the first set of PUSCH repetitions or the one PUSCH repetition of the second set of PUSCH repetitions has a greater number of available REs for the transmission. In such an example, at 2510, the UE may refrain from multiplexing the other one of the one PUSCH repetition of the first set of PUSCH repetitions or the one PUSCH repetition of the second set of PUSCH repetitions.

Figure 26:
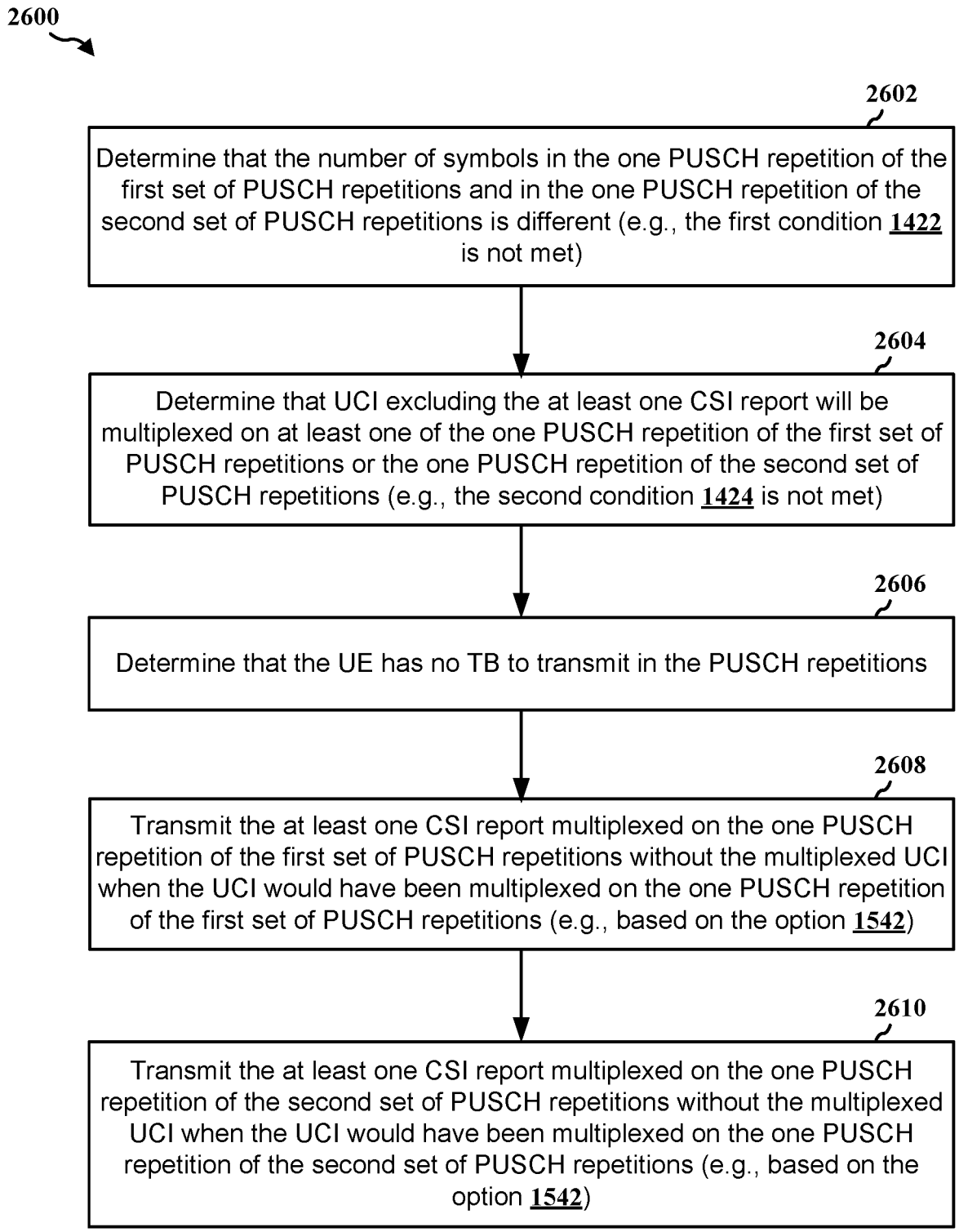
FIG. 26 is a flowchart of a method of wireless communication in accordance with aspects presented herein.

In another example, as shown by flowchart 2600 in FIG. 26, at 2602, the UE may determine that the number of symbols in the one PUSCH repetition of the first set of PUSCH repetitions and in the one PUSCH repetition of the second set of PUSCH repetitions is different (e.g., the first condition 1422 is not met). In such an example, at 2604, the UE may determine that UCI excluding the at least one CSI report will be multiplexed on at least one of the one PUSCH repetition of the first set of PUSCH repetitions or the one PUSCH repetition of the second set of PUSCH repetitions (e.g., the second condition 1424 is not met). In such an example, at 2606, the UE may determine that the UE has no TB to transmit in the PUSCH repetitions. In such an example, at 2608, the UE may transmit the at least one CSI report multiplexed on the one PUSCH repetition of the first set of PUSCH repetitions without the multiplexed UCI when the UCI would have been multiplexed on the one PUSCH repetition of the first set of PUSCH repetitions. In such an example, at 2610, the UE may transmit the at least one CSI report multiplexed on the one PUSCH repetition of the second set of PUSCH repetitions without the multiplexed UCI when the UCI would have been multiplexed on the one PUSCH repetition of the second set of PUSCH repetitions.

Figure 27:
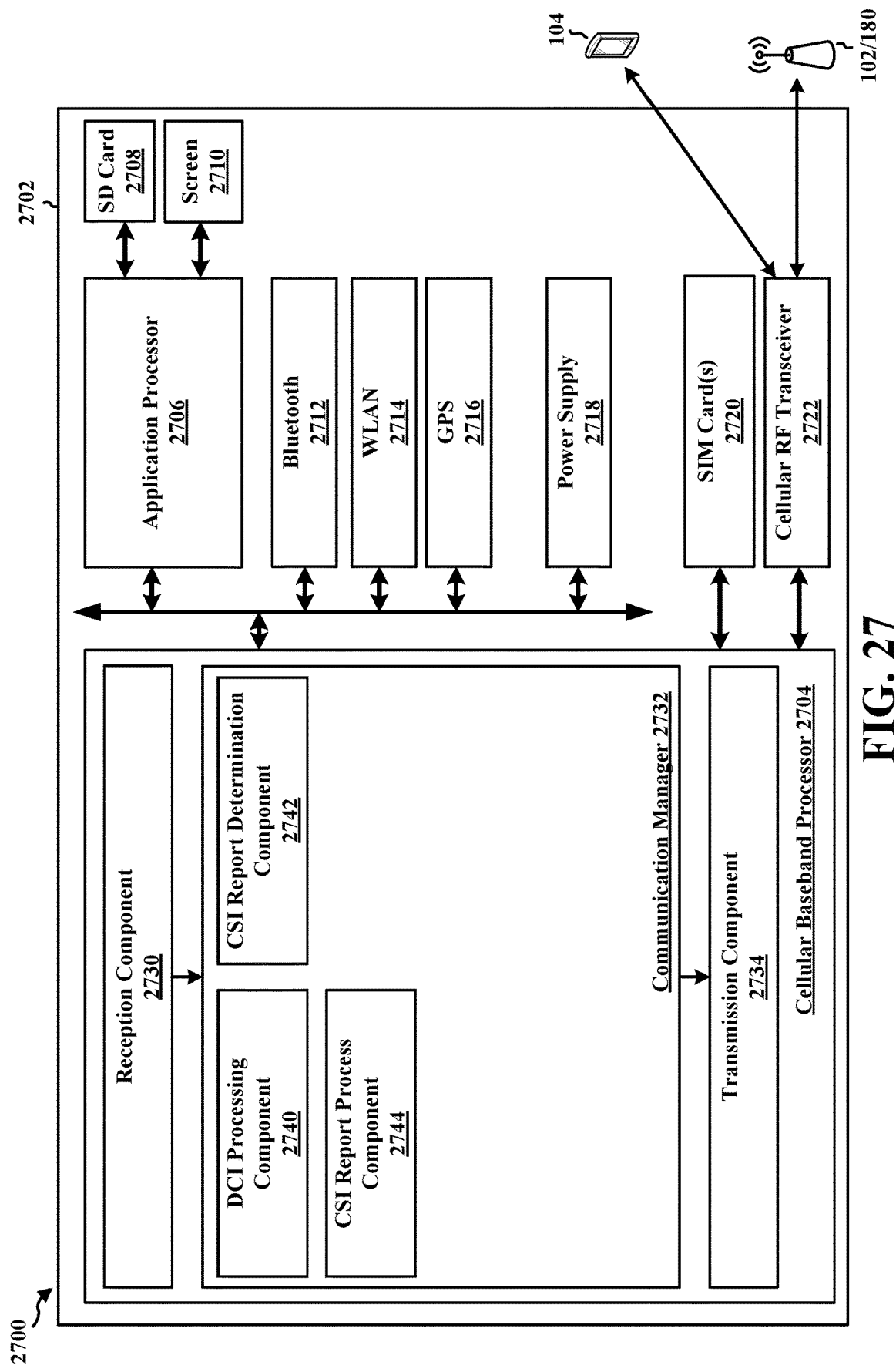
FIG. 27 is a diagram illustrating an example of a hardware implementation for an example apparatus in accordance with aspects presented herein.

FIG. 27 is a diagram 2700 illustrating an example of a hardware implementation for an apparatus 2702. The apparatus 2702 is a UE and includes a cellular baseband processor 2704 (also referred to as a modem) coupled to a cellular RF transceiver 2722 and one or more subscriber identity modules (SIM) cards 2720, an application processor 2706 coupled to a secure digital (SD) card 2708 and a screen 2710, a Bluetooth module 2712, a wireless local area network (WLAN) module 2714, a Global Positioning System (GPS) module 2716, and a power supply 2718. The cellular baseband processor 2704 communicates through the cellular RF transceiver 2722 with the UE 104 and/or BS 102/180. The cellular baseband processor 2704 may include a computer-readable medium/memory. The computer-readable medium/memory may be non-transitory. The cellular baseband processor 2704 is responsible for general processing, including the execution of software stored on the computer-readable medium/memory. The software, when executed by the cellular baseband processor 2704, causes the cellular baseband processor 2704 to perform the various functions described supra. The computer-readable medium/ memory may also be used for storing data that is manipulated by the cellular baseband processor 2704 when executing software. The cellular baseband processor 2704 further includes a reception component 2730, a communication manager 2732, and a transmission component 2734. The communication manager 2732 includes the one or more illustrated components. The components within the communication manager 2732 may be stored in the computer-readable medium/memory and/or configured as hardware within the cellular baseband processor 2704. The cellular baseband processor 2704 may be a component of the UE 350 and may include the memory 360 and/or at least one of the TX processor 368, the RX processor 356, and the controller/ processor 359. In one configuration, the apparatus 2702 may be a modem chip and include just the baseband processor 2704, and in another configuration, the apparatus 2702 may be the entire UE (e.g., see 350 of FIG. 3) and include the additional modules of the apparatus 2702.

The communication manager 2732 includes a DCI processing component 2740 that is configured to receive DCI scheduling a plurality of PUSCH repetitions including a first set of PUSCH repetitions associated with a first SRS set and a second set of PUSCH repetitions associated with a second SRS set, and requesting transmission of at least one CSI report to be multiplexed on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions, e.g., as described in connection with 1902 of FIG. 19. The communication manager 2732 further includes a CSI report determination component 2742 that is configured to determine whether to multiplex the at least one CSI report in the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or UCI excluding the at least one CSI report will be transmitted in the one PUSCH repetition of the first set of PUSCH repetitions or the one PUSCH repetition of the second set of PUSCH repetitions, e.g., as described in connection with 1904 of FIG. 19. The communication manager 2732 further includes a CSI report process component 2744 that is configured to transmit, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions, e.g., as described in connection with 1906 of FIG. 19.

The apparatus may include additional components that perform each of the blocks of the algorithm in the flowcharts of FIGS. 19 to 26. As such, each block in the flowcharts of FIGS. 19 to 26 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2702, and in particular the cellular baseband processor 2704, includes means for receiving DCI scheduling a plurality of PUSCH repetitions including a first set of PUSCH repetitions associated with a first SRS set and a second set of PUSCH repetitions associated with a second SRS set, and requesting transmission of at least one CSI report to be multiplexed on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions (e.g., the DCI processing component 2740 and/or reception component 2730). The apparatus 2702 includes means for determining whether to multiplex the at least one CSI report in the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or UCI excluding the at least one CSI report will be transmitted in the one PUSCH repetition of the first set of PUSCH repetitions or the one PUSCH repetition of the second set of PUSCH repetitions (e.g., the CSI report determination component 2742). The apparatus 2702 includes means for transmitting, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions (e.g., the CSI report process component 2744 and/or the transmission component 2734). In one configuration, the DCI may request transmission of at least one AP-CSI report. In another configuration, the DCI may request transmission of an SP-CSI report.

In one configuration, the apparatus 2702 may determine that the number of symbols in the one PUSCH repetition of the first set of PUSCH repetitions and in the one PUSCH repetition of the second set of PUSCH repetitions is different. In such a configuration, the apparatus 2702 may include means for transmitting the at least one CSI report multiplexed on one of the one PUSCH repetition of the first set of PUSCH repetitions or the one PUSCH repetition of the second set of PUSCH repetitions based on which of the one PUSCH repetitions of the first and second sets of PUSCH repetitions has a greater number of symbols. In such a configuration, the apparatus 2702 may include means for refraining from multiplexing the other one of the one PUSCH repetition of the first set of PUSCH repetitions or the one PUSCH repetition of the second set of PUSCH repetitions. In such a configuration, if the scheduled PUSCH repetitions include x separate PUSCH occasions with periodicity P, the first set of PUSCH repetitions and the second set of PUSCH repetitions may be within an $i^{th}$ PUSCH occasion of the x separate PUSCH occasions, where i≥2 or i≥1.

For example, if the number of symbols in the one PUSCH repetition of the first set of PUSCH repetitions is determined to be greater than the number of symbols in the one PUSCH repetition of the second set of PUSCH repetitions, the UE may transmit the at least one CSI report multiplexed on the one PUSCH repetition of the first set of PUSCH repetitions, and the UE may refrain from multiplexing the at least one CSI report in the one PUSCH repetition of the second set of PUSCH repetitions. On the other hand, if the number of symbols in the one PUSCH repetition of the first set of PUSCH repetitions is determined to be less than the number of symbols in the one PUSCH repetition of the second set of PUSCH repetitions, the UE may transmit the at least one CSI report multiplexed on the one PUSCH repetition of the second set of PUSCH repetitions, and the UE may refrain from multiplexing the at least one CSI report in the one PUSCH repetition of the first set of PUSCH repetitions.

In another configuration, the apparatus 2702 may determine that UCI excluding the at least one CSI report will be multiplexed on at least one of the one PUSCH repetition of the first set of PUSCH repetitions or the one PUSCH repetition of the second set of PUSCH repetitions. In such a configuration, the apparatus 2702 may determine that that a number of bits of the UCI for multiplexing in the one PUSCH repetition of the first set of PUSCH repetitions and in the one PUSCH repetition of the second set of PUSCH repetitions is different. In such a configuration, the apparatus 2702 may include means for transmitting the at least one CSI report multiplexed on one of the one PUSCH repetition of the first set of PUSCH repetitions or the one PUSCH repetition of the second set of PUSCH repetitions based on which of the one PUSCH repetition of the first set of PUSCH repetitions or the one PUSCH repetition of the second set of PUSCH repetitions has less bits of the UCI for multiplexing. In such a configuration, the apparatus 2702 may include means for refraining from multiplexing the other one of the one PUSCH repetition of the first set of PUSCH repetitions or the one PUSCH repetition of the second set of PUSCH repetitions.

For example, if the number of bits of the UCI for multiplexing in the one PUSCH repetition of the first set of PUSCH repetitions is determined to be less than the number of bits of the UCI for multiplexing in the one PUSCH repetition of the second set of PUSCH repetitions, the UE may transmit the at least one CSI report multiplexed on the one PUSCH repetition of the first set of PUSCH repetitions, and the UE may refrain from multiplexing the at least one CSI report in the one PUSCH repetition of the second set of PUSCH repetitions. On the other hand, if the number of bits of the UCI for multiplexing in the one PUSCH repetition of the first set of PUSCH repetitions is determined to be greater than the number of bits of the UCI for multiplexing in the one PUSCH repetition of the second set of PUSCH repetitions, the UE may transmit the at least one CSI report multiplexed on the one PUSCH repetition of the second set of PUSCH repetitions, and the UE may refrain from multiplexing the at least one CSI report in the one PUSCH repetition of the first set of PUSCH repetitions.

In another configuration, the apparatus 2702 may determine that the number of symbols in the one PUSCH repetition of the first set of PUSCH repetitions and in the one PUSCH repetition of the second set of PUSCH repetitions is different. In such a configuration, the apparatus 2702 may determine that UCI excluding the at least one CSI report will be multiplexed on at least one of the one PUSCH repetition of the first set of PUSCH repetitions or the one PUSCH repetition of the second set of PUSCH repetitions. In such a configuration, the apparatus 2702 may include means for transmitting the at least one CSI report multiplexed on one of the one PUSCH repetition of the first set of PUSCH repetitions or the one PUSCH repetition of the second set of PUSCH repetitions based on which of the one PUSCH repetition of the first set of PUSCH repetitions or the one PUSCH repetition of the second sets of PUSCH repetitions have a greater number of available REs for the transmission. In such a configuration, the apparatus 2702 may include means for refraining from multiplexing the other one of the one PUSCH repetition of the first set of PUSCH repetitions or the one PUSCH repetition of the second set of PUSCH repetitions. In such a configuration, if the scheduled PUSCH repetitions include x separate PUSCH occasions with periodicity P, the first set of PUSCH repetitions and the second set of PUSCH repetitions may be within an $i^{th}$ PUSCH occasion of the x separate PUSCH occasions, where i≥2 or i≥1.

For example, if the number of available REs for the transmission in the one PUSCH repetition of the first set of PUSCH repetitions is determined to be greater than the number of available REs for the transmission in the one PUSCH repetition of the second set of PUSCH repetitions, the UE may transmit the at least one CSI report multiplexed on the one PUSCH repetition of the first set of PUSCH repetitions, and the UE may refrain from multiplexing the at least one CSI report in the one PUSCH repetition of the second set of PUSCH repetitions. On the other hand, if the number of available REs for the transmission in the one PUSCH repetition of the first set of PUSCH repetitions is determined to be less than the number of available REs for the transmission in the one PUSCH repetition of the second set of PUSCH repetitions, the UE may transmit the at least one CSI report multiplexed on the one PUSCH repetition of the second set of PUSCH repetitions, and the UE may refrain from multiplexing the at least one CSI report in the one PUSCH repetition of the first set of PUSCH repetitions.

In another configuration, the apparatus 2702 may determine that UCI excluding the at least one CSI report is to be multiplexed on at least one of the one PUSCH repetition of the first set of PUSCH repetitions or the one PUSCH repetition of the second set of PUSCH repetitions. In such a configuration, the apparatus 2702 may include means for transmitting the at least one CSI report multiplexed on the one PUSCH repetition of the first set of PUSCH repetitions without the multiplexed UCI when the UCI would have been multiplexed on the one PUSCH repetition of the first set of PUSCH repetitions. In such a configuration, the apparatus 2702 may include means for transmitting the at least one CSI report multiplexed on the one PUSCH repetition of the second set of PUSCH repetitions without the multiplexed UCI when the UCI would have been multiplexed on the one PUSCH repetition of the second set of PUSCH repetitions. In such a configuration, if the scheduled PUSCH repetitions include x separate PUSCH occasions with periodicity P, the first set of PUSCH repetitions and the second set of PUSCH repetitions may be within an $i^{th}$ PUSCH occasion of the x separate PUSCH occasions, where i≥2 or i≥1.

In another configuration, the apparatus 2702 may determine that the number of symbols in the one PUSCH repetition of the first set of PUSCH repetitions and in the one PUSCH repetition of the second set of PUSCH repetitions is different. In such a configuration, the apparatus 2702 may determine that UCI excluding the at least one CSI report will be multiplexed on at least one of the one PUSCH repetition of the first set of PUSCH repetitions or the one PUSCH repetition of the second set of PUSCH repetitions. In such a configuration, the apparatus 2702 may include means for determining that the UE has no TB to transmit in the PUSCH repetitions. In such a configuration, the apparatus 2702 may include means for transmitting the at least one CSI in the one PUSCH repetition of the first set of PUSCH repetitions. In such a configuration, the apparatus 2702 may include means for refraining from multiplexing the at least one CSI report in the one PUSCH repetition of the second set of PUSCH repetitions.

In another configuration, the apparatus 2702 may determine that the number of symbols in the one PUSCH repetition of the first set of PUSCH repetitions and in the one PUSCH repetition of the second set of PUSCH repetitions is different. In such a configuration, the apparatus 2702 may determine that UCI excluding the at least one CSI report will be multiplexed on at least one of the one PUSCH repetition of the first set of PUSCH repetitions or the one PUSCH repetition of the second set of PUSCH repetitions. In such a configuration, the apparatus 2702 may include means for determining that the UE has no TB to transmit in the PUSCH repetitions. In such a configuration, the apparatus 2702 may include means for transmitting the at least one CSI report multiplexed on the one PUSCH repetition of the first set of PUSCH repetitions or the one PUSCH repetition of the second set of PUSCH repetitions based on at least one of which of the one PUSCH repetition of the first set of PUSCH repetitions or the one PUSCH repetition of the second set of PUSCH repetitions have a greater number of symbols, which of the one PUSCH repetition of the first set of PUSCH repetitions or the one PUSCH repetition of the second set of PUSCH repetitions has less bits of the UCI for multiplexing, or which of the one PUSCH repetition of the first set of PUSCH repetitions or the one PUSCH repetition of the second set of PUSCH repetitions have a greater number of available REs for the transmission. In such a configuration, the apparatus 2702 may include means for refraining from multiplexing the other one of the one PUSCH repetition of the first set of PUSCH repetitions or the one PUSCH repetition of the second set of PUSCH repetitions.

In another configuration, the apparatus 2702 may determine that the number of symbols in the one PUSCH repetition of the first set of PUSCH repetitions and in the one PUSCH repetition of the second set of PUSCH repetitions is different. In such a configuration, the apparatus 2702 may determine that UCI excluding the at least one CSI report will be multiplexed on at least one of the one PUSCH repetition of the first set of PUSCH repetitions or the one PUSCH repetition of the second set of PUSCH repetitions. In such a configuration, the apparatus 2702 may include means for determining that the UE has no TB to transmit in the PUSCH repetitions. In such a configuration, the apparatus 2702 may include means for transmitting the at least one CSI report multiplexed on the one PUSCH repetition of the first set of PUSCH repetitions without the multiplexed UCI when the UCI would have been multiplexed on the one PUSCH repetition of the first set of PUSCH repetitions. In such a configuration, the apparatus 2702 may include means for transmitting the at least one CSI report multiplexed on the one PUSCH repetition of the second set of PUSCH repetitions without the multiplexed UCI when the UCI would have been multiplexed on the one PUSCH repetition of the second set of PUSCH repetitions.

The means may be one or more of the components of the apparatus 2702 configured to perform the functions recited by the means. As described supra, the apparatus 2702 may include the TX Processor 368, the RX Processor 356, and the controller/processor 359. As such, in one configuration, the means may be the TX Processor 368, the RX Processor 356, and the controller/processor 359 configured to perform the functions recited by the means.

The following examples set forth additional aspects and are illustrative only and aspects thereof may be combined with aspects of other embodiments or teaching described herein, without limitation.

Aspect 1 a method for wireless communication at a UE, including: receiving DCI scheduling a plurality of PUSCH repetitions including a first set of PUSCH repetitions associated with a first SRS set and a second set of PUSCH repetitions associated with a second SRS set; determining whether to multiplex at least one CSI report on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or UCI excluding the at least one CSI report will be transmitted in the one PUSCH repetition of the first set of PUSCH repetitions or the one PUSCH repetition of the second set of PUSCH repetitions; and transmitting, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions.

In aspect 2, the method of aspect 1 further includes: determining that the number of symbols in the one PUSCH repetition of the first set of PUSCH repetitions and in the one PUSCH repetition of the second set of PUSCH repetitions is different; where the transmission of the at least one CSI report includes: transmitting the at least one CSI report multiplexed on the one PUSCH repetition of the first set of PUSCH repetitions or the one PUSCH repetition of the second set of PUSCH repetitions based on which of the one PUSCH repetitions of the first and second sets of PUSCH repetitions has a greater number of symbols; and refraining from multiplexing the other one of the one PUSCH repetition of the first set of PUSCH repetitions or the one PUSCH repetition of the second set of PUSCH repetitions.

In aspect 3, the method of aspect 1 or aspect 2 further includes that the number of symbols in the one PUSCH repetition of the first set of PUSCH repetitions is determined to be greater than the number of symbols in the one PUSCH repetition of the second set of PUSCH repetitions, and the transmission of the at least one CSI report includes: transmitting the at least one CSI report multiplexed on the one PUSCH repetition of the first set of PUSCH repetitions; and refraining from multiplexing the at least one CSI report in the one PUSCH repetition of the second set of PUSCH repetitions.

In aspect 4, the method of any of aspects 1-3 further includes that the number of symbols in the one PUSCH repetition of the first set of PUSCH repetitions is determined to be less than the number of symbols in the one PUSCH repetition of the second set of PUSCH repetitions, and the transmission of the at least one CSI report includes: transmitting the at least one CSI report multiplexed on the one PUSCH repetition of the second set of PUSCH repetitions; and refraining from multiplexing the at least one CSI report in the one PUSCH repetition of the first set of PUSCH repetitions.

In aspect 5, the method of any of aspects 1-4 further includes that the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥2.

In aspect 6, the method of any of aspects 1-4 further includes that the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥1.

In aspect 7, the method of any of aspects 1-6 further includes determining that UCI excluding the at least one CSI report will be multiplexed on at least one of the one PUSCH repetition of the first set of PUSCH repetitions or the one PUSCH repetition of the second set of PUSCH repetitions; and determining that a number of bits of the UCI for multiplexing in the one PUSCH repetition of the first set of PUSCH repetitions and in the one PUSCH repetition of the second set of PUSCH repetitions is different; where the transmission of the at least one CSI report includes: transmitting the at least one CSI report multiplexed on one of the one PUSCH repetition of the first set of PUSCH repetitions or the one PUSCH repetition of the second set of PUSCH repetitions based on which of the one PUSCH repetition of the first set of PUSCH repetitions or the one PUSCH repetition of the second set of PUSCH repetitions has less bits of the UCI for multiplexing; and refraining from multiplexing the other one of the one PUSCH repetition of the first set of PUSCH repetitions or the one PUSCH repetition of the second set of PUSCH repetitions.

In aspect 8, the method of aspect 7 further includes that the number of bits of the UCI for multiplexing in the one PUSCH repetition of the first set of PUSCH repetitions is determined to be less than the number of bits of the UCI for multiplexing in the one PUSCH repetition of the second set of PUSCH repetitions, where the transmission of the at least one CSI report includes: transmitting the at least one CSI report multiplexed on the one PUSCH repetition of the first set of PUSCH repetitions; and refraining from multiplexing the at least one CSI report in the one PUSCH repetition of the second set of PUSCH repetitions.

In aspect 9, the method of any of aspects 7 or 8 further includes that the number of bits of the UCI for multiplexing in the one PUSCH repetition of the first set of PUSCH repetitions is determined to be greater than the number of bits of the UCI for multiplexing in the one PUSCH repetition of the second set of PUSCH repetitions, where the transmission of the at least one CSI report includes: transmitting the at least one CSI report multiplexed on the one PUSCH repetition of the second set of PUSCH repetitions; and refraining from multiplexing the at least one CSI report in the one PUSCH repetition of the first set of PUSCH repetitions.

In aspect 10, the method of any of aspects 7-9 further includes that the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥2.

In aspect 11, the method of any of aspects 7-9 further includes that the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥1.

In aspect 12, the method of any of aspects 1-11 further includes determining that the number of symbols in the one PUSCH repetition of the first set of PUSCH repetitions and in the one PUSCH repetition of the second set of PUSCH repetitions is different; and determining that UCI excluding the at least one CSI report will be multiplexing in at least one of the one PUSCH repetition of the first set of PUSCH repetitions or the one PUSCH repetition of the second set of PUSCH repetitions; where the transmission of the at least one CSI report includes: transmitting the at least one CSI report multiplexed on one of the one PUSCH repetition of the first set of PUSCH repetitions or the one PUSCH repetition of the second set of PUSCH repetitions based on which of the one PUSCH repetition of the first set of PUSCH repetitions or the one PUSCH repetition of the second sets of PUSCH repetitions has a greater number of available resource elements (REs) for the transmission; and refraining from multiplexing the other one of the one PUSCH repetition of the first set of PUSCH repetitions or the one PUSCH repetition of the second set of PUSCH repetitions.

In aspect 13, the method of aspect 12 further includes that the number of available REs for the transmission in the one PUSCH repetition of the first set of PUSCH repetitions is determined to be greater than the number of available REs for the transmission in the one PUSCH repetition of the second set of PUSCH repetitions, and the transmission of the at least one CSI report includes: transmitting the at least one CSI report multiplexed on the one PUSCH repetition of the first set of PUSCH repetitions; and refraining from multiplexing the at least one CSI report in the one PUSCH repetition of the second set of PUSCH repetitions.

In aspect 14, the method of any of aspects 12 or 13 further includes that the number of available REs for the transmission in the one PUSCH repetition of the first set of PUSCH repetitions is determined to be less than the number of available REs for the transmission in the one PUSCH repetition of the second set of PUSCH repetitions, and the transmission of the at least one CSI report includes: transmitting the at least one CSI report multiplexed on the one PUSCH repetition of the second set of PUSCH repetitions; and refraining from multiplexing the at least one CSI report in the one PUSCH repetition of the first set of PUSCH repetitions.

In aspect 15, the method of any of aspects 12-14 further includes that the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥2.

In aspect 16, the method of any of aspects 12-14 further includes that the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥1.

In aspect 17, the method of any of aspects 1-16 further includes determining that UCI excluding the at least one CSI report is to be multiplexed on at least one of the one PUSCH repetition of the first set of PUSCH repetitions or the one PUSCH repetition of the second set of PUSCH repetitions; where the transmission of the at least one CSI report includes: transmitting the at least one CSI report multiplexed on the one PUSCH repetition of the first set of PUSCH repetitions without the multiplexed UCI when the UCI would have been multiplexed on the one PUSCH repetition of the first set of PUSCH repetitions; and transmitting the at least one CSI report multiplexed on the one PUSCH repetition of the second set of PUSCH repetitions without the multiplexed UCI when the UCI would have been multiplexed on the one PUSCH repetition of the second set of PUSCH repetitions.

In aspect 18, the method of aspect 17 further includes that the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥2.

In aspect 19, the method of aspect 18 further includes that the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥1.

In aspect 20, the method of any of aspects 1-19 further includes including: determining that the number of symbols in the one PUSCH repetition of the first set of PUSCH repetitions and in the one PUSCH repetition of the second set of PUSCH repetitions is different; determining that UCI excluding the at least one CSI report will be multiplexed on at least one of the one PUSCH repetition of the first set of PUSCH repetitions or the one PUSCH repetition of the second set of PUSCH repetitions; and determining that the UE has no TB to transmit in the PUSCH repetitions; where the transmission of the at least one CSI report includes: transmitting the at least one CSI in the one PUSCH repetition of the first set of PUSCH repetitions; and refraining from multiplexing the at least one CSI report in the one PUSCH repetition of the second set of PUSCH repetitions.

In aspect 21, the method of aspect 20 further includes that determining that the number of symbols in the one PUSCH repetition of the first set of PUSCH repetitions and in the one PUSCH repetition of the second set of PUSCH repetitions is different; determining that UCI excluding the at least one CSI report will be multiplexed on at least one of the one PUSCH repetition of the first set of PUSCH repetitions or the one PUSCH repetition of the second set of PUSCH repetitions; and determining that the UE has no TB to transmit in the PUSCH repetitions; where the transmission of the at least one CSI report includes: transmitting the at least one CSI report multiplexed on one of the one PUSCH repetition of the first set of PUSCH repetitions or the one PUSCH repetition of the second set of PUSCH repetitions based on at least one of which of the one PUSCH repetition of the first set of PUSCH repetitions or the one PUSCH repetition of the second set of PUSCH repetitions has a greater number of symbols, which of the one PUSCH repetition of the first set of PUSCH repetitions or the one PUSCH repetition of the second set of PUSCH repetitions has less bits of the UCI for multiplexing, or which of the one PUSCH repetition of the first set of PUSCH repetitions or the one PUSCH repetition of the second set of PUSCH repetitions has a greater number of available REs for the transmission; and refraining from multiplexing the other one of the one PUSCH repetition of the first set of PUSCH repetitions or the one PUSCH repetition of the second set of PUSCH repetitions.

In aspect 22, the method of any of aspects 20 or 21 further includes that determining that the number of symbols in the one PUSCH repetition of the first set of PUSCH repetitions and in the one PUSCH repetition of the second set of PUSCH repetitions is different; determining that UCI excluding the at least one CSI report will be multiplexed on at least one of the one PUSCH repetition of the first set of PUSCH repetitions or the one PUSCH repetition of the second set of PUSCH repetitions; and determining that the UE has no TB to transmit in the PUSCH repetitions; where the transmission of the at least one CSI report includes: transmitting the at least one CSI report multiplexed on the one PUSCH repetition of the first set of PUSCH repetitions without the multiplexed UCI when the UCI would have been multiplexed on the one PUSCH repetition of the first set of PUSCH repetitions; and transmitting the at least one CSI report multiplexed on the one PUSCH repetition of the second set of PUSCH repetitions without the multiplexed UCI when the UCI would have been multiplexed on the one PUSCH repetition of the second set of PUSCH repetitions.

In aspect 23, the method of any of aspects 1-22 further includes that the DCI requests transmission of at least one AP-CSI report.

In aspect 24, the method of any of aspects 1-22 further includes that the DCI requests transmission of an SP-CSI report.

In aspect 25, the method of any aspects 1-24 further includes that the DCI requests transmission of the at least one CSI report to be multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions.

Aspect 26 is an apparatus for wireless communication including at least one processor coupled to a memory and configured to implement a method as in any of aspects 1 to 24, further including at least one of a transceiver or an antenna coupled to the at least one processor.

Aspect 27 is an apparatus for wireless communication including means for implementing a method as in any of aspects 1 to 24.

Aspect 28 is a non-transitory computer-readable medium storing computer executable code, where the code when executed by a processor causes the processor to implement a method as in any of aspects 1 to 24.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
a memory; and
at least one processor coupled to the memory and configured to:
receive downlink control information (DCI) scheduling a plurality of physical uplink shared channel (PUSCH) repetitions including a first set of PUSCH repetitions associated with a first sounding reference signal (SRS) set and a second set of PUSCH repetitions associated with a second SRS set;
determine whether to multiplex at least one channel state information (CSI) report on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or uplink control information (UCI) excluding the at least one CSI report will be transmitted in the one PUSCH repetition of the first set of PUSCH repetitions or the one PUSCH repetition of the second set of PUSCH repetitions; and
transmit, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions.

2. The apparatus of claim 1, wherein the at least one processor is further configured to determine that the number of symbols in the one PUSCH repetition of the first set of PUSCH repetitions and in the one PUSCH repetition of the second set of PUSCH repetitions is different;
wherein to transmit the at least one CSI report the at least one processor is configured to:
transmit the at least one CSI report multiplexed on one of the one PUSCH repetition of the first set of PUSCH repetitions or the one PUSCH repetition of the second set of PUSCH repetitions based on which of the one PUSCH repetitions of the first and second sets of PUSCH repetitions has a greater number of symbols; and
refrain from multiplexing an other of the one PUSCH repetition of the first set of PUSCH repetitions or the one PUSCH repetition of the second set of PUSCH repetitions.

3. The apparatus of claim 2, wherein the number of symbols in the one PUSCH repetition of the first set of PUSCH repetitions is determined to be greater than the number of symbols in the one PUSCH repetition of the second set of PUSCH repetitions, and to transmit the at least one CSI report the at least one processor is configured to:
transmit the at least one CSI report multiplexed on the one PUSCH repetition of the first set of PUSCH repetitions; and
refrain from multiplexing the at least one CSI report on the one PUSCH repetition of the second set of PUSCH repetitions.

4. The apparatus of claim 2, wherein the number of symbols in the one PUSCH repetition of the first set of PUSCH repetitions is determined to be less than the number of symbols in the one PUSCH repetition of the second set of PUSCH repetitions, and to transmit the at least one CSI report the at least one processor is configured to:
transmit the at least one CSI report multiplexed on the one PUSCH repetition of the second set of PUSCH repetitions; and
refrain from multiplexing the at least one CSI report on the one PUSCH repetition of the first set of PUSCH repetitions.

5. The apparatus of claim 2, wherein the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥2.

6. The apparatus of claim 2, wherein the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥1.

7. The apparatus of claim 1, wherein the at least one processor is further configured to:
determine that UCI excluding the at least one CSI report will be multiplexed on at least one of the one PUSCH repetition of the first set of PUSCH repetitions or the one PUSCH repetition of the second set of PUSCH repetitions; and
determine that a number of bits of the UCI for multiplexing on the one PUSCH repetition of the first set of PUSCH repetitions and in the one PUSCH repetition of the second set of PUSCH repetitions is different;
wherein to transmit the at least one CSI report the at least one processor is configured to:
transmit the at least one CSI report multiplexed on one of the one PUSCH repetition of the first set of PUSCH repetitions or the one PUSCH repetition of the second set of PUSCH repetitions based on which of the one PUSCH repetition of the first set of PUSCH repetitions or the one PUSCH repetition of the second set of PUSCH repetitions has less bits of the UCI for multiplexing; and
refrain from multiplexing an other of the one PUSCH repetition of the first set of PUSCH repetitions or the one PUSCH repetition of the second set of PUSCH repetitions.

8. The apparatus of claim 7, wherein the number of bits of the UCI for multiplexing on the one PUSCH repetition of the first set of PUSCH repetitions is determined to be less than the number of bits of the UCI for multiplexing in the one PUSCH repetition of the second set of PUSCH repetitions, wherein to transmit the at least one CSI report the at least one processor is configured to:
transmit the at least one CSI report multiplexed on the one PUSCH repetition of the first set of PUSCH repetitions; and
refrain from multiplexing the at least one CSI report on the one PUSCH repetition of the second set of PUSCH repetitions.

9. The apparatus of claim 7, wherein the number of bits of the UCI for multiplexing on the one PUSCH repetition of the first set of PUSCH repetitions is determined to be greater than the number of bits of the UCI for multiplexing on the one PUSCH repetition of the second set of PUSCH repetitions, wherein to transmit the at least one CSI report the at least one processor is configured to:

transmit the at least one CSI report multiplexed on the one PUSCH repetition of the second set of PUSCH repetitions; and
refrain from multiplexing the at least one CSI report on the one PUSCH repetition of the first set of PUSCH repetitions.

10. The apparatus of claim 7, wherein the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥2.

11. The apparatus of claim 7, wherein the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥1.

12. The apparatus of claim 1, wherein the at least one processor is further configured to:
determine that the number of symbols in the one PUSCH repetition of the first set of PUSCH repetitions and in the one PUSCH repetition of the second set of PUSCH repetitions is different; and
determine that UCI excluding the at least one CSI report will be multiplexing on at least one of the one PUSCH repetition of the first set of PUSCH repetitions or the one PUSCH repetition of the second set of PUSCH repetitions;
wherein to transmit the at least one CSI report the at least one processor is configured to:
transmit the at least one CSI report multiplexed on one of the one PUSCH repetition of the first set of PUSCH repetitions or the one PUSCH repetition of the second set of PUSCH repetitions based on which of the one PUSCH repetition of the first set of PUSCH repetitions or the one PUSCH repetition of the second sets of PUSCH repetitions has a greater number of available resource elements (REs) for the transmission; and
refrain from multiplexing an other of the one PUSCH repetition of the first set of PUSCH repetitions or the one PUSCH repetition of the second set of PUSCH repetitions.

13. The apparatus of claim 12, wherein the number of available REs for the transmission in the one PUSCH repetition of the first set of PUSCH repetitions is determined to be greater than the number of available REs for the transmission in the one PUSCH repetition of the second set of PUSCH repetitions, and to transmit the at least one CSI report the at least one processor is configured to:
transmit the at least one CSI report multiplexed on the one PUSCH repetition of the first set of PUSCH repetitions; and
refrain from multiplexing the at least one CSI report on the one PUSCH repetition of the second set of PUSCH repetitions.

14. The apparatus of claim 12, wherein the number of available REs for the transmission in the one PUSCH repetition of the first set of PUSCH repetitions is determined to be less than the number of available REs for the transmission in the one PUSCH repetition of the second set of PUSCH repetitions, and to transmit the at least one CSI report the at least one processor is configured to:
transmit the at least one CSI report multiplexed on the one PUSCH repetition of the second set of PUSCH repetitions; and
refrain from multiplexing the at least one CSI report on the one PUSCH repetition of the first set of PUSCH repetitions.

15. The apparatus of claim 14, wherein the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥2.

16. The apparatus of claim 14, wherein the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥1.

17. The apparatus of claim 1, wherein the at least one processor is further configured to determine that UCI excluding the at least one CSI report is to be multiplexed on at least one of the one PUSCH repetition of the first set of PUSCH repetitions or the one PUSCH repetition of the second set of PUSCH repetitions;
wherein to transmit the at least one CSI report the at least one processor is configured to:
transmit the at least one CSI report multiplexed on the one PUSCH repetition of the first set of PUSCH repetitions without the multiplexed UCI when the UCI would have been multiplexed on the one PUSCH repetition of the first set of PUSCH repetitions; and
transmit the at least one CSI report multiplexed on the one PUSCH repetition of the second set of PUSCH repetitions without the multiplexed UCI when the UCI would have been multiplexed on the one PUSCH repetition of the second set of PUSCH repetitions.

18. The apparatus of claim 17, wherein the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥2.

19. The apparatus of claim 17, wherein the scheduled PUSCH repetitions include x separate PUSCH occasions with periodicity P, the first set of PUSCH repetitions and the second set of PUSCH repetitions being within an $i^{th}$ PUSCH occasion of the x separate PUSCH occasions, where i≥1.

20. The apparatus of claim 1, wherein the at least one processor is further configured to:
determine that the number of symbols in the one PUSCH repetition of the first set of PUSCH repetitions and in the one PUSCH repetition of the second set of PUSCH repetitions is different;
determine that UCI excluding the at least one CSI report will be multiplexed on at least one of the one PUSCH repetition of the first set of PUSCH repetitions or the one PUSCH repetition of the second set of PUSCH repetitions; and
determine that the UE has no transport block (TB) to transmit in the PUSCH repetitions;
wherein to transmit the at least one CSI report the at least one processor is configured to:
transmit the at least one CSI in the one PUSCH repetition of the first set of PUSCH repetitions; and
refrain from multiplexing the at least one CSI report on the one PUSCH repetition of the second set of PUSCH repetitions.

21. The apparatus of claim 1, wherein the at least one processor is further configured to:

determine that the number of symbols in the one PUSCH repetition of the first set of PUSCH repetitions and in the one PUSCH repetition of the second set of PUSCH repetitions is different;
determine that UCI excluding the at least one CSI report will be multiplexed on at least one of the one PUSCH repetition of the first set of PUSCH repetitions or the one PUSCH repetition of the second set of PUSCH repetitions; and
determine that the UE has no transport block (TB) to transmit in the PUSCH repetitions;
wherein to transmit the at least one CSI report the at least one processor is configured to:
transmit the at least one CSI report multiplexed on one of the one PUSCH repetition of the first set of PUSCH repetitions or the one PUSCH repetition of the second set of PUSCH repetitions based on at least one of which of the one PUSCH repetition of the first set of PUSCH repetitions or the one PUSCH repetition of the second set of PUSCH repetitions has a greater number of symbols, which of the one PUSCH repetition of the first set of PUSCH repetitions or the one PUSCH repetition of the second set of PUSCH repetitions has less bits of the UCI for multiplexing, or which of the one PUSCH repetition of the first set of PUSCH repetitions or the one PUSCH repetition of the second set of PUSCH repetitions has a greater number of available resource elements (REs) for the transmission; and
refrain from multiplexing an other of the one PUSCH repetition of the first set of PUSCH repetitions or the one PUSCH repetition of the second set of PUSCH repetitions.

22. The apparatus of claim 1, wherein the at least one processor is further configured to:
determine that the number of symbols in the one PUSCH repetition of the first set of PUSCH repetitions and in the one PUSCH repetition of the second set of PUSCH repetitions is different;
determine that UCI excluding the at least one CSI report will be multiplexed on at least one of the one PUSCH repetition of the first set of PUSCH repetitions or the one PUSCH repetition of the second set of PUSCH repetitions; and
determine that the UE has no transport block (TB) to transmit in the PUSCH repetitions;
wherein to transmit the at least one CSI report the at least one processor is configured to:
transmit the at least one CSI report multiplexed on the one PUSCH repetition of the first set of PUSCH repetitions without the multiplexed UCI when the UCI would have been multiplexed on the one PUSCH repetition of the first set of PUSCH repetitions; and
transmit the at least one CSI report multiplexed on the one PUSCH repetition of the second set of PUSCH repetitions without the multiplexed UCI when the UCI would have been multiplexed on the one PUSCH repetition of the second set of PUSCH repetitions.

23. The apparatus of claim 1, further comprising at least one of a transceiver or an antenna coupled to the at least one processor, wherein the DCI requests transmission of at least one aperiodic (AP) CSI report or a semi-persistent (SP) CSI report.

24. A method of wireless communication at a user equipment (UE), comprising:
receiving downlink control information (DCI) scheduling a plurality of physical uplink shared channel (PUSCH) repetitions including a first set of PUSCH repetitions associated with a first sounding reference signal (SRS) set and a second set of PUSCH repetitions associated with a second SRS set;
determining whether to multiplex at least one channel state information (CSI) report on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or uplink control information (UCI) excluding the at least one CSI report will be transmitted in the one PUSCH repetition of the first set of PUSCH repetitions or the one PUSCH repetition of the second set of PUSCH repetitions; and
transmitting, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions.

25. The method of claim 24, further comprising determining that the number of symbols in the one PUSCH repetition of the first set of PUSCH repetitions and in the one PUSCH repetition of the second set of PUSCH repetitions is different;
wherein the transmission of the at least one CSI report comprises:
transmitting the at least one CSI report multiplexed on one of the one PUSCH repetition of the first set of PUSCH repetitions or the one PUSCH repetition of the second set of PUSCH repetitions based on which of the one PUSCH repetitions of the first and second sets of PUSCH repetitions has a greater number of symbols; and
refraining from multiplexing an other of the one PUSCH repetition of the first set of PUSCH repetitions or the one PUSCH repetition of the second set of PUSCH repetitions.

26. The method of claim 25, wherein the number of symbols in the one PUSCH repetition of the first set of PUSCH repetitions is determined to be greater than the number of symbols in the one PUSCH repetition of the second set of PUSCH repetitions, and the transmission of the at least one CSI report comprises:
transmitting the at least one CSI report multiplexed on the one PUSCH repetition of the first set of PUSCH repetitions; and
refraining from multiplexing the at least one CSI report on the one PUSCH repetition of the second set of PUSCH repetitions.

27. The method of claim 25, wherein the number of symbols in the one PUSCH repetition of the first set of PUSCH repetitions is determined to be less than the number of symbols in the one PUSCH repetition of the second set of PUSCH repetitions, and the transmission of the at least one CSI report comprises:
transmitting the at least one CSI report multiplexed on the one PUSCH repetition of the second set of PUSCH repetitions; and refraining from multiplexing the at least one CSI report on the one PUSCH repetition of the first set of PUSCH repetitions.

28. The method of claim 24, further comprising:
determining that the number of symbols in the one PUSCH repetition of the first set of PUSCH repetitions and in the one PUSCH repetition of the second set of PUSCH repetitions is different;
determining that UCI excluding the at least one CSI report will be multiplexed on at least one of the one PUSCH repetition of the first set of PUSCH repetitions or the one PUSCH repetition of the second set of PUSCH repetitions; and
determining that the UE has no transport block (TB) to transmit in the PUSCH repetitions;
wherein the transmission of the at least one CSI report comprises:
transmitting the at least one CSI in the one PUSCH repetition of the first set of PUSCH repetitions; and
refraining from multiplexing the at least one CSI report on the one PUSCH repetition of the second set of PUSCH repetitions.

29. An apparatus for wireless communication at a user equipment (UE), comprising:
means for receiving downlink control information (DCI) scheduling a plurality of physical uplink shared channel (PUSCH) repetitions including a first set of PUSCH repetitions associated with a first sounding reference signal (SRS) set and a second set of PUSCH repetitions associated with a second SRS set;
means for determining whether to multiplex at least one channel state information (CSI) report on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or uplink control information (UCI) excluding the at least one CSI report will be transmitted in the one PUSCH repetition of the first set of PUSCH repetitions or the one PUSCH repetition of the second set of PUSCH repetitions; and
means for transmitting, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions.

30. A non-transitory computer-readable medium storing computer executable code at a user equipment (UE), the code when executed by a processor causes the processor to:
receive downlink control information (DCI) scheduling a plurality of physical uplink shared channel (PUSCH) repetitions including a first set of PUSCH repetitions associated with a first sounding reference signal (SRS) set and a second set of PUSCH repetitions associated with a second SRS set;
determine whether to multiplex at least one channel state information (CSI) report on one PUSCH repetition of the first set of PUSCH repetitions, one PUSCH repetition of the second set of PUSCH repetitions, or both the one PUSCH repetition of the first set of PUSCH repetitions and the one PUSCH repetition of the second set of PUSCH repetitions based on at least one of whether a number of symbols in the one PUSCH repetition of the first set of PUSCH repetitions and in the one PUSCH repetition of the second set of PUSCH repetitions is different, or uplink control information (UCI) excluding the at least one CSI report will be transmitted in the one PUSCH repetition of the first set of PUSCH repetitions or the one PUSCH repetition of the second set of PUSCH repetitions; and
transmit, based on the determination, the at least one CSI report multiplexed on the one PUSCH repetition of the first set of PUSCH repetitions, the one PUSCH repetition of the second set of PUSCH repetitions, or both the one PUSCH repetition of the first set of PUSCH repetitions and the one PUSCH repetition of the second set of PUSCH repetitions.

* * * * *